(12) United States Patent
Yamaga et al.

(10) Patent No.: US 11,790,945 B2
(45) Date of Patent: Oct. 17, 2023

(54) CARTRIDGE, MEMORY, DATA RECORDING APPARATUS, AND DATA REPRODUCTION APPARATUS INCLUDING INFORMATION FOR ADJUSTING MAGNETIC TAPE WIDTH

(71) Applicant: Sony Corporation, Tokyo (JP)

(72) Inventors: Minoru Yamaga, Tokyo (JP); Eiji Nakashio, Tokyo (JP); Kazuo Anno, Tokyo (JP); Takanobu Iwama, Tokyo (JP); Naohiro Adachi, Tokyo (JP); Shinya Tochikubo, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 17/052,084

(22) PCT Filed: Jan. 6, 2020

(86) PCT No.: PCT/JP2020/000069
§ 371 (c)(1),
(2) Date: Oct. 30, 2020

(87) PCT Pub. No.: WO2021/075067
PCT Pub. Date: Apr. 22, 2021

(65) Prior Publication Data
US 2022/0254370 A1   Aug. 11, 2022

(30) Foreign Application Priority Data
Oct. 16, 2019 (JP) .................................. 2019-189513

(51) Int. Cl.
| G11B 15/43 | (2006.01) |
| G11B 5/008 | (2006.01) |
| G11B 23/027 | (2006.01) |
| G11B 23/107 | (2006.01) |
| G11B 23/30 | (2006.01) |
| G11B 5/78 | (2006.01) |

(52) U.S. Cl.
CPC .......... *G11B 15/43* (2013.01); *G11B 5/00813* (2013.01); *G11B 5/78* (2013.01); *G11B 23/027* (2013.01); *G11B 23/107* (2013.01); *G11B 23/30* (2013.01)

(58) Field of Classification Search
None
See application file for complete search history.

(56) References Cited

U.S. PATENT DOCUMENTS

| 2020/0357434 A1* | 11/2020 | Yamaga et al. ......... G11B 15/06 |
| 2020/0357437 A1* | 11/2020 | Yamaga et al. .......... G11B 5/78 |
| 2021/0233567 A1* | 7/2021 | Tochikubo et al. ..... G11B 23/30 |
| 2022/0172742 A1* | 6/2022 | Sekiguchi et al. ..... G11B 23/30 |
| 2022/0270642 A1* | 8/2022 | Yamaga et al. .... G11B 5/73927 |

\* cited by examiner

*Primary Examiner* — Craig A. Renner
(74) *Attorney, Agent, or Firm* — K&L Gates LLP

(57) ABSTRACT

A cartridge according to the present technology includes: a cartridge case; and a memory. The cartridge case houses a magnetic tape. The memory is provided in the cartridge case, the memory storing information before data recording by the magnetic tape, the information being for adjusting, during data recording or during data reproduction by the magnetic tape, a width of the magnetic tape.

20 Claims, 11 Drawing Sheets

CARTRIDGE, MEMORY, DATA RECORDING APPARATUS, AND DATA REPRODUCTION APPARATUS INCLUDING INFORMATION FOR ADJUSTING MAGNETIC TAPE WIDTH

TECHNICAL FIELD

The present technology relates to a technology of a cartridge or the like housing a magnetic tape therein.

BACKGROUND ART

In recent years, magnetic tapes have become widespread for applications such as backup of electronic data. The magnetic tapes are increasingly attracting attention as a storage medium for big data or the like because they have a large capacity and can be preserved for a long time.

The magnetic tape includes a data band including a plurality of recording tracks, and data is recorded on the recording tracks. Further, servo bands are provided at positions where the data band is sandwiched between the servo bands in the width direction, and a servo signal is recorded on the servo band. By reading the servo signal recorded on the servo band, a magnetic head is aligned with the recording tracks.

For example, Patent Literature 1 discloses a linear tape drive apparatus that detects a tape width from a servo signal, acquires a tape tension control signal from the tape width detection signal, and controls the tape tension by a tape tension control mechanism.

CITATION LIST

Patent Literature

Patent Literature 1: Japanese Patent Application Laid-open No. 2005-285268

DISCLOSURE OF INVENTION

Technical Problem

In recent years, the total thickness of a magnetic tape has been reduced, the number of recording tracks has increased, and the width of each of the recording tracks has become narrower due to the demand for a larger capacity of the magnetic tape. For this reason, there is a possibility that if the width of a magnetic tape fluctuates even slightly due to aging, an environmental change, or the like after data is recorded on the magnetic tape, the data cannot be accurately recorded/reproduced because an off-track of a data write/read head to the magnetic tape occurs.

Further, mainly in a data center in which the magnetic tape is used, data is preserved for a long time after being recorded, and recorded/reproduced by a plurality of drives.

In view of the circumstances as described above, it is an object of the present technology to provide a technology capable of minimizing off-tracks in consideration of individual differences between the plurality of drives and a change in width of the magnetic tape under a use environment.

Solution to Problem

A cartridge according to an embodiment of the present technology includes: a cartridge case; and a memory.

The cartridge case houses a magnetic tape.

The memory is provided in the cartridge case, the memory storing information before data recording by the magnetic tape, the information being for adjusting, during data recording or during data reproduction by the magnetic tape, a width of the magnetic tape.

In this technology, since information for adjusting a width before data recording by the magnetic tape is stored in the memory, it is possible to appropriately adjust the width of the magnetic tape by using this information during data recording/reproduction. Therefore, even in the case where the width of the magnetic tape fluctuates due to an environmental change, long-term preservation, or the like or even in the case where data is recorded/reproduced by a plurality of drives, it is possible to accurately record/reproduce the data.

The information may include information regarding a width corresponding to the entire length of the magnetic tape, which has been acquired during at least any one of an unwinding operation or a rewinding operation of the magnetic tape executed by a data recording/reproduction apparatus before data recording.

Since the inside of the wound magnetic tape is deformed in the lateral direction due to the winding stress, the width during unwinding and the width during winding differ in some cases. For this reason, it is more favorable to acquire both pieces of information regarding the width in advance.

The information regarding the width may be discrete data acquired for each predetermined length of the magnetic tape.

The information may include environmental information around the magnetic tape during acquisition of the information regarding the width.

The environmental information may include information regarding temperature around the magnetic tape during acquisition of the information regarding the width.

The environmental information may include information regarding humidity around the magnetic tape during acquisition of the information regarding the width.

The information may include information regarding tension of the magnetic tape during acquisition of the information regarding the width.

The information may include information regarding a substrate of the magnetic tape.

The width of the magnetic tape may be adjusted during data reproduction or during data recording so that the width of the magnetic tape is the same as the width represented by the information regarding the width.

The width of the magnetic tape may be adjusted by adjusting tension of the magnetic tape.

The information may include environmental information around the magnetic tape during acquisition of the information regarding the width, and the width of the magnetic tape may be adjusted on a basis of a difference between the environmental information and environmental information measured during data recording or during data reproduction.

The cartridge may be based on an LTO (linear Tape Open) standard.

A memory according to an embodiment of the present technology is provided in a cartridge case that houses a magnetic tape, the memory storing information before data recording by the magnetic tape, the information being for adjusting, during data recording or during data reproduction by the magnetic tape, a width of the magnetic tape.

A data recording apparatus according to an embodiment of the present technology is a data recording apparatus that records data in a magnetic tape, the data recording apparatus reading information regarding a width corresponding to the entire length of the magnetic tape before data recording by the magnetic tape, the information being stored in a memory provided in a cartridge case that houses the magnetic tape, the data recording apparatus adjusting, on a basis of the information regarding the width, the width of the magnetic tape during data recording by the magnetic tape.

A data reproduction apparatus according to an embodiment of the present technology is a data reproduction apparatus that reproduces data recorded on a magnetic tape, the data reproduction apparatus reading information regarding a width corresponding to the entire length of the magnetic tape before data recording by the magnetic tape, the information being stored in a memory provided in a cartridge case that houses the magnetic tape, the data reproduction apparatus adjusting, on a basis of the information regarding the width, the width of the magnetic tape during data recording by the magnetic tape.

[Cartridge 10]

Figure 1:
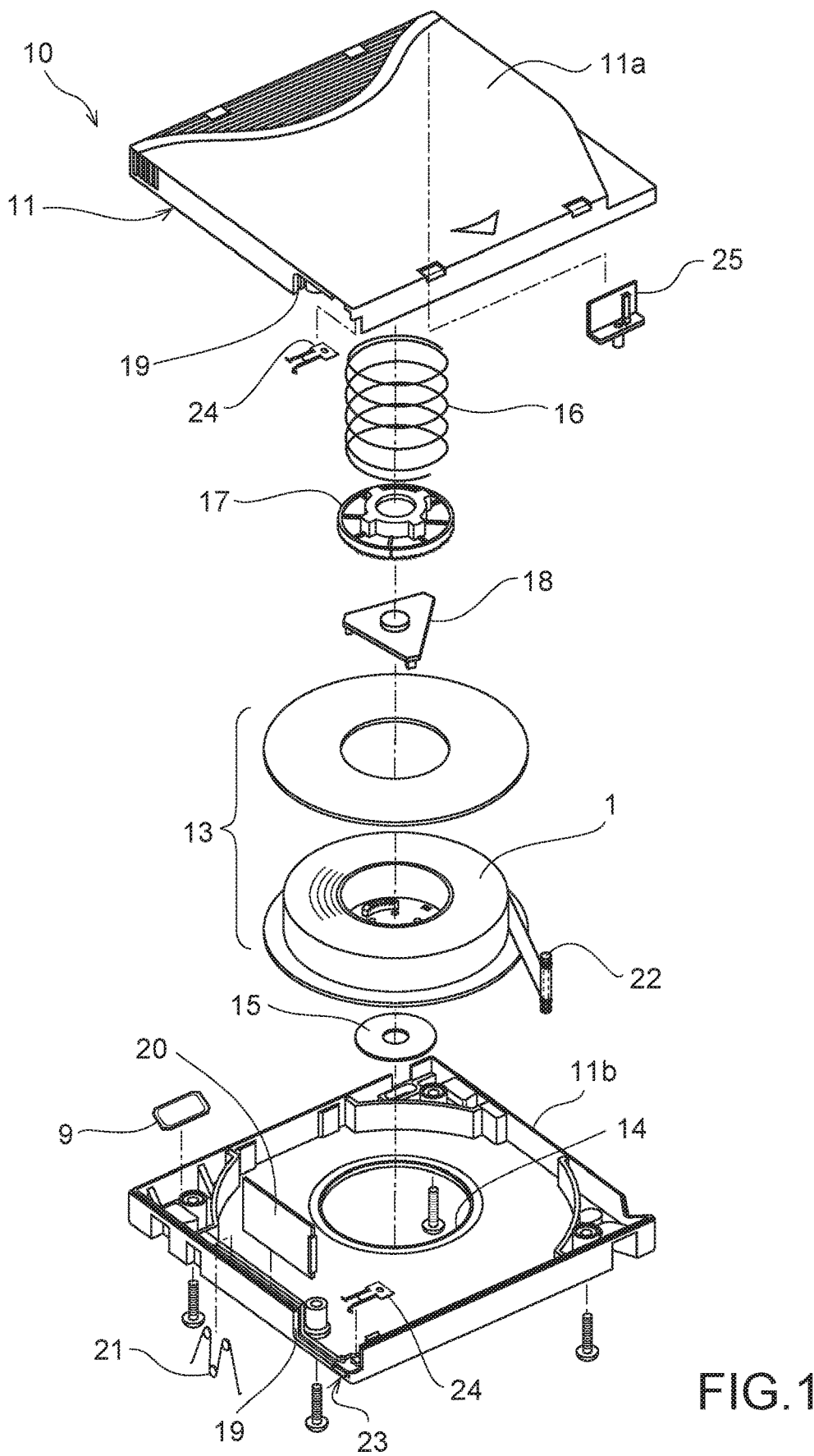
FIG. 1 is an exploded perspective view showing a cartridge according to an embodiment of the present technology.

FIG. 1 is an exploded perspective view showing a cartridge 10 according to an embodiment of the present technology. In the description of this embodiment, the cartridge 10 that conforms to the LTO standard will be described as an example of the cartridge 10.

As shown in FIG. 1, the cartridge 10 includes a cartridge case 11, a magnetic tape 1 to be rotatably housed inside the cartridge case 11, and a cartridge memory 9 to be provided inside the cartridge case 11.

The cartridge case 11 is configured by connecting an upper shell 11a and a lower shell 11b by a plurality of screw members. Inside the cartridge case 11, a single tape reel 13 around which the magnetic tape 1 is wound is rotatably housed.

A chucking gear (illustration omitted) to be engaged with a spindle 31 (see FIG. 4) of a data recording/reproduction apparatus 30 is annularly formed at the center of the bottom of the tape reel 13. This chucking gear is exposed to the outside via an opening 14 formed at the center of the lower shell 11b. On the inner peripheral side of this chucking gear, an annular metal plate 15 to be magnetically attracted to the spindle 31 is fixed.

A reel spring 16, a reel lock member 17, and a spider 18 are disposed between the inner surface of the upper shell 11a and the tape reel 13. They constitute a reel lock mechanism that suppresses rotation of the tape reel 13 when the cartridge 10 is not used.

At one side wall part of the cartridge case 11, a tape outlet 19 for drawing out one end of the magnetic tape 1 to the outside is provided. Inside the side wall part, a slide door 20 that opens/closes the tape outlet 19 is disposed. The slide door 20 is configured to slide in the direction of opening the tape outlet 19 against the biasing force of a torsion spring 21 by the engagement with a tape loading mechanism (not shown) of the data recording/reproduction apparatus 30.

A leader pin 22 is fixed to one end of the magnetic tape 1. The leader pin 22 is configured to be attachable/detachable to/from a pin holding part 23 provided on the inner side of the tape outlet 19. The pin holding part 23 includes elastic holders 24 that elastically hold the upper end and the lower end of the leader pin 22 in the upper wall inner surface (inner surface of the upper shell 11a) of the cartridge case 11 and the bottom wall inner surface (inner surface of the lower shell 11b).

Then, in addition to a safety tab 25 for preventing erroneous erasure of information recorded on the magnetic tape 1, the cartridge memory 9 capable of reading/writing, without contact, content relating to data recorded on the magnetic tape 1 is disposed inside the other side wall of the cartridge case 11.

[Magnetic Tape 1]

Figure 2:
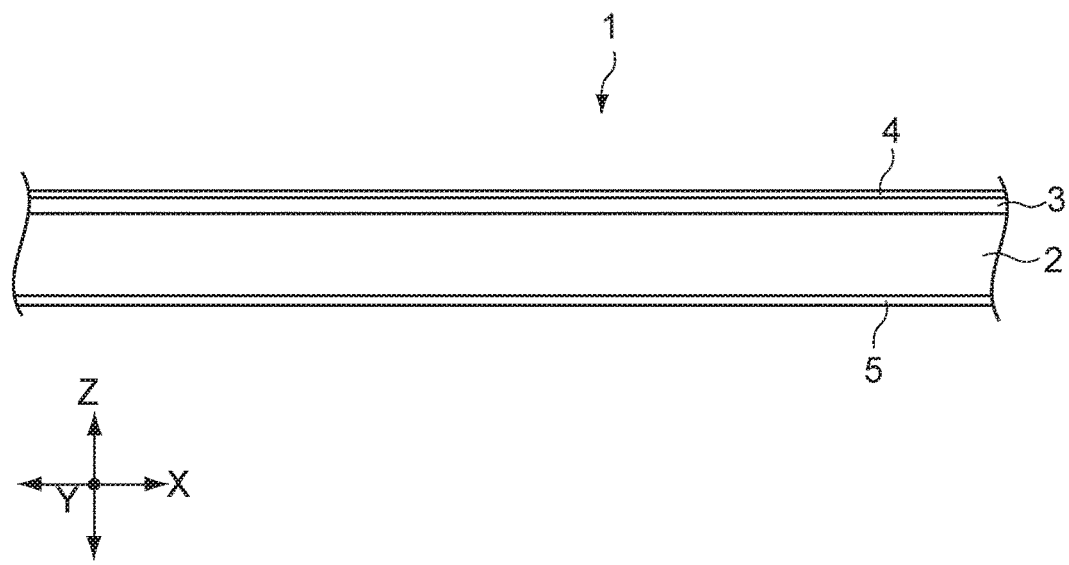
FIG. 2 is a schematic diagram of a magnetic tape as viewed from the side.
Figure 3:
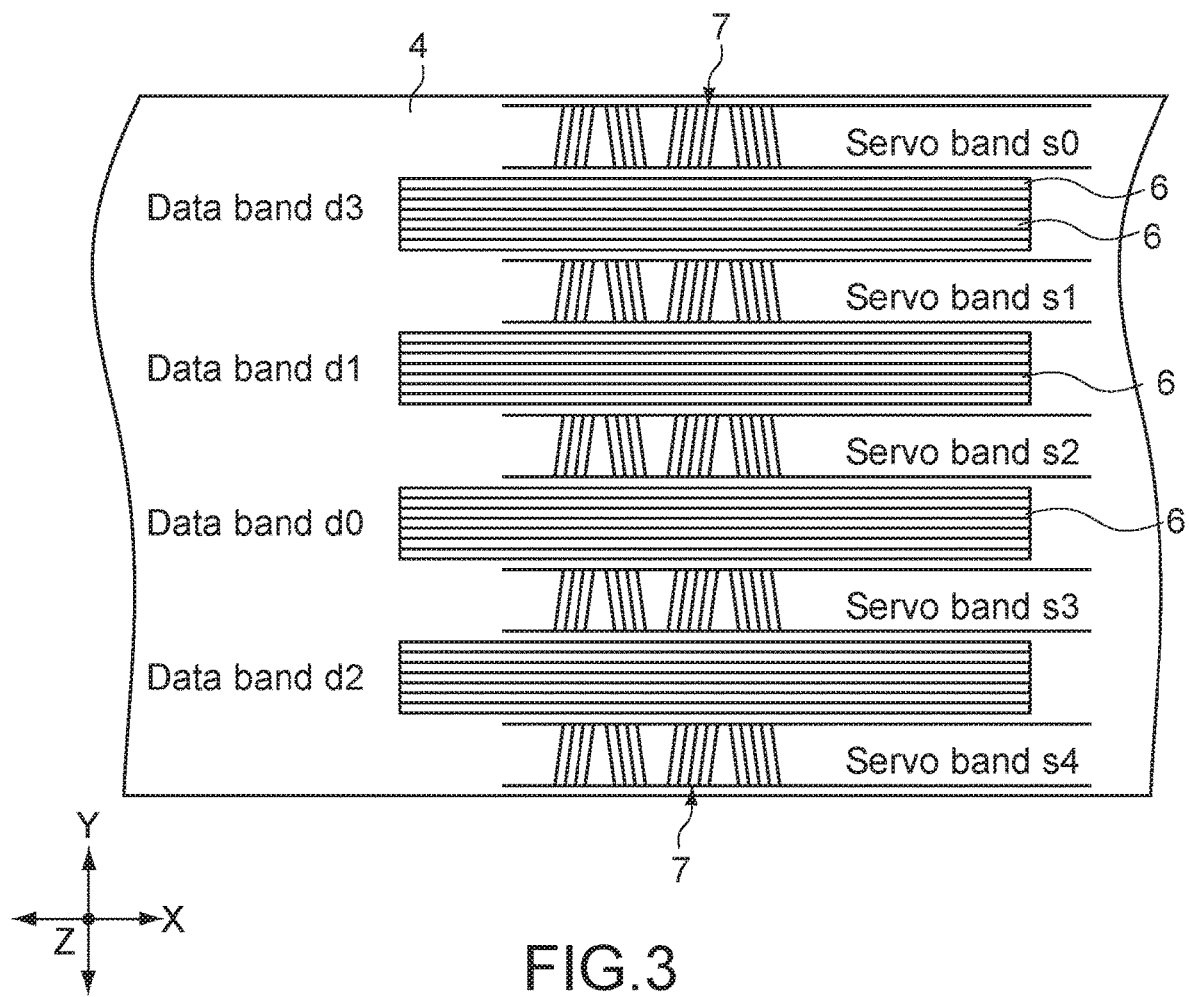
FIG. 3 a schematic diagram of the magnetic tape as viewed from above.

FIG. 2 is a schematic diagram of the magnetic tape 1 as viewed from the side, and FIG. 3 is a schematic diagram of the magnetic tape 1 as viewed from above.

As shown in FIG. 2 and FIG. 3, the magnetic tape 1 is configured in a tape shape that is long in the longitudinal direction (X-axis direction), short in the width direction (Y-axis direction), and thin in the thickness direction (Z-axis direction).

The magnetic tape 1 includes a substrate 2 having a tape shape that is long in the longitudinal direction (X-axis direction), a non-magnetic layer 3 provided on one main surface of the substrate 2, a magnetic layer 4 provided on the non-magnetic layer 3, and a back layer 5 provided on the other main surface of the substrate 2. Note that the back layer 5 may be provided as necessary, and this back layer 5 may be omitted.

The substrate 2 is a non-magnetic support that supports the non-magnetic layer 3 and the magnetic layer 4. The substrate 2 contains, for example, at least one of polyesters, polyolefins, cellulose derivatives, vinyl resins, or other polymer resins.

The magnetic layer 4 is a recording layer for recording data. This magnetic layer 4 contains a magnetic powder, a binder, conductive particles, and the like. The magnetic layer 4 may further contain an additive such as a lubricant, an abrasive, and a rust inhibitor, as necessary.

The magnetic layer 4 may be vertically oriented, or may be longitudinally oriented. The magnetic powder contained in the magnetic layer 4 includes, for example, nanoparticles containing ε-iron oxide (ε-iron oxide particles), nanoparticles containing hexagonal ferrite (hexagonal ferrite particles), nanoparticles containing Co-containing spinel ferrite (cobalt ferrite), or the like.

The non-magnetic layer 3 contains a non-magnetic powder and a binder. The non-magnetic layer 3 may contain an additive such as conductive particles, a lubricant, a curing agent, and a rust inhibitor as necessary.

The back layer 5 contains a non-magnetic powder and a binder. The back layer 5 may contain an additive such as a lubricant, a curing agent, and an antistatic agent, as necessary.

The upper limit of the average thickness (average total thickness) of the magnetic tape 1 is, for example, 5.6 μm or less, 5.0 μm or less, or 4.4 μm or less. In the case where the average thickness of the magnetic tape 1 is 5.6 μm or less, it is possible to increase the recording capacity that the cartridge 1021 can record as compared with the general magnetic tape 1.

As shown in FIG. 3, the magnetic layer 4 includes a plurality of data bands d (data bands d0 to d3) that is long in the longitudinal direction (X-axis direction) in which data is written, and a plurality of servo bands s (servo bands s0 to s4) that is long in the longitudinal direction in which a servo signal 7 is written. The servo bands s are disposed at positions where each of the data bands d is sandwiched between the servo bands s in the width direction (Y-axis direction).

In the example shown in FIG. 3, a case where the number of data bands d is four and the number of servo bands s is five is shown. Note that the number of data bands d and the number of servo bands s can be changed as appropriate.

The data bands d each include a plurality of recording tracks 6 that is long in the longitudinal direction and aligned in the width direction. Data is recorded in the recording tracks 6 along the recording tracks 6. The one-bit length of the data recorded in the data band d in the longitudinal direction is, for example, 48 nm or less. The servo band s includes the servo signal 7 of a predetermined pattern to be recorded by a servo signal recording device (not shown).

Here, in the magnetic tape 1 of the LTO standard, the number of recording tracks 6 increases for each generation and the recording capacity has been dramatically improved. As an example, the number of recording tracks 6 has been 384 in the first LTO-1, and has increased to 512, 704, 896, 1280, 2176, 3584, and 6656 in LTO-2 to LTO8, respectively. Similarly, the data recording capacity has been 100 GB (gigabytes) in LTO-1, and has increased to 200 GB, 400 GB, 800 GB, 1.5 TB (terabytes), 2.5 TB, 6.0 TB, and 12 TB in LTO-2 to LTO-8, respectively.

In this embodiment, the number of recording tracks 6 and the recording capacity are not particularly limited, and can be changed as appropriately. However, for example, it is advantageous when being applied to the magnetic tape 1 that has a large number of recording tracks 6 and a large recording capacity (e.g., 6656 or more, 12 TB or more: LTO8 and subsequent LTOs) and is easily affected by fluctuations in the width of the magnetic tape 1.

[Cartridge Memory 9]

The cartridge memory 9 includes, for example, a non-contact communication medium equipped with an antenna coil, an IC chip, and the like on a substrate. The IC chip includes a voltage generation unit that generates a starting voltage on the basis of a signal magnetic field received from a reader/writer 37 (see FIG. 4) via the antenna coil, a memory unit that stores predetermined information regarding the cartridge 10, a control unit that reads information from the memory unit, and the like therein.

The cartridge memory 9 operates with no power supply because the cartridge memory 9 receives the signal magnetic field transmitted from the reader/writer 37 by the antenna coil and generates electric power. The power supply/communication frequency from the reader/writer 37 is 13.56 MHz, which is the same as that in NFC (Near Field Communication). For example, a non-volatile memory (NVM) is used for the memory unit built in the IC chip.

Management information is stored in the memory unit. Examples of the management information include product information of the cartridge 10 and the magnetic tape 1, usage history information, and outlines of information recorded on the magnetic tape 1. The product information includes manufacturing information, the number of recording tracks 6 of the magnetic tape 1, and unique information such as ID. Examples of the usage history information include access date and time, address information, communication history with the reader/writer 37, presence or absence of abnormality in loading/unloading in the data recording/reproduction apparatus 30, and the like.

Here, in particular, in this embodiment, in addition to the above-mentioned management information and the like, information (hereinafter, information before data recording) before data recording by the magnetic tape 1, which is information for adjusting, during data recording or during data reproduction by the magnetic tape 1, the width of the magnetic tape, is stored in the memory unit.

In this embodiment, during predetermined tape operation processing before data recording, the reader/writer 37 causes the memory unit of the cartridge memory 9 to store the information before data recording (e.g., information regarding temperature, information regarding humidity, information regarding tension, or information regarding the width of the magnetic tape 1). Then, during data recording or during data reproduction, this information is read by the reader/writer 37, and this information is used to deal with fluctuations in the width of the magnetic tape 1.

Note that details of the information before data recording will be described below.

As described above, in the magnetic tape 1 of the LTO standard, the number of recording tracks 6 increases for each generation and the recording capacity has been dramatically improved. As the number of recording tracks 6 of the magnetic tape 1 increases, management information stored in the cartridge memory 9 also increases, so that also the capacity (memory capacity) of the cartridge memory 9 is also increasing. For example, the capacity has been 4 kB (kilobytes) in LTO-1 and LTO-2, and has increased to 8 kB and 16 kB in LTO-3 to LTO-5 and LTO-6 to LTO-8, respectively.

In this embodiment, the storage capacity of the cartridge memory 9 is not particularly limited, and can be changed as appropriate. However, in this embodiment, not only management information but also the information before data recording is written to the cartridge memory 9. Therefore, the storage capacity of the cartridge memory 9 may be a recording capacity that is equal to or greater than that required in the LTO standard. For example, in the case where the present technology is applied to any of the LTO-6 to LTO-8 (or subsequent LTOs) standards, the recording capacity of the cartridge memory 9 is typically 16 kB or more.

[Data Recording/Reproduction Apparatus 30]

Figure 4:
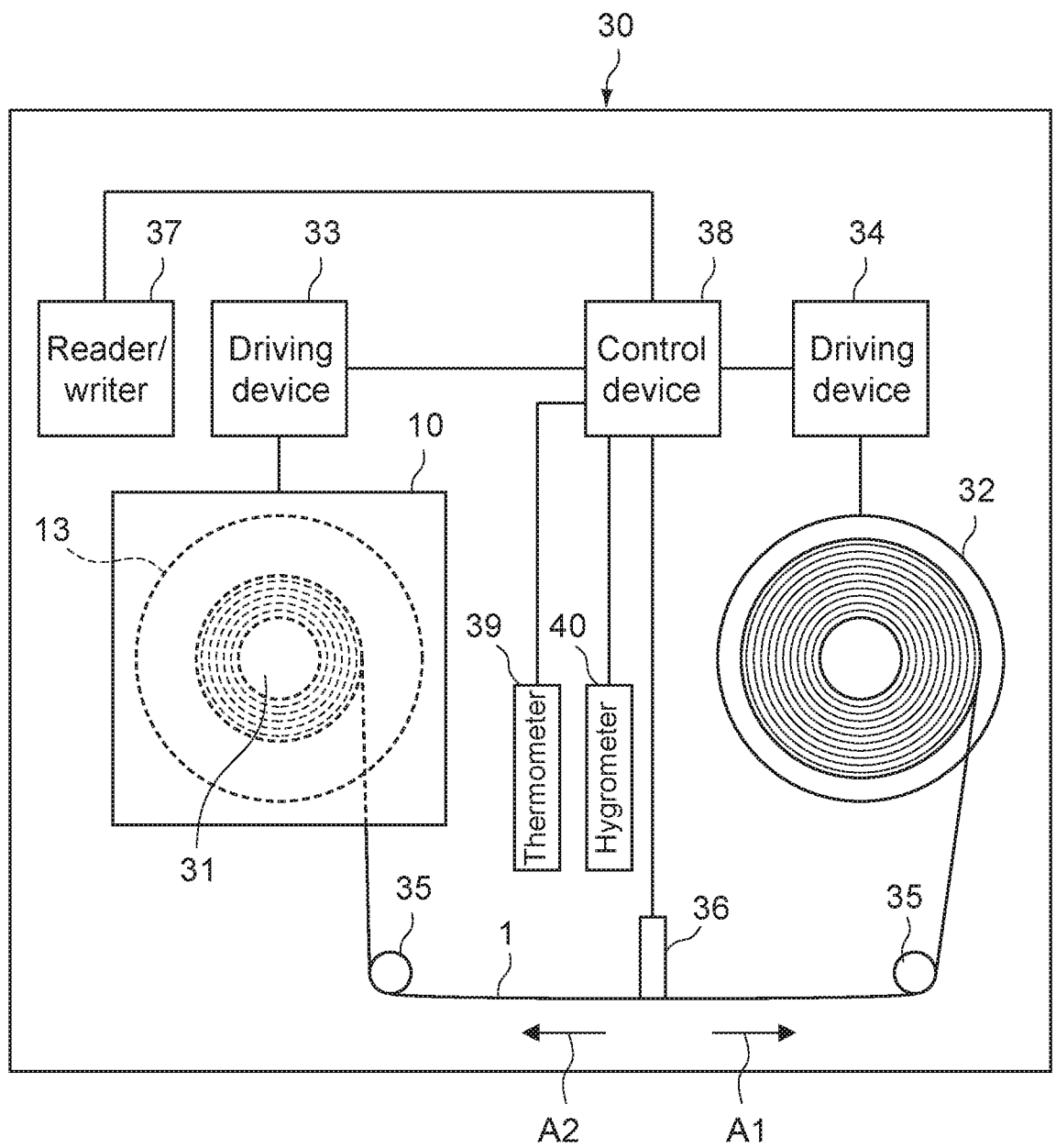
FIG. 4 is a diagram showing a data recording/reproduction apparatus.

FIG. 4 is a diagram showing the data recording/reproduction apparatus 30. As shown in FIG. 4, the data recording/reproduction apparatus 30 is configured to be capable of loading the cartridge 10. Although the data recording/reproduction apparatus 30 is configured to be capable of loading one cartridge 10, it may be configured to be capable of simultaneously loading a plurality of cartridges 10.

The data recording/reproduction apparatus 30 includes the spindle 31, a take-up reel 32, a spindle drive device 33, a reel drive device 34, and a plurality of guide rollers 35. Further, the data recording/reproduction apparatus 30 includes a head unit 36, the reader/writer 37, a control device 38, a thermometer 39, and a hygrometer 40.

The spindle 31 includes a head part to be engaged with the chucking gear of the tape reel 13 via the opening 14 formed in the lower shell 11b of the cartridge 10. The spindle 31 raises the tape reel 13 by a predetermined distance against the biasing force of the reel spring 16 to release the reel lock function by the reel lock member 17. As a result, the tape reel 13 is rotatably supported by the spindle 31 inside the cartridge case 11.

The spindle drive device 33 causes, in response to a command from the control device 38, the spindle 31 to rotate. The take-up reel 32 is configured to be capable of fixing the tip (leader pin 22) of the magnetic tape 1 pulled out of the cartridge 10 via the tape loading mechanism (not shown).

The plurality of guide rollers 35 guides travelling of the magnetic tape 1 so that a tape path formed between the cartridge 10 and the take-up reel 32 has a predetermined relative positional relationship with the head unit 36. The reel drive device 34 causes, in response to a command from the control device 38, the take-up reel 32 to rotate.

When recording/reproduction of data is performed on the magnetic tape 1, the spindle drive device 33 and the reel drive device 34 respectively cause the spindle 31 and the take-up reel 32 to rotate, and thus, the magnetic tape 1 travels. The travelling direction of the magnetic tape 1 can be reciprocated in the forward direction (direction unwinding from the tape reel 13 side to the take-up reel 32 side) indicated by an arrow A1 in FIG. 4 and the reverse direction (direction rewinding from the take-up reel 32 side to the tape reel 13 side) indicated by an arrow A2 in FIG. 4.

Note that in this embodiment, by controlling rotation of the spindle 31 by the spindle drive device 33 and rotation of the take-up reel 32 by the reel drive device 34, it is possible to adjust the tension of the magnetic tape 1 in the longitudinal direction (X-axis direction) during data recording/reproduction. Note that the adjustment of the tension of the magnetic tape 1 may be performed by controlling movement of the guide rollers 35 or by a tension control unit or the like including dancer rollers, instead of (or in addition to) the control of rotation of the spindle 31 and the take-up reel 32.

The reader/writer 37 is configured to be capable of recording, on the cartridge memory 9, the management information and the information before data recording, in response to a command from the control device 38. Further, the reader/writer 37 is configured to be capable of reading, from the cartridge memory 9, the management information and the information before data recording, in response to a command from the control device 38. As a communication method between the reader/writer 37 and the cartridge memory 9, for example, an ISO 14443 method is adopted.

The control device 38 includes, for example, a control unit, a storage unit, a communication unit, and the like. The control unit includes, for example, a CPU (Central Processing Unit) or the like, and integrally controls the respective units of a data recording apparatus 20 in accordance with the program stored in the storage unit.

The storage unit includes a non-volatile memory in which various types of data and various programs are to be recorded, and a volatile memory to be used as a work area for the control unit. The above-mentioned various programs may be read from a portable recording medium such as an optical disk and a semiconductor memory, or downloaded from a server apparatus on a network. The storage unit temporarily or non-temporarily stores the information of the cartridge memory 9 read from the reader/writer 27, the output of each of the thermometer 39 and the hygrometer 40, and the like. The communication unit is configured to be capable of communicating with other apparatuses such as a PC (Personal Computer) and a server apparatus.

The head unit 36 is configured to be capable of recording data on the magnetic tape 1 in response to a command from the control device 38. Further, the head unit 36 is configured to be capable of reproducing, in response to a command from the control device 38, the data written to the magnetic tape 1.

The head unit 36 includes, for example, two servo read heads, a plurality of data write/read heads, and the like.

The servo read heads are configured to be capable of reproducing the servo signal 7 by reading the magnetic field generated from the servo signal 7 recorded on the magnetic tape 1 by using an MR (Magneto Resistive) element or the like. The interval between the two servo read heads 32 in the width direction is substantially the same as the distance between two adjacent servo bands s.

The data write/read heads 33 are disposed at equal intervals along the width direction at positions where each of the data write/read heads 33 is sandwiched between two servo read heads 32. The data write/read heads 34 are configured to be capable of recording data on the magnetic tape 1 by a magnetic field generated from the magnetic gap. Further, the data write/read heads 35 are configured to be capable of reproducing data by reading the magnetic field generated from the data recorded on the magnetic tape 1 by using an MR (Magneto Resistive) element or the like.

The thermometer 39 measures the temperature around the magnetic tape 1 (cartridge 10) during data recording/reproduction, and outputs it to the control device 38. Further, the hygrometer 40 measures the humidity around the magnetic tape 1 (cartridge 10) during data recording/reproduction, and outputs it to the control device 38.

<Fluctuations in Width of Magnetic Tape 1>

As described above, in the LTO standard, the total thickness of the magnetic tape 1 is reduced and the number of recording tracks 6 increases as the storage capacity increases. In such a case, the width of the recording track 6 becomes narrow, and a slight fluctuation in the width of the magnetic tape 1 (Y-axis direction) causes a problem to occur in some cases. For example, assumption is made that the data recording/reproduction apparatus 30 stores predetermined data in the magnetic tape 1 and then (e.g., after preservation for a certain period of time), the data recording/reproduction apparatus 30 reproduces the data recorded in the magnetic tape 1. In such a case, if the width of the magnetic tape 1 during data reproduction fluctuates even slightly as compared with the width of the magnetic tape 1 during data recording, there is a possibility that an error occurs because the data recorded on the magnetic tape 1 cannot be accurately reproduced.

For example, since this type of cartridge 10 is mainly used in a data center and preserved for a long time after data recording, the width of the magnetic tape 1 is likely to fluctuate depending on the preservation environment. Further, since recording/reproduction of the magnetic tape 1 is performed by a plurality of drives (data recording/reproduction apparatus 30) in a data center or the like, there is a possibility that a reproduction error of the recorded data occurs due to the individual difference between the plurality of drives.

As causes of the fluctuations in the width of the magnetic tape 1, for example, the following (1) to (4) or the like can be considered.

(1) Temperature Fluctuation

The temperature of the magnetic tape 1 during data recording and the temperature of the magnetic tape 1 during data reproduction differ.

(A) For example, in the case where the temperature of the magnetic tape 1 during data recording is high, data is stored in the state where the width of the magnetic tape 1 is expanded. Assumption is made that after that, the magnetic tape 1 is preserved at a low temperature for a certain period of time and the data of the magnetic tape 1 is reproduced at a low temperature. In this case, the width of the magnetic tape 1 during data reproduction is narrower than the width of the magnetic tape 1 during data recording, and also the width of the recording track 6 is narrowed. In this case, there is a possibility that the head unit 36 cannot be accurately aligned with the recording tracks 6 and an error occurs.

(B) Conversely, in the case where the temperature of the magnetic tape 1 during data recording is low, data is stored in the state where the width of the magnetic tape 1 is contracted. Assumption is made that after that, the magnetic tape 1 is preserved at a high temperature for a certain period of time and the data of the magnetic tape 1 is reproduced at a high temperature. In this case, the width of the magnetic tape 1 during data reproduction is wider than the width of the magnetic tape 1 during data recording, and also the width of the recording track 6 is widened. In this case, there is a possibility that the head unit 36 cannot be accurately aligned with the recording tracks 6 and an error occurs.

(2) Humidity Fluctuation

The humidity of the magnetic tape 1 during data recording and the humidity of the magnetic tape 1 during data reproduction differ.

(A) For example, in the case where the humidity of the magnetic tape 1 during data recording is high, data is stored in the state where the width of the magnetic tape 1 is expanded. Assumption is made that after that, the magnetic tape 1 is preserved at a low humidity for a certain period of time and the data of the magnetic tape 1 is reproduced at a low humidity. In this case, the width of the magnetic tape 1 during data reproduction is narrower than the width of the magnetic tape 1 during data recording, and also the width of the recording track 6 is narrowed. In this case, there is a possibility that the head unit 36 cannot be accurately aligned with the recording tracks 6 and an error occurs.

(B) Conversely, in the case where the humidity of the magnetic tape 1 during data recording is low, data is stored in the state where the width of the magnetic tape 1 is contracted. Assumption is made that after that, the magnetic tape 1 is preserved at a high humidity for a certain period of time and the data of the magnetic tape 1 is reproduced at a high humidity. In this case, the width of the magnetic tape 1 during data reproduction is wider than the width of the magnetic tape 1 during data recording, and also the width of the recording track 6 is widened. In this case, there is a possibility that the head unit 36 cannot be accurately aligned with the recording tracks 6 and an error occurs.

(3) Tension Fluctuation

The tension applied to the magnetic tape 1 in the longitudinal direction (X-axis direction) during data recording and the tension applied to the magnetic tape 1 in the longitudinal direction during data reproduction differ.

(A) For example, in the case where the tension of the magnetic tape 1 during data recording is high, data is stored in the state where the width of the magnetic tape 1 is contracted. Assumption is made that after that, for example, when the magnetic tape 1 is reproduced by an apparatus different from (may be the same as) the apparatus that has recorded that data, the data of the magnetic tape 1 is reproduced at a tension lower than that during data recording. In this case, the width of the magnetic tape 1 during data reproduction is wider than the width of the magnetic tape 1 during data recording, and also the width of the recording track 6 is widened. In this case, there is a possibility that the head unit 36 cannot be accurately aligned with the recording tracks 6 and an error occurs.

(B) Conversely, in the case where the tension of the magnetic tape 1 during data recording is low, data is stored in the state where the width of the magnetic tape 1 is expanded. Assumption is made that after that, for example, when the magnetic tape 1 is reproduced by an apparatus different from (may be the same as) the apparatus that has recorded that data, the data of the magnetic tape 1 is reproduced at a tension higher than that during data recording. In this case, the width of the magnetic tape 1 during data reproduction is narrower than the width of the magnetic tape 1 during data recording, and also the width of the recording track 6 is narrowed. In this case, there is a possibility that the head unit 36 cannot be accurately aligned with the recording tracks 6 and an error occurs.

(4) Others

Assumption is made that since the tension of the magnetic tape 1 during data recording is higher than necessary, the magnetic tape 1 is wound up with a tension higher than necessary and the magnetic tape 1 is preserved for a certain period of time in this state. In this case, the width of the magnetic tape 1 is expanded inside the cartridge 10 due to the influence of the winding tension. In this case, the width of the magnetic tape 1 during data reproduction is wider than the width of the magnetic tape 1 during data recording, and also the width of the recording track 6 is widened. In this case, there is a possibility that the head unit 36 cannot be accurately aligned with the recording tracks 6 and an error occurs.

<Information Before Data Recording>

Next, the information before data recording to be recorded in the memory unit of the cartridge memory 9 will be described.

The information before data recording is information for adjusting, during data recording or during data reproduction by the magnetic tape 1, the width of the magnetic tape 1 as described above. In this embodiment, the information before tape recording includes information regarding the width corresponding to the entire length the magnetic tape 1.

The data recording/reproduction apparatus 30 executes, in the case where the cartridge 10 is loaded, a series of tape operation processing in which before data is recorded on the magnetic tape 1, the magnetic tape 1 is caused to travel in the forward direction (direction indicated by the arrow A1) to be completely unwound on the take-up reel 32, and then is caused to travel in the reverse direction (direction indicated by the arrow A2) to be completely rewound on the tape reel 13 again. The operation of unwinding the magnetic tape 1 is executed by an unwinding operation (FF) of the data recording/reproduction apparatus 30, and the operation of rewinding the magnetic tape 1 is executed by a rewinding operation (REW) of the data recording/reproduction apparatus 30. In this series of tape operation processing, neither data recording nor data reproduction is performed.

In this regard, in this embodiment, as the information before data recording, information regarding the width corresponding to the entire length the magnetic tape 1 is acquired during execution of the above-mentioned tape operation processing. The information regarding the width includes the information regarding the width (hereinafter, referred to also as the first width information) corresponding to the entire length along the forward direction of the magnetic tape 1, which has been acquired during an operation of unwinding the magnetic tape 1, and the information regarding the width (hereinafter, referred to also as the second width information) corresponding to the entire length along the reverse direction of the magnetic tape 1, which has been acquired during an operation of rewinding the magnetic tape 1. These pieces of information regarding the width are respectively referred to during data recording and during data reproduction as reference values for adjusting the width of the magnetic tape 1 as described below.

Here, the first width information and the second width information typically represent the tape width of the magnetic tape 1. In this example, the first width information and the second width information respectively represent information regarding the width of each part of the magnetic tape when the magnetic tape is caused to travel in the forward direction and in the reverse direction. The first width information and the second width information each represent discrete data acquired for each predetermined length of the magnetic tape 1. As a result, it is possible to suppress the increase in the amount of information regarding the width. The above-mentioned predetermined length is not particularly limited, and is, for example, 1 m to 20 m. Also the sampling rate of the information regarding the width is not particularly limited, and can be arbitrarily set in accordance with the unwinding/rewinding speed of the magnetic tape 1.

The first width information and the second width information are each acquired using the head unit 36 of the data recording/reproduction apparatus 30. During an operation of unwinding the magnetic tape 1 or an operation of rewinding the magnetic tape 1, the head unit 36 reads the servo signal 7 recorded on two predetermined servo bands s adjacent to each other. At this time, the distance between the two servo bands s in the width direction is obtained from the reproduction waveform of the servo signal read from the two servo bands s. Then, the entire width of the magnetic tape 1 is obtained on the basis of the obtained distance, and the obtained information is written to the memory unit of the cartridge memory 9 by the reader/writer 37. Hereinafter, unless individually described, the first width information and the second width information will be collectively referred to as information regarding a width W1 corresponding to the entire length of the magnetic tape 1.

The width corresponding to the entire length of the magnetic tape 1 is acquired as the information regarding the width because the tightening force is stronger toward the winding start side on the tape reel 13 and thus the tape width on the winding start side tends to be larger than that on the winding end side, i.e., the tape width is not uniform. This tendency becomes more remarkable as the tape length increases. Further, as the information regarding the width, only the first width information or only the second width information may be acquired.

Note that the inner peripheral side of the magnetic tape 1 wound on the tape reel 13 is deformed in the lateral direction by the winding stress, the width during unwinding and the width during winding differ in some cases. Depending on the type of the magnetic tape 1, when the winding start side (inner peripheral side) of the magnetic tape 1 is pulled out from the tape reel 13, the winding stress is released, which widens the tape width on the winding start side in some cases. In this case, the width of the magnetic tape 1 on the winding start side differs between during travelling in the forward direction and during travelling in the reverse direction, and thus, it is favorable to acquire both the first width information and the second width information.

The information before data recording may include environmental information around the magnetic tape 1 before data recording by the magnetic tape 1. The environmental information includes information regarding temperature $Tm1$ and humidity $H1$ around the magnetic tape 1 before data recording by the magnetic tape 1, or the like. The term "before data recording" represents "during the above-mentioned tape operation processing (operations of unwinding and rewinding the magnetic tape 1 over the entire length) executed before data recording" in this example.

For example, regarding the information regarding the temperature $Tm1$, when the above-mentioned series of tape operation processing is executed by the data recording/reproduction apparatus 30, the temperature $Tm1$ at that time is measured by the thermometer 39 and the measured value is written to the memory unit by the reader/writer 37. Further, regarding the information regarding the humidity $H1$, when the above-mentioned series of tape operation processing is executed by the data recording/reproduction apparatus 30, the humidity $H1$ at that time is measured by the hygrometer 40 and the measured value is written to the memory unit by the reader/writer 37.

Further, the information before data recording includes information regarding the tension $T1$ applied to the magnetic tape 1 in the longitudinal direction (X-axis direction) during the above-mentioned series of tape operation processing. The tension $T1$ has a constant value, and is, for example, 0.55 N. Hereinafter, the tension $T1$ will be referred to also as the reference tension.

Further, the information before data recording may include information regarding the substrate 2 of the magnetic tape 1. Examples of the information regarding the substrate 2 include the material, thickness, elastic modulus, and linear expansion coefficient. These pieces of information are used in, for example, setting parameters for calculating tension executed during data recording or during data reproduction described below.

<Description of Operation>

Next, the processing of the control device 38 of the data recording/reproduction apparatus 30 will be described.

[Acquisition of Information Before Data Recording]

Figure 5:
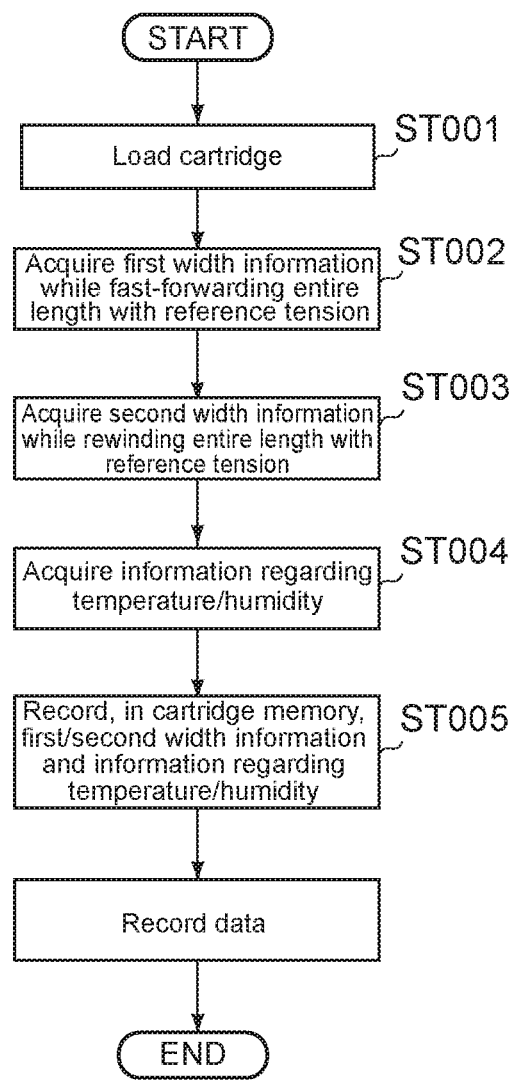
FIG. 5 is a flowchart showing processing of a control device during acquisition of information before data recording.

In the description here, the processing of the control device 38 during acquisition of information before data recording will be described first. FIG. 5 is a flowchart showing the processing of the control device 38 during acquisition of the information before data recording.

The control device 38 (control unit) loads the cartridge 10 into the case where the cartridge 10 is loaded on the data recording/reproduction apparatus 30 (Step 001). After that, the control device 38 acquires information regarding W1 of the magnetic tape 1 as information before data recording. More specifically, the control device 38 fast-forwards the magnetic tape 1 with reference tension by controlling rotation of the spindle 31 and the take-up reel 32, and acquires the first width information of the magnetic tape 1 in this process (Step 002). Subsequently, the control device 38 rewinds the magnetic tape 1 with reference tension by controlling rotation of the spindle 31 and the take-up reel 32, and acquires the second width information of the magnetic tape 1 in this process (Step 003).

Examples of the cartridge 10 from which information regarding the width W1 as the information before data recording is acquired include an unused cartridge. In the case where a considerable period of time has elapsed from shipment of an unused cartridge, the width of the magnetic tape 1 has changed as compared with that at the time of shipment due to changes over time (aging) of the magnetic tape 1, the preservation environment, or the like in some cases. By acquiring, at the initial use of the cartridge 10, the information regarding the width W1 of the magnetic tape 1 immediately before use, it is possible to eliminate the influence of the unused period, the preservation state, or the like as much as possible.

The acquisition of the information before data recording is typically executed, as preprocessing, during initial data recording by the cartridge 10. During the acquisition of the information regarding the width W1 (the first width information and the second width information), the distance between two servo bands s in the width direction (Y-axis direction in FIG. 3) is obtained on the basis of the reproduction waveform of the servo signal 7 obtained by tracing the two servo bands s used for tracking recording tracks to which data is written during initial data recording, by two servo read heads of the head unit 36. The control device 38 calculates, on the basis of this distance, the width W1 of the magnetic tape 1 for each predetermined length of the magnetic tape 1 (for each of a plurality of areas obtained by dividing the entire length of the magnetic tape 1 into the plurality of areas). The control device 38 may write the value of the width W1 calculated as described above to the cartridge memory 9 as the information regarding the width W1 or may write the above-mentioned distance between the two servo bands s in the width direction as it is to the cartridge memory 9.

The control device 38 further respectively acquires, as information before data recording, information regarding the temperature Tm1 around the magnetic tape 1 and information regarding the humidity H1 around the magnetic tape 1 (environmental information) from the thermometer 39 and the hygrometer 40 (Step 004). The timing of acquisition of the environmental information is not particularly limited, and may be any of when the cartridge 10 is loaded, when an operation of unwinding the magnetic tape 1 is performed (when the first width information is acquired), and when an operation of rewinding the magnetic tape 1 is performed (when the second width information is acquired).

Subsequently, the control device 38 records the information before data recording (the first width information, the second width information, and the information regarding temperature/humidity) acquired in Steps 002 to 004 on the cartridge memory 9 by the reader/writer 37 (Step 005). The information before data recording recorded on the cartridge memory 9 is read during data recording and during data reproduction described below, and referred to as a reference value for adjusting tension.

Subsequently, the control device 38 executes data recording processing (Step 005). The control device 38 causes the magnetic tape 1 to travel while applying reference tension to the magnetic tape 1 in the longitudinal direction (X-axis direction) by controlling rotation of the spindle 31 and the take-up reel 32. Then, the control device 38 records data on the magnetic tape 1 by the head unit 36. After the data recording processing is completed, the cartridge 10 is taken out of the data recording/reproduction apparatus 30.

Note that the information before data recording may be acquired every time the cartridge 10 is used. Further, when the cartridge 10 is reused or the recorded information is completely rewritten, the recorded content of the cartridge memory 9 may be updated by the acquired information before data recording.

[During Data Recording]

Figure 6:
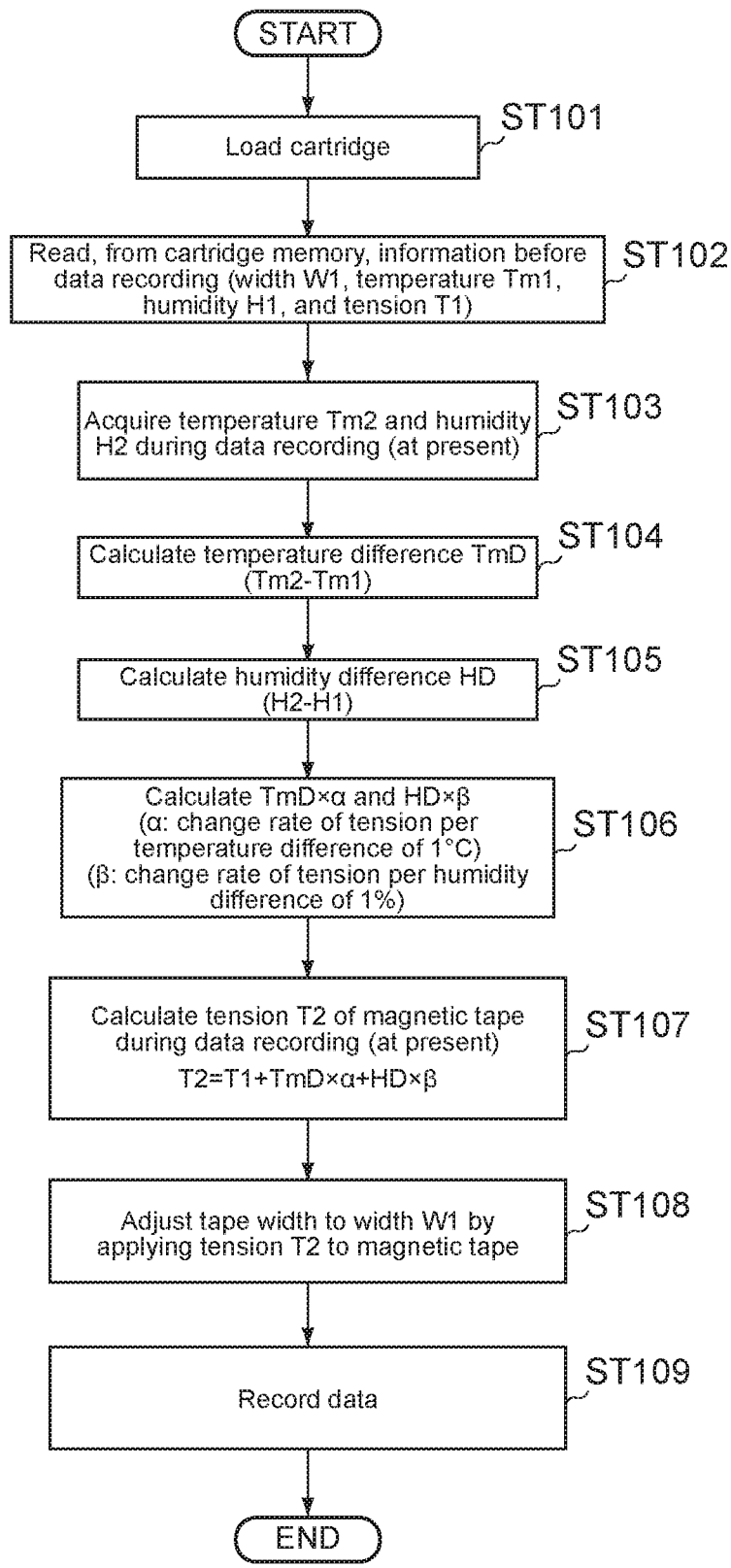
FIG. 6 is a flowchart showing processing of the control device during data recording.

Next, the processing of the control device 38 during second and subsequent data recording will be described. FIG. 6 is a flowchart showing processing of the control device 38 during data recording.

First, the control device 38 (control unit) loads the cartridge 10 into the data recording/reproduction apparatus 30 (Step 101). Next, the control device 38 reads, by the reader/writer 37, the information before data recording (the information regarding the width W1 of the magnetic tape 1, the information regarding the temperature Tm1, and the information regarding the humidity H1) written to the cartridge memory 9 to acquire the information (Step 102).

Next, the control device 38 acquires, from the thermometer 39 and the hygrometer 40, information regarding a present temperature Tm2 and information regarding a present humidity H2 around the magnetic tape 1 during data recording (Step 103).

Next, the control device 38 calculates a temperature difference TmD (TmD=Tm2−Tm1) between the past temperature Tm1 during acquisition of the information before data recording and the present temperature Tm2 during data recording (Step 104). Further, the control device 38 calculates a humidity difference HD (HD=H2−H1) between the past humidity H1 during acquisition of the information before data recording and the present humidity H2 during data recording (Step 105).

Next, the control device 38 multiplies the temperature difference TmD by a coefficient α (TmD×α), and multiplies the humidity difference HD by a coefficient β (HD×β) (Step 106).

The coefficient α is a value (value indicating the expansion rate per unit length (in the width direction) based on temperature) indicating how much the width of the magnetic tape 1 fluctuates per temperature difference of 1° C. How much the tension of the magnetic tape 1 should be changed as compared with the reference tension T1 that is tension during acquisition of the information before data recording is determined by a value obtained by dividing the coefficient α by a value (hereinafter, referred to also as ΔW) indicating how much the width fluctuates when tension is applied to the magnetic tape 1 in the longitudinal direction.

Similarly, the coefficient β is a value (value indicating the expansion rate per unit length (in the width direction) based on humidity) indicating how much the width of the magnetic tape 1 fluctuates per humidity difference of 1%. How much the tension of the magnetic tape 1 should be changed as compared with the reference tension T1 is determined by a value obtained by dividing the coefficient β by ΔW.

Next, the control device 38 calculates tension T2 to be applied to the magnetic tape 1 during data recording (at present) by adding the value of TmD×α and the value of HD×β to the reference tension T1 (Step 107).

$$T2 = T1 + TmD \times \alpha + HD \times \beta$$

After determining the tension T2 of the magnetic tape 1 during data recording, the control device 38 controls travelling of the magnetic tape 1 so that the magnetic tape 1 travels with the tension T2 by controlling driving of the spindle 31 and the take-up reel 32. The width of the magnetic tape 1 is adjusted so that the width of the magnetic tape 1 is the same as the width W1 acquired as the information before data recording by adjusting the tension of the magnetic tape 1 (Step 108). As a result, the data write/read heads of the head unit 36 are accurately aligned with the recording tracks 6. The adjustment range of tension is not particularly limited, and is, for example, 0.2 N or more and 1.2 N or less.

In this embodiment, whether or not the width of the magnetic tape 1 matches the width W1 is checked on the basis of the reproduction waveform of the servo signal 7. In this case, the first width information is referred to in the case where the travelling direction of the magnetic tape 1 is the forward direction (direction indicated by the arrow A1 in FIG. 4), and the second width information is referred to in the case where the travelling direction of the magnetic tape 1 is the reverse direction (direction indicated by the arrow A2 in FIG. 4). In the case where the width of the magnetic tape 1 does not match the width W1, the tension T2 is corrected so that the width of the magnetic tape 1 matches the width W1. Since the first width information and the second width information each include the information regarding the width for each tape area of the magnetic tape 1, it is possible to optimize the width of the magnetic tape 1 in accordance with the currently-travelling tape area.

Then, the control device 38 records data on the recording tracks 6 by the data write/read heads of the head unit 36 while reading the servo signal 7 of the servo bands s by the servo read heads of the head unit 36 (Step 109). As a result, even in the case where the width of the magnetic tape 1 fluctuates due to an environmental change (e.g., fluctuations of temperature and humidity) or the like, it is possible to accurately record data on the recording tracks 6 of the magnetic tape 1.

Note that since expansion due to temperature can occur not only in the magnetic tape 1 but also in the head unit 36, the adjustment direction of tension for temperature change changes depending on which of the temperature expansion coefficient of the magnetic tape 1 and the temperature expansion coefficient of the head unit 36 is larger.

Typically, the temperature expansion coefficient of the magnetic tape 1 is larger than the temperature expansion coefficient of the head unit 36. In this case, the value of the tension T2 to be applied to the magnetic tape 1 during data recording (at present) is higher in the case where the temperature Tm2 during data recording is higher than the temperature Tm1 during acquisition of the information before data recording. For this reason, in the case where the temperature increases and the width of the magnetic tape 1 is larger than the width W1, the width of the magnetic tape 1 can be narrowed to reproduce the same width as the width W1.

Conversely, the value of the tension T2 to be applied to the magnetic tape 1 during data recording (at present) is lower in the case where the temperature Tm2 during data recording is lower than the temperature Tm1 during acquisition of the information before data recording. For this reason, in the case where the temperature decreases and the width of the magnetic tape 1 is smaller than the width W1, the width of the magnetic tape 1 can be widened to reproduce the same width as the width W1.

Further, the value of the tension T2 to be applied to the magnetic tape 1 during data recording (at present) is higher in the case where the humidity H2 during data recording is higher than the humidity H1 during acquisition of the information before data recording. For this reason, in the case where the humidity increases and the width of the magnetic tape 1 is larger than the width W1, the width of the magnetic tape 1 can be narrowed to reproduce the same width as the width W1.

Conversely, the value of the tension T2 to be applied to the magnetic tape 1 during data recording (at present) is lower in the case where the humidity H2 during data recording is lower than the humidity H1 during acquisition of the information before data recording. For this reason, in the case where the humidity decreases and the width of the magnetic tape 1 is smaller than the width W1, the width of the magnetic tape 1 can be widened to reproduce the same width as the width W1.

Here, during data recording, in order to obtain the tension T2 to be applied to the magnetic tape 1, information regarding the width W1 of the magnetic tape 1 may further be used in addition to (or instead of) the temperature Tm1 and the humidity H1 during acquisition of the information before data recording and the reference tension T1.

In this case, the control device 38 calculates the temperature difference TmD (TmD=Tm2−Tm1) and the humidity difference HD (HD=H2−H1) in Step 106. Then, the control device 38 multiplies the temperature difference TmD by the coefficient α (TmD×α), and multiplies the humidity difference HD by the coefficient β (HD×β).

Next, the control device 38 calculates a current width W2 of the magnetic tape 1 on the basis of the width W1 by the following formula.

$$W2=W1(1+TmD\times\alpha+HD\times\beta)$$

Next, the control device 38 calculates a difference WD (WD=W2−W1=W1(TmD×α+HD×β)) between the current width W2 of the magnetic tape 1 and the width W1.

Then, the control device 38 adds the value obtained by multiplying the width difference WD by coefficient c to the reference tension T1 to calculate the tension T2 of the magnetic tape 1 during data recording.

$$T2=T1+WD\times\varepsilon$$

Here, the coefficient c is a value representing the tension in the longitudinal direction of the magnetic tape 1 necessary for changing the width of the magnetic tape 1 by a unit distance.

After determining the tension T2 of the magnetic tape 1 during data recording, the control device 38 controls driving of the spindle 31 and the take-up reel 32 to control travelling of the magnetic tape 1 so that the magnetic tape 1 travels with the tension T2. Then, the control device 38 records, by the data write/read heads of the head unit 36, data on the recording tracks 6 while reading the servo signal 7 of the servo bands s by the servo read heads of the head unit 36.

Also in the case where the tension T2 has been determined by such a method, it is possible to accurately record data on the magnetic tape 1 even when the width of the magnetic tape 1 fluctuates due to an environmental change (e.g., temperature and humidity fluctuations) or the like.

[During Data Reproduction]

Figure 7:
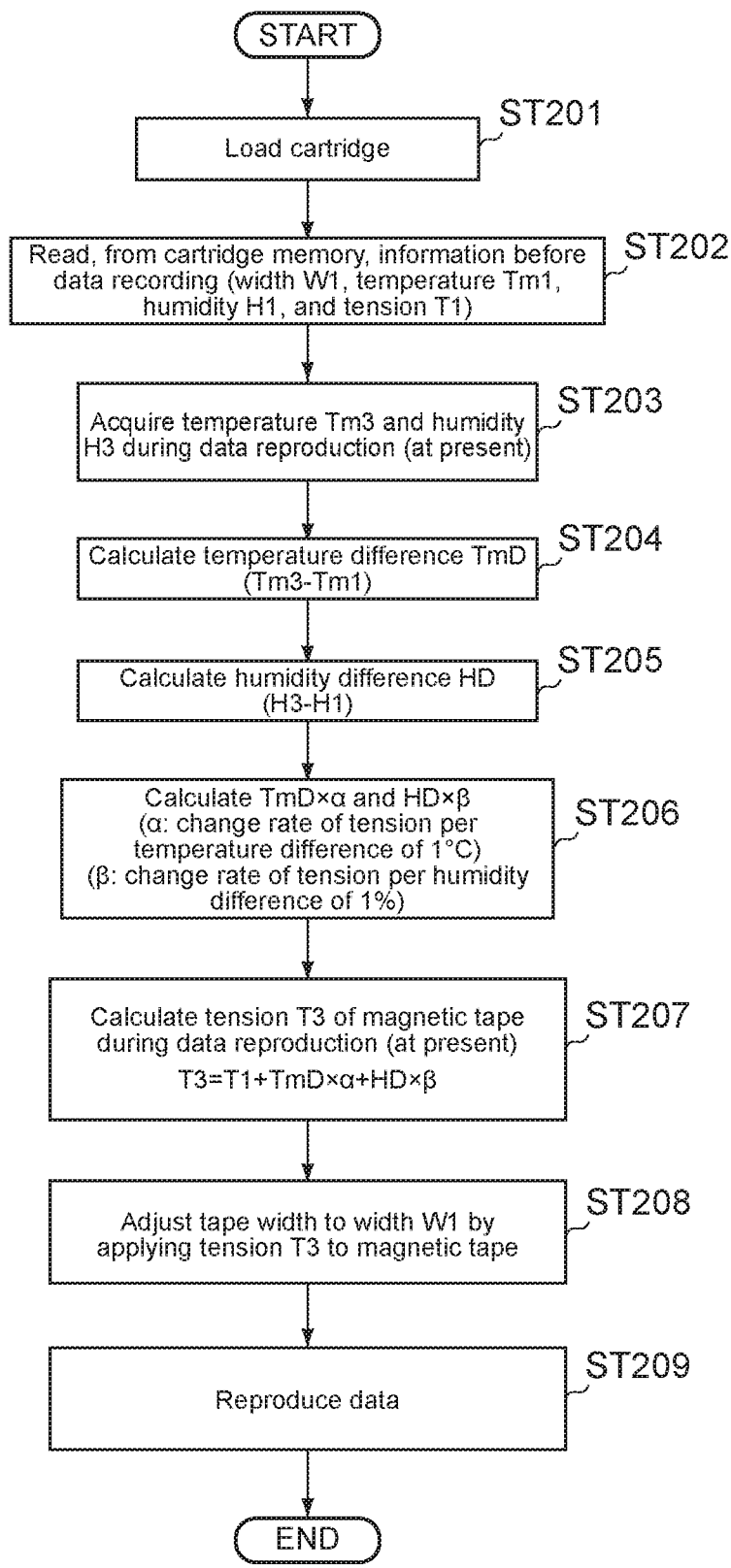
FIG. 7 is a flowchart showing processing of the control device during data reproduction.

Next, the processing of the control device 38 during data reproduction will be described. FIG. 7 is a flowchart showing the processing of the control device 38 during data reproduction. Also during data reproduction, the width of the magnetic tape 1 is adjusted in a procedure similar to that during data recording, and the data reproduction is performed.

During data reproduction, the control device 38 (control unit) loads the cartridge 10 into the data recording/reproduction apparatus 30 first (Step 201). Next, the control device 38 reads, by the reader/writer 37, the information during data recording (the information regarding the width W1 of the magnetic tape 1, the information regarding the temperature Tm1, the information regarding the humidity H1, and the information regarding the reference tension T1) written to the cartridge memory 9 to acquire the information (Step 202).

Next, the control device 38 acquires, from the thermometer 39 and the hygrometer 40, information regarding a current temperature Tm3 and information regarding a current humidity H3 around the magnetic tape 1 during data reproduction (Step 203).

Next, the control device 38 calculates a temperature difference TmD (TmD=Tm3−Tm1) between the past temperature Tm1 during acquisition of the information before data recording and the present temperature Tm3 during data reproduction (Step 204). Further, the control device 38 calculates a humidity difference HD (HD=H3−H1) between the past humidity H1 during acquisition of the information before data recording and the present humidity H3 during data reproduction (Step 205).

Next, the control device 38 multiplies the temperature difference TmD by a coefficient α (TmD×α), and multiplies the humidity difference HD by a coefficient β (HD×β) (Step 206).

Next, the control device 38 calculates tension T3 to be applied to the magnetic tape 1 during data reproduction (at present) by adding the value of TmD×α and the value of HD×β to the reference tension T1 (Step 207).

$$T3=T1+TmD\times\alpha+HD\times\beta$$

After determining the tension T3 of the magnetic tape 1 during data reproduction, the control device 38 controls travelling of the magnetic tape 1 so that the magnetic tape 1 travels with the tension T3 by controlling driving of the spindle 31 and the take-up reel 32. The width of the magnetic tape 1 is adjusted so that the width of the magnetic tape 1 is the same as the width W1 acquired as the information before data recording by adjusting the tension of the magnetic tape 1 (Step 208). As a result, the data write/read heads of the head unit 36 are accurately aligned with the recording tracks 6. The adjustment range of tension is not particularly limited, and is, for example, 0.2 N or more and 1.2 N or less.

Note that whether or not the width of the magnetic tape 1 matches the width W1 may be checked on the basis of the reproduction waveform of the servo signal 7. In this case, the first width information is referred to in the case where the travelling direction of the magnetic tape 1 is the forward direction (direction indicated by the arrow A1 in FIG. 4), and the second width information is referred to in the case where the travelling direction of the magnetic tape 1 is the reverse direction (direction indicated by the arrow A2 in FIG. 4). In the case where the width of the magnetic tape 1 does not match the width W1, the tension T3 is corrected so that the width of the magnetic tape 1 matches the width W1. Since the first width information and the second width information each include the information regarding the width for each tape area of the magnetic tape 1, it is possible to optimize the width of the magnetic tape 1 in accordance with the currently-travelling tape area.

Then, the control device 38 reproduces, by the data write/read heads of the head unit 36, the data recorded on the recording tracks 6 while reading the servo signal 7 of the servo bands s by the servo read heads of the head unit 36 (Step 209). As a result, even in the case where the width of the magnetic tape 1 fluctuates due to an environmental change (e.g., fluctuations of temperature and humidity) or the like, it is possible to accurately reproduce the data recorded on the magnetic tape 1.

Also during data reproduction, in order to obtain the tension T2 to be applied to the magnetic tape 1, information regarding the width W1 of the magnetic tape 1 may further be used in addition to (or instead of) the temperature Tm1 and the humidity H1 during acquisition of the information before data recording and the reference tension T1.

In this case, the control device 38 calculates the temperature difference TmD (TmD=Tm3−Tm1) and the humidity difference HD (HD=H3−H1) in Step 206. Then, the control device 38 multiplies the temperature difference TmD by the coefficient α (TmD×α), and multiplies the humidity difference HD by the coefficient β(HD×β).

Next, the control device 38 calculates a current width W3 of the magnetic tape 1 on the basis of the width W1 by the following formula.

$$W3=W1(1+TmD\times\alpha+HD\times\beta)$$

Next, the control device 38 calculates a difference WD (WD=W3−W1=W1(TmD×α+HD×β)) between the current width W3 of the magnetic tape 1 and the width W1.

Then, the control device 38 adds the value obtained by multiplying the width difference WD by coefficient c to the reference tension T1 to calculate the tension T3 of the magnetic tape 1 during data reproduction.

$$T3=T1+WD\times\varepsilon$$

After determining the tension T3 of the magnetic tape 1 during data reproduction, the control device 38 controls driving of the spindle 31 and the take-up reel 32 to control travelling of the magnetic tape 1 so that the magnetic tape 1 travels with the tension T3. Then, the control device 38 reproduces, by the data write/read heads of the head unit 36, the data recorded on the recording tracks 6 while reading the servo signal 7 of the servo bands s by the servo read heads of the head unit 36.

Also in the case where the tension T3 has been determined by such a method, it is possible to accurately reproduce the data recorded on the magnetic tape 1 even when the width of the magnetic tape 1 fluctuates due to an environmental change (e.g., temperature and humidity fluctuations) or the like.

<Effect, Etc.>

In this embodiment, since the pieces of information regarding the width W1, the tension T1, the temperature Tm, the humidity H, and the like acquired before data recording by the magnetic tape 1 are stored in the cartridge memory 9 as described above, it is possible to adjust the width of the magnetic tape 1 to the reference value (width W1) by using this information during data recording and during data reproduction. Therefore, even in the case where the width of the magnetic tape 1 fluctuates due to an environmental change, long-term preservation, or the like, or even in the case where data is recorded/reproduced by a plurality of drives, it is possible to accurately record data on the magnetic tape 1 or accurately reproduce the data recorded on the magnetic tape.

Further, in this embodiment, as information before data recording, the information regarding the temperature Tm1 and information regarding the humidity H1 during acquisition of the information regarding the width W1 (environmental information) is written. Therefore, it is possible to deal with fluctuations in the width of the magnetic tape 1 and the width of the recording track 6 due to the difference in temperature or humidity during data recording or during data reproduction with those during acquisition of the information regarding the width W1.

Further, in this embodiment, the width of the magnetic tape 1 is adjusted during data recording on the basis of the differences TmD and HD between the temperature Tm1 and the humidity H1 during acquisition of the information before data recording and the temperature Tm2 and the humidity H2 during data recording. As a result, during data recording, it is possible to further appropriately adjust the width of the magnetic tape 1.

Similarly, during data reproduction, the width of the magnetic tape 1 is adjusted on the basis of the differences TmD and HD between the temperature Tm1 and the humidity H1 and the temperature Tm3 and the humidity H3 during data reproduction. As a result, during data reproduction, it is possible to further adjust the width of the magnetic tape 1.

Therefore, in accordance with this embodiment, since the width of the magnetic tape can be actively changed to the width W1 of the magnetic tape 1 measured during acquisition of the information before data recording during data recording/reproduction, it is possible to minimize the displacement (off-trac) of the data write/read heads of the head unit 36 with respect to the recording tracks 6 of the magnetic tape 1. As a result, it is also possible to deal with the improvement of the track density.

Examples of the index for evaluating the dimension stability of the magnetic tape 1 in the width direction include TDS (Transverse Dimensional Stability). TDS represents the change rate of the dimension of the magnetic tape 1 in the width direction as an absolute value, which is based on the width dimension (width W1 in this embodiment) of the magnetic tape 1 used as the reference. The smaller the value of TDS, the higher the dimension stability in the width direction.

Figure 8:
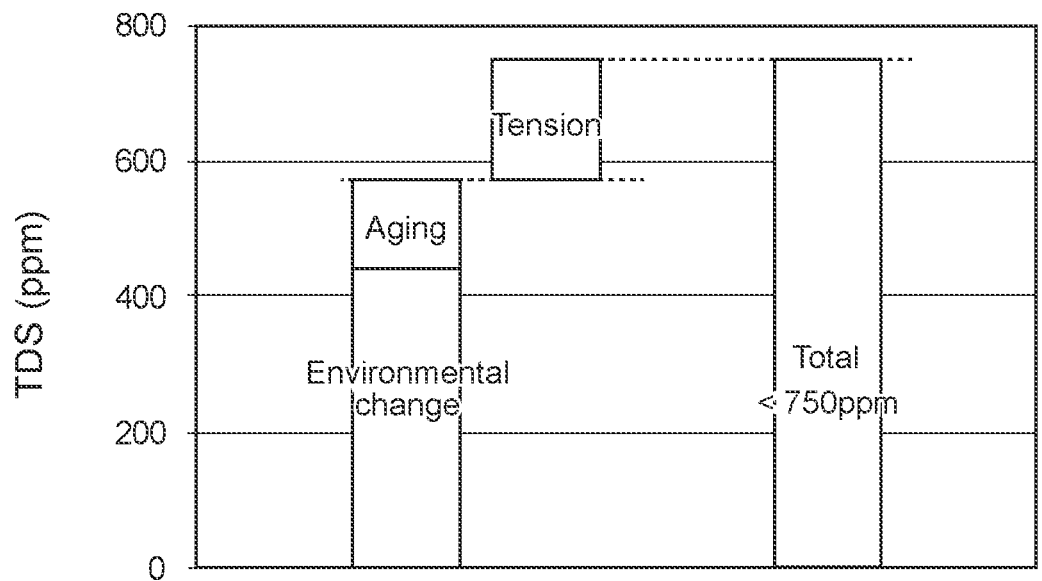
FIG. 8 is a diagram showing an example of TDS in a Comparative Example.

TDS depends on an environmental change such as temperature and humidity, changes over time (aging), tension during data recording/reproduction, or the like, and TDS cannot be reduced unless any measures are taken. For example, FIG. 8 shows an example of actual results in LTO-7. In the example shown in FIG. 8, TDS becomes at least 750 ppm or more because a little less than 600 ppm and a little less than 200 ppm are respectively added due to an environmental change and aging, and tension during data recording/reproduction. In this case, an off-track of the head unit with respect to the recording track is likely to occur, and it is difficult to accurately record/reproduce data.

Figure 9:
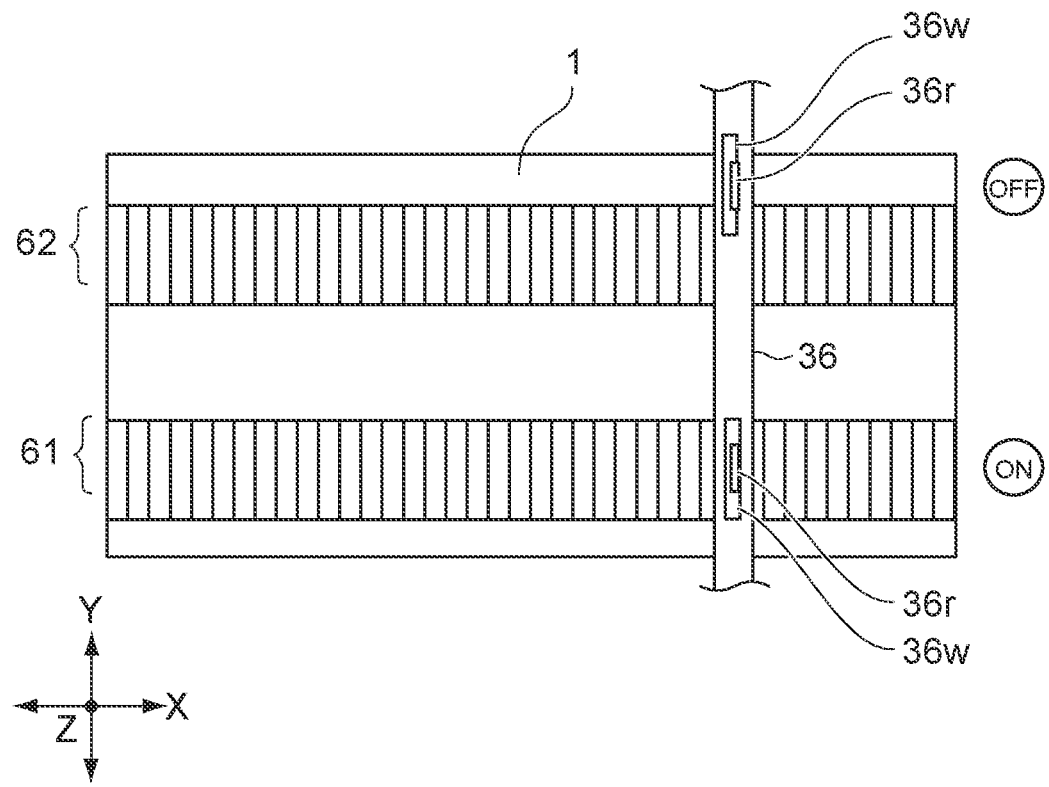
FIG. 9 is a schematic diagram showing an off-track state of a data write/read head to a recording track.

FIG. 9 is a schematic diagram describing an off-track state of a head unit. Here, the state where the tape width has changed in the direction in which the width of the magnetic tape 1 becomes smaller than the reference value (W1) is shown. As shown in the figure, a data read head 36r is in an off-track state in a recording track 62 while each of a data write head 36w and the data read head 36r is in an on-track state in a recording track 61. Since the head width of the data read head 36r is narrower than the head width of the data write head 36w in the linear recording method, it is necessary to reduce the influence of the off-track to improve the track density. Further, since the margin of the head width of the data write head 36w with respect to the width of the recording track is smaller than that of the head width of the data read head 36, severer control is required for tracking during data recording to improve the track density.

Figure 10:
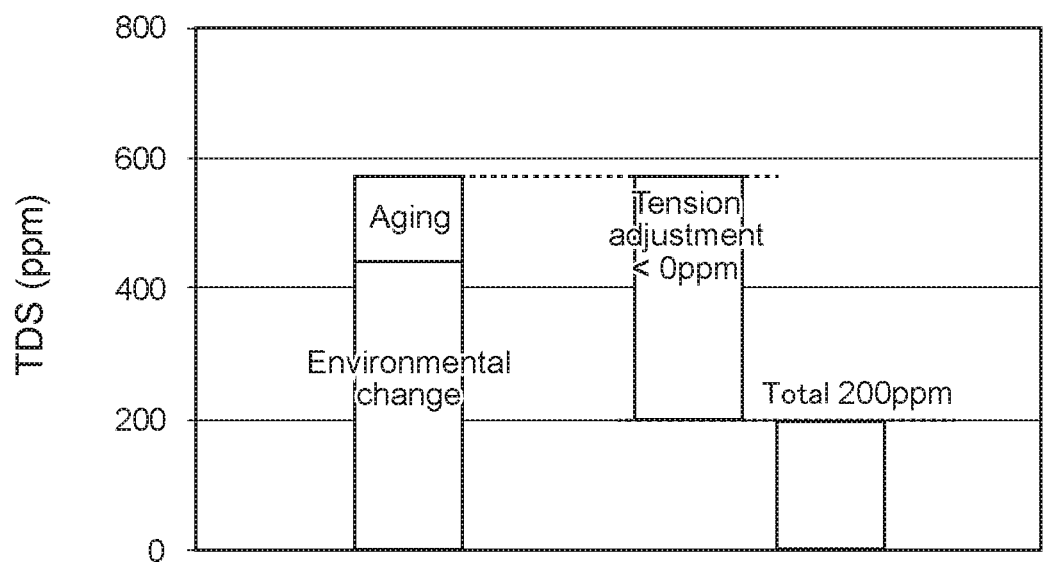
FIG. 10 is a diagram showing an example of TDS in this embodiment.
Figure 11:
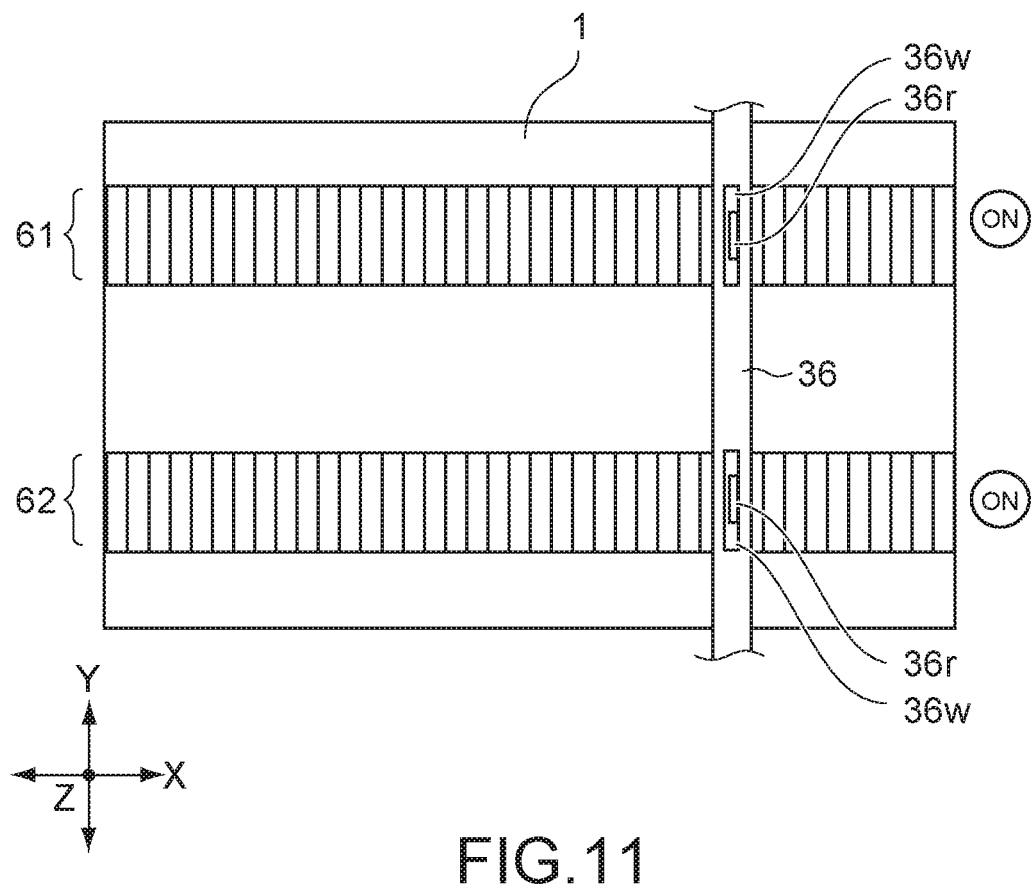
FIG. 11 is a schematic diagram showing an on-track state of the data write/read head with respect to the recording track.

Meanwhile, in this embodiment, since the tension adjustment is performed during data recording/reproduction so that the width of the magnetic tape 1 is the same as the reference value (W1), it is possible to reduce TDS of the magnetic tape 1. For example, as shown in FIG. 10, it is possible to reduce the tape width fluctuation factors due to an environmental change and aging by tension adjustment. As a result, since TDS can be reduced to, for example, 200 ppm or less, it is possible to minimize the off-track. FIG. 11 is a schematic diagram showing the relative positional relationship between the magnetic tape 1 and the head unit 36 when the off-track is suppressed to the minimum. In accordance with this embodiment, as shown in the figure, it is possible to stably maintain the on-track state of each of the data write heads 36w and the data read heads 36r with respect to the recording tracks 61 and 62.

VARIOUS MODIFIED EXAMPLES

Here, there is a possibility that the fluctuations in the width of the magnetic tape 1 and the width of the recording track 6 due to temperature and humidity are more at positions on both ends in the width direction (Y-axis direction) in the magnetic tape 1 than at the center position in the width direction. Therefore, during data recording/reproduction, the magnitude of the tension of the magnetic tape 1 may be changed depending on the position of the recording track at which data is to be recorded/reproduced.

For example, assumption is made that the tension of the magnetic tape 1 in the case where the position of the recording track at which data is to be recorded/reproduced is near the center of the magnetic tape 1 in the width direction is Tn(a). Further, assumption is made that the tension of the magnetic tape 1 in the case where the position of the recording track at which data is to be recorded/reproduced is on one of both ends of the magnetic tape 1 in the width direction is Tn(b).

In this case, in the case where the temperature and humidity during data recording/reproduction are higher than those during acquisition of the information before data recording and the width of the magnetic tape 1 has been widened, tension Tn of the magnetic tape 1 is adjusted so that the relationship of Tn(a)<Tn(b) is satisfied.

Conversely, in the case where the temperature and humidity during data recording/reproduction are lower than those during acquisition of the information before data recording and the width of the magnetic tape 1 has been narrowed, the tension Tn of the magnetic tape 1 is adjusted so that the relationship of Tn(a)>Tn(b) is satisfied.

In the above description, the case where all the information regarding the temperature Tm1, the information regarding the humidity H1, the information regarding the reference tension T1, and the information regarding the width W1 are used as the information before data recording has been described. Meanwhile, the information before data recording may be any one of the information regarding the temperature Tm1, the information regarding the humidity H1, the information regarding the reference tension T1, and the information regarding the width W1, or a combination of arbitrary two or three of them.

Further, it does not necessarily need to calculate the tension during data recording/reproduction on the basis of the information regarding temperature or humidity, and the width of the magnetic tape 1 may be monitored while changing the tension in a stepwise manner and the change in tension may be stopped when the width matches the width W1. In this case, it is possible to determine, on the basis of the information regarding temperature or humidity acquired during data recording/reproduction, whether to change the tension in the direction of increasing the tension or in the direction of decreasing the tension.

In the above description, the data recording/reproduction apparatus 30 having both functions of data recording/reproduction has been described as an example of the apparatus. Meanwhile, the data recording/reproduction apparatus 30 may include separate bodies, i.e., a data recording apparatus having at least a function of data recording and a data reproduction apparatus having at least a function of data reproduction.

<Magnetic Recording Medium>

Subsequently, an example of details of the magnetic recording medium to be used for the magnetic tape 1 will be described.

The present inventors have examined a magnetic recording medium that is thin and suitable for use in a recording/reproduction apparatus that adjusts the tension in the longitudinal direction. As a result, the present inventors have found that a magnetic recording medium having a specific configuration satisfies these requirements. That is, in the present technology, a magnetic recording medium that has a layer structure in which a magnetic layer, a non-magnetic layer, and a base layer in the stated order, an average thickness $t_T$ of 5.5 µm or less ($t_T \leq 5.5$ µm), a dimensional change amount $\Delta w$ in the width direction relative to the tension change in the longitudinal direction of 660 ppm/N or more (660 ppm/N$\leq \Delta w$), and an average thickness to of the non-magnetic layer of 1.0 µm or less ($t_n \leq 1.0$ µm) can be used.

The dimensional change amount $\Delta w$ of 660 ppm/N or more (660ppm/N$\leq \Delta w$) and the average thickness $t_n$ of 1.0 µm or less ($t_n \leq 1.0$ µm) are suitable for use of a thin magnetic recording medium in a recording/reproduction apparatus that adjusts the tension in the longitudinal direction.

Further, the dimensional change amount $\Delta w$ in the width direction due to the tension change in the longitudinal direction of the magnetic recording medium greatly depends on the physical characteristics of the base layer among the layers of the magnetic recording medium. Meanwhile, it is considered to depend also on the physical characteristics of the non-magnetic layer disposed between the magnetic layer and the base layer, particularly, the thickness $t_n$ of the non-magnetic layer. Satisfying the relationship of $t_n \leq 1.0$ µm is considered to be suitable for increasing $\Delta w$.

The average thickness $t_T$ of the magnetic recording medium according to the present technology is 5.5 µm or less, more favorably 5.3 µm or less, and can be still more favorably 5.2 µm or less, 5.0 µm or less, or 4.6 µm or less. Since the magnetic recording medium according to the present technology is thin as described above, for example, it is possible to make the length of the tape wound up in one magnetic recording cartridge longer, which makes it possible to increase the recording capacity per one magnetic recording cartridge.

In the magnetic recording medium according to the present technology, the dimensional change amount $\Delta w$ in the width direction relative to the tension change in the longitudinal direction is 660 ppm/N or more, favorably 670 ppm/N or more, more favorably 700 ppm/N or more, and may be still more favorably 710 ppm/N or more, 730 ppm/N or more, 750 ppm/N or more, 780 ppm/N or more, or 800 ppm/N or more. The fact that the magnetic recording medium has the dimensional change amount $\Delta w$ within the above-mentioned numerical range contributes to make it possible to keep the width of the magnetic recording medium constant by adjusting the tension of the magnetic recording medium in the longitudinal direction.

Further, the upper limit of the above-mentioned dimensional change amount $\Delta w$ is not particularly limited, but can be, for example, 1,700,000 ppm/N or less, favorably 20,000 ppm/N or less, more favorably 8,000 ppm/N or less, and still more favorably 5,000 ppm/N or less, 4,000 ppm/N or less, 3,000 ppm/N or less, or 2,000 ppm/N or less. If the dimensional change amount $\Delta w$ is too large, it is difficult to cause the magnetic recording medium to travel in the production process in some cases.

The average thickness $t_n$ of the non-magnetic layer of the magnetic recording medium according to the present technology satisfies the relationship of favorably $t_n \leq 1.0$ µm, more favorably $t_n \leq 0.9$ µm, and still more favorably $t_n \leq 0.7$ µm. The average thickness $t_n$ of the non-magnetic layer satisfies the relationship of, for example, 0.01 µm$\leq t_n$, favorably 0.02 µm$\leq t_n$.

A surface roughness $R_{ab}$ of the above-mentioned back layer of the magnetic recording medium according to the present technology satisfies the relationship of favorably 3.0 nm$\leq R_{ab} \leq 7.5$ nm, more favorably 3.0 nm$\leq R_{ab} \leq 7.3$ nm. The fact that the surface roughness $R_{ab}$ is within the above-mentioned numerical range contributes to improvement of the handling property of the magnetic recording medium.

The surface roughness $R_{ab}$ of the above-mentioned back layer is more favorably 7.2 nm or less, and can be still more favorably 7.0 nm or less, 6.5 nm or less, 6.3 nm or less, or 6.0 nm or less. Further, the above-mentioned surface roughness $R_{ab}$ is more favorably 3.2 nm or more, and can be still more favorably 3.4 nm or more. The fact that the surface roughness $R_{ab}$ is within the above-mentioned numerical range, particularly the above-mentioned upper limit or less, it is possible to not only improve the handling property but also achieve favorable electromagnetic conversion characteristics.

The magnetic recording medium according to the present technology is favorably an elongated magnetic recording medium, and can be, for example, a magnetic recording tape (particularly, elongated magnetic recording tape).

The magnetic recording medium according to the present technology may include a different layer in addition to the magnetic layer, the non-magnetic layer, and the base layer. The different layer may be appropriately selected in accordance with the type of the magnetic recording medium. The magnetic recording medium according to the present technology may be, for example, a coating-type magnetic recording medium, or may be a vacuum-deposition-type magnetic recording medium.

The magnetic recording medium according to the present technology may include, for example, at least one data band and at least two servo bands, and can favorably include a plurality of data bands and a plurality of servo bands. The number of data bands is, for example, 2 to 10, and can be particularly 3 to 6, more particularly 4 or 5. The number of servo bands is, for example, 3 to 11, particularly 4 to 7, and can be more particularly 5 or 6. These servo bands and data bands may be disposed so as to extend in the longitudinal direction of the elongated magnetic recording medium (particularly, magnetic recording tape), particularly, to be substantially in parallel with each other, for example. The above-mentioned data bands and servo bands can be provided in the magnetic layer. Examples of such a magnetic recording medium including the data bands and servo bands include a magnetic recording tape that conforms to the LTO (Linear Tape-Open) standard. That is, the magnetic recording medium according to the present technology may be a magnetic recording tape that conforms to the LTO standard. For example, the magnetic recording medium according to the present technology may be a magnetic recording tape that conforms to LTO8 or subsequent LTOs (e.g., LTO9, LTO10, LTO11, or LTO12).

The width of the elongated magnetic recording medium (particularly, magnetic recording tape) according to the present technology is, for example, 5 mm to 30 mm, particularly 7 mm to 25 mm, and can be more particularly 10 mm to 20 mm, still more particularly 11 mm to 19 mm. The length of the elongated magnetic recording medium (particularly, magnetic recording tape) can be, for example, 500 m to 1500 m. For example, the tape width and length that conform to the LTO8 standard are respectively 12.65 mm and 960 m.

(1) Configuration of Magnetic Recording Medium

As described with reference to FIG. 2, the magnetic recording medium (magnetic tape 1) is, for example, a magnetic recording medium on which vertical orientation processing has been performed, the magnetic recording medium including an elongated base layer (substrate 2), an underlayer (non-magnetic layer 3) provided on one main surface of the base layer, a magnetic layer or a recording layer (magnetic layer 4) provided on the underlayer, and a back layer (back layer 5) provided on the other main surface of the base layer. Hereinafter, of both main surfaces of the magnetic recording medium, the surface on which the magnetic layer is provided will be referred to as the magnetic surface and the surface (surface on which the back layer is provided) opposite to the magnetic surface will be referred to as the back surface.

The magnetic recording medium has a long shape, and is caused to travel in the longitudinal direction during recording/reproduction. Further, the magnetic recording medium may be configured to be capable of recording a signal with the shortest recording wavelength of favorably 100 nm or less, more favorably 75 nm or less, still more favorably 60 nm or less, and particularly favorably 50 nm or less. For example, the magnetic recording medium can be used in a recording/reproduction apparatus having the shortest recording wavelength within the above-mentioned range. This recording/reproduction apparatus may be one including a ring-type head as a recording head. The width of the recording track is, for example, 2 µm or less.

(2) Description of Respective Layers (Base Layer)

The base layer can function as a support for the magnetic recording medium, is, for example, a non-magnetic elongated substrate having flexibility, and can be particularly a non-magnetic film. The thickness of the base layer is, for example, 2 µm or more and 8 µm or less, favorably 2.2 µm or more and 7 µm or less, and more favorably 2.5 µm or more and 6 µm or less, and can be still more favorably 2.6 µm or more and 5 µm or less. The base layer can contain at least one of, for example, a polyester resin, a polyolefin resin, a cellulose derivative, a vinyl resin, an aromatic polyether ketone resin, or other polymer resins. In the case where the base layer contains two or more of the above-mentioned materials, the two or more materials may be mixed, copolymerized, or stacked.

The above-mentioned polyester resin may be, for example, one of PET (polyethylene terephthalate), PEN (polyethylene naphthalate), PBT (polybutylene terephthalate), PBN (polybutylene naphthalate), PCT (polycyclohexylenedimethylene terephthalate), PEB (polyethylene-p-oxybenzoate), and polyethylene bisphenoxycarboxylate, or a mixture of two or more of them. In accordance with a favorable embodiment of the present technology, the base layer 11 may be formed of PET or PEN.

The above-mentioned polyolefin resin may be, for example, one of PE (polyethylene) and PP (polypropylene) or a mixture of two or more of them.

The above-mentioned cellulose derivative may be, for example, one of cellulose diacetate, cellulose triacetate, CAB (cellulose acetate butyrate), and CAP (cellulose acetate propionate) or a mixture of two or more of them.

The above-mentioned vinyl resin may be, for example, one of PVC (polyvinyl chloride) and PVDC (polyvinylidene chloride) or a mixture of two or more of them.

The aromatic polyether ketone resin may be, for example, one of PEK (polyetherketone), PEEK (polyetheretherketone), PEKK (polyetherketoneketone), and PEEKK (polyetheretherketoneketone) or a mixture of two or more of them. In accordance with a favorable embodiment of the present technology, the base layer may be formed of PEEK.

The above-mentioned other polymer resins may be, for example, one of PA (polyamide, nylon), aromatic PA (aromatic polyamide, aramid), PI (polyimide), aromatic PI (aromatic polyimide), PAI (polyamideimide), aromatic PAI (aromatic polyamideimide), PBO (polybenzoxazole, e.g. Zylon (registered trademark)), polyether, polyetherester, PES (polyethersulfone), PEI (polyetherimide), PSF (polysulfone), PPS (polyphenylene sulfide), PC (polycarbonate), PAR (polyarylate), and PU (polyurethane) or a mixture of two or more of them.

(Magnetic Layer)

The magnetic layer can be, for example, a perpendicular recording layer. The magnetic layer can contain a magnetic powder. The magnetic layer can further contain, for example, a binder and conductive particles in addition to a magnetic powder. The magnetic layer may further contain, for example, an additive such as a lubricant, an abrasive, and a rust inhibitor as necessary.

An average thickness $t_m$ of the magnetic layer satisfies the relationship of favorably 35 nm $\leq t_m \leq$ 120 nm, more favorably 35 nm $\leq t_m \leq$ 100 nm, and can satisfy the relationship of particularly favorably 35 nm $\leq t_m \leq$ 90 nm. The fact that the average thickness $t_m$ of the magnetic layer is within the above-mentioned numerical range contributes to improvement in the electromagnetic conversion characteristics.

The average thickness $t_m$ of the magnetic layer is obtained as follows. First, the magnetic recording medium is thinly processed perpendicular to the main surface thereof to prepare a test piece, and the cross section of the test piece is observed by using a transmission electron microscope (TEM) under the following conditions.

Apparatus: TEM (H9000NAR manufactured by Hitachi. Ltd.)

Acceleration voltage: 300 kV

Magnification: 100,000

Next, the obtained TEM image is used for measuring the thickness of the magnetic layer at at least 10 or more positions in the longitudinal direction of the magnetic recording medium, and then, the measured values are simply averaged (arithmetic average) to obtain the average thickness $t_m$ (nm) of the magnetic layer.

The magnetic layer is favorably a vertically oriented magnetic layer. In the present specification, the phrase "vertical oriented" represents that a squareness ratio S1 measured in the longitudinal direction (travelling direction) of the magnetic recording medium is 35% or less. The method of measuring the squareness ratio S1 will be separately described below.

Note that the magnetic layer may be a magnetic layer that is in-plane oriented (longitudinal orientation). That is, the magnetic recording medium may be a horizontal recording type magnetic recording medium. However, vertical orientation is more favorable in terms of increasing the recording density.

(Magnetic Powder)

Examples of the magnetic particles forming the magnetic powder contained in the magnetic layer include, but not limited to, epsilon-type iron oxide (ε-iron oxide), gamma hematite, magnetite, chromium dioxide, cobalt-coated iron oxide, hexagonal ferrite, barium ferrite (BaFe), Co ferrite, strontium ferrite, and metal. The above-mentioned magnetic powder may be one of them or may be a combination of two or more of them. Particularly favorably, the magnetic powder can contain an ε-iron oxide magnetic powder, a barium ferrite magnetic powder, a cobalt ferrite magnetic powder, or a strontium ferrite magnetic powder. Note that the ε-iron oxide may contain Ga and/or Al. These magnetic particles may be appropriately selected by those skilled in the art on the basis of, for example, factors such as the method of producing the magnetic layer, the standard of the tape, and the function of the tape.

An average particle size (average maximum particle size) D of the magnetic powder can be favorably 22 nm or less, more favorably 8 nm or more and 22 nm or less, and still more favorably 10 nm or more and 20 nm or less.

The above-mentioned average particle size D of the magnetic powder is obtained as follows. First, the magnetic recording medium to be measured is processed by an FIB (Focused Ion Beam) method or the like to prepare a slice, and the cross section of the slice is observed by a TEM. Next, 500 ε-iron oxide particles are randomly selected from the imaged TEM photograph, and a maximum particle size $d_{max}$ of each of the particles is measured to obtain the particle size distribution of the maximum particle size $d_{max}$ of the magnetic powder. Here, "the maximum particle size $d_{max}$" means the so-called maximum Feret diameter, and specifically the maximum distance among distances between two parallel lines drawn from any angle so as to be in contact with the outline of the ε-iron oxide particle. After that, the median diameter (50% diameter, D50) of the maximum particle size $d_{max}$ from the obtained particle size distribution of the maximum particle size $d_{max}$ is obtained, and this is taken as the average particle size (average maximum particle size) D of the magnetic powder.

The shape of the magnetic particle depends on the crystal structure of the magnetic particle. For example, BaFe and strontium ferrite can have a hexagonal plate shape. The ε-iron oxide can have a spherical shape. The cobalt ferrite can have a cubic shape. The metal can have a spindle shape. These magnetic particles are oriented in the process of producing the magnetic recording medium.

In accordance with one favorable embodiment of the present technology, the magnetic powder can favorably include a powder of nanoparticles (hereinafter, referred to as "ε-iron oxide particle") containing ε-iron oxide. The ε-iron oxide particle is a particle from which a high coercive force can be achieved even in the case where it is a fine particle. It is favorable that the ε-iron oxide contained in the ε-iron oxide particle is crystal oriented preferentially in the thickness direction (vertical direction) of the magnetic recording medium.

The ε-iron oxide particle has a spherical or substantially spherical shape, or has a cubic or substantially cubic shape. Since the ε-iron oxide particle has the shape as described above, in the case of using the ε-iron oxide particle as a magnetic particle, the contact area between the particles in the thickness direction of the medium can be reduced and aggregation of the particles can be suppressed as compared with the case of using a barium ferrite particle having a hexagonal plate shape as a magnetic particle. Therefore, it is possible to enhance the dispersibility of the magnetic powder, and achieve a more favorable SNR (Signal-to-Noise Ratio).

Figure 12:
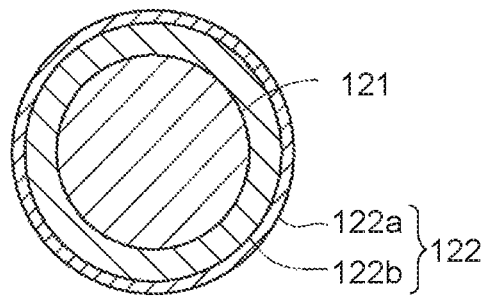
FIG. 12 is a cross-sectional view showing a configuration of magnetic particles.

The ε-iron oxide particle has a core-shell structure. Specifically, as shown in FIG. 12, the ε-iron oxide particle includes a core portion 121, and a shell portion 122 that is provided around the core portion 121 and has a 2-layer structure. The shell portion 122 having the 2-layer structure includes a first shell portion 122a provided on the core portion 121, and a second shell portion 122b provided on the first shell portion 22a.

The core portion 121 contains ε-iron oxide. The ε-iron oxide contained in the core portion 121 favorably has an ε-$Fe_2O_3$ crystal as a main phase, and is more favorably formed of a single phase of ε-$Fe_2O_3$.

The first shell portion 122a covers at least a part of the periphery of the core portion 121. Specifically, the first shell portion 122a may partially cover the periphery of the core portion 121, or may cover the entire periphery of the core portion 121. It is favorable that the entire surface of the core portion 121 is covered from the viewpoint of making the exchange coupling between the core portion 121 and the first shell portion 122a sufficient and improving the magnetic properties.

The first shell portion 122a is a so-called soft magnetic layer, and contains, for example, a soft magnetic material such as α-Fe, an Ni—Fe alloy, and an Fe—Si—Al alloy. α-Fe may be one obtained by reducing ε-iron oxide contained in the core portion 21.

The second shell portion 122b is an oxide coating film as an oxidation prevention layer. The second shell portion 122b contains α-iron oxide, aluminum oxide, or silicon oxide. The α-iron oxide contains, for example, at least one iron oxide of $Fe_3O_4$, $Fe_2O_3$, or FeO. In the case where the first shell portion 122a contains α-Fe (soft magnetic material), the α-iron oxide may be one obtained by oxidizing α-Fe contained in the first shell portion 122a.

Since the ε-iron oxide particle includes the first shell portion 122a as described above, thermal stability can be secured. As a result, the coercive force Hc of the core portion 121 alone can be maintained to a large value and/or a coercive force Hc of the entire ε-iron oxide particle (core-shell particle) can be adjusted to the coercive force Hc suitable for recording. Further, since the ε-iron oxide particle includes the second shell portion 122b as described above, it is possible to prevent the characteristics of the ε-iron oxide particle from being reduced due to occurrence of rust or the like on the particle surface by exposure of the ε-iron oxide particle to the air during and before the process of producing the magnetic recording medium. Therefore, it is possible to suppress characteristic deterioration of the magnetic recording medium.

Figure 13:
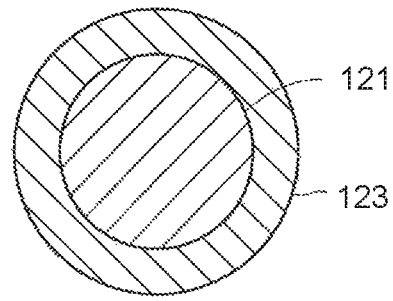
FIG. 13 is a cross-sectional view showing a configuration of magnetic particles in a modified example.

As shown in FIG. 13, the ε-iron oxide particle may include a shell portion 123 having a single-layer structure. In this case, the shell portion 123 has a configuration similar to that of the first shell portion 122a. However, from the viewpoint of suppressing characteristic deterioration of the ε-iron oxide particle, it is more favorable that the ε-iron oxide particle includes the shell portion 122 having the 2-layer structure.

The ε-iron oxide particle may contain an additive instead of the core-shell structure, or may contain an additive while having the core-shell structure. In these cases, some Fe of the ε-iron oxide particle is substituted with the additive.

Since the coercive force Hc of the entire ε-iron oxide particle can be adjusted to the coercive force Hc suitable for recording also by causing the ε-iron oxide particle to contain an additive, it is possible to improve the ease of recording. The additive is a metal element other than iron, favorably a trivalent metal element, and more favorably at least one selected from the group consisting of aluminum (Al), gallium (Ga), and indium (In).

Specifically, the ε-iron oxide containing the additive is an ε-$Fe_{2-x}M_xO_3$ crystal (here, M represents a metal element other than iron, favorably a trivalent metal element, and more favorably at least one selected from the group consisting of Al, Ga, and In. x satisfies the relationship of, for example, 0<x<1).

In accordance with another favorable embodiment of the present technology, the magnetic powder may be a barium ferrite (BaFe) magnetic powder. The barium ferrite magnetic powder contains magnetic particles (hereinafter, referred to as "barium ferrite particles") of iron oxide containing barium ferrite as a main phase. The barium ferrite magnetic powder has high reliability of data recording, e.g., the coercive force does not drop even in a high-temperature and high-humidity environment. From such a viewpoint, the barium ferrite magnetic powder is favorable as the magnetic powder.

The average particle size of the barium ferrite magnetic powder is 50 nm or less, more favorably 10 nm or more and 40 nm or less, and still more favorably 12 nm or more and 25 nm or less.

In the case where the magnetic layer contains a barium ferrite magnetic powder as the magnetic powder, it is favorable that the average thickness $t_m$ [nm] of the magnetic layer satisfies the relationship of 35 nm≤$t_m$≤100 nm. Further, the coercive force Hc measured in the thickness direction (vertical direction) of the magnetic recording medium is favorably 160 kA/m or more and 280 kA/m or less, more favorably 165 kA/m or more and 275 kA/m or less, and still more favorably 170 kA/m or more and 270 kA/m or less.

In accordance with still another favorable embodiment of the present technology, the magnetic powder can be a cobalt ferrite magnetic powder. The cobalt ferrite magnetic powder contains magnetic particles (hereinafter, referred to as "cobalt ferrite magnetic particles") of iron oxide containing cobalt ferrite as a main phase. The cobalt ferrite magnetic particles favorably have uniaxial anisotropy. The cobalt ferrite magnetic particles have, for example, a cubic shape or substantially cubic shape. The cobalt ferrite is cobalt ferrite containing Co. The cobalt ferrite may further contain at least one selected from the group consisting of Ni, Mn, Al, Cu, and Zn, in addition to Co.

The cobalt ferrite has an average composition represented by the following formula (1), for example.

$$Co_xM_yFe_2O_z \quad (1)$$

(however, in the formula (1), M represents, for example, one or more types of metal selected from the group consisting of Ni, Mn, Al, Cu, and Zn. x represents a value satisfying the relationship of 0.4≤x≤1.0. y represents the value satisfying the relationship of 0≤y≤0.3. However, x and y satisfy the relationship of (x+y)≤1.0. z represents a value satisfying the relationship of 3≤z≤4. Some Fe may be substituted with another metal element)

The average particle size of the cobalt ferrite magnetic powder is favorably 25 nm or less, more favorably 23 nm or less. The coercive force Hc of the cobalt ferrite magnetic powder is favorably 2,500 Oe or more, more favorably 2,600 Oe or more and 3,500 Oe or less.

In accordance with still another favorable embodiment of the present technology, the magnetic powder can include a powder of nanoparticles (hereinafter, referred to as "hexagonal ferrite particles") containing hexagonal ferrite. The hexagonal ferrite particle has, for example, a hexagonal plate shape or a substantially hexagonal plate shape. The hexagonal ferrite can contain at least one of favorably Ba, Sr, Pb, or Ca, more favorably at least one of Ba or Sr. The hexagonal ferrite may be specifically barium ferrite or strontium ferrite, for example. The barium ferrite may further contain at least one of Sr, Pb, or Ca, in addition to Ba. The strontium ferrite may further contain at least one of Ba, Pb, or Ca, in addition to Sr.

More specifically, the hexagonal ferrite can have an average composition represented by the general formula $MFe_{12}O_{19}$. Here, M represents, for example, at least one metal of Ba, Sr, Pb, or Ca, favorably at least one metal of Ba or Sr. M may be a combination of Ba and one or more metals selected from the group consisting of Sr, Pb, and Ca. Further, M may be a combination of Sr and one or more metals selected from the group consisting of Ba, Pb, and Ca. In the above-mentioned general formula, some Fe may be substituted with another metal element.

In the case where the magnetic powder includes a powder of the hexagonal ferrite particles, the average particle size of the magnetic powder is favorably 50 nm or less, more favorably 10 nm or more and 40 nm or less, and still more favorably 15 nm or more and 30 nm or less.

(Binder)

As the binder, a resin having a structure obtained by imparting a crosslinking reaction to a polyurethane resin, a vinyl chloride resin, or the like is favorable. However, the binder is not limited to these resins, and another resin may be appropriately formulated in accordance with the physical properties or the like required for the magnetic recording medium. The resin to be formulated is not particularly limited as long as it is a resin generally used in a coating type magnetic recording medium.

Examples of the binder include polyvinyl chloride, polyvinyl acetate, a vinyl chloride-vinyl acetate copolymer, a vinyl chloride-vinylidene chloride copolymer, a vinyl chloride-acrylonitrile copolymer, an acrylate ester-acrylonitrile copolymer, an acrylate ester-vinyl chloride-vinylidene chloride copolymer, a vinyl chloride-acrylonitrile copolymer, an acrylate ester-acrylonitrile copolymer, an acrylate ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, nitrocellulose), a styrene butadiene copolymer, a polyester resin, an amino resin, and synthetic rubber.

Further, a thermosetting resin or a reactive resin may be used as the binder, and examples thereof include a phenol resin, an epoxy resin, a urea resin, a melamine resin, an alkyd resin, a silicone resin, a polyamine resin, and a urea formaldehyde resin.

Further, for the purpose of improving the dispersibility of the magnetic powder, a polar functional group such as —$SO_3M$, —$OSO_3M$, —COOM, and P=O(OM)$_2$ may be introduced into the above-mentioned binders. Here, M in the formula represents a hydrogen atom, or an alkali metal such as lithium, potassium, and sodium.

Further, examples of the polar functional group include a side-chain type one having a terminal group of —NR1R2 or —NR1R2R3$^+$X$^-$, and a main-chain type one represented by >NR1R2$^+$X$^-$. Here, R1, R2, and R3 in the formula each represent a hydrogen atom or a hydrocarbon group, and X$^-$ represents a halogen element ion such as fluorine, chlorine, bromine, and iodine, or an inorganic or organic ion. Further, examples of the polar functional groups also include —OH, —SH, —CN, and an epoxy group.

(Additive)

The magnetic layer may further contain, as non-magnetic reinforcing particles, aluminum oxide (a, (3, or y alumina), chromium oxide, silicon oxide, diamond, garnet, emery, boron nitride, titanium carbide, silicon carbide, titanium carbide, titanium oxide (rutile-type, or anatase-type titanium oxide), or the like.

(Non-Magnetic Layer)

The non-magnetic layer contains a non-magnetic powder and a binder as main components. The non-magnetic layer is referred to also as "underlayer". Description regarding the binder contained in the magnetic layer described above also applies to the binder contained in the non-magnetic layer. The non-magnetic layer may further contain at least one additive of a conductive particle, a lubricant, a curing agent, or a rust inhibitor, as necessary.

The average thickness $t_n$ of the non-magnetic layer is 1.0 μm or less, more favorably 0.9 μm or less, and still more favorably 0.7 μm or less (tn0.7 μm). The average thickness $t_n$ of the non-magnetic layer is, for example, 0.01 μm or more, favorably, 0.02 μm or more, more favorably 0.4 μm or more, and particularly favorably 0.5 μm or more. Note that the average thickness $t_n$ of the non-magnetic layer is obtained in a way similar to that of the average thickness $t_m$ of the magnetic layer. However, the magnification of the TEM image is appropriately adjusted in accordance with the thickness of the non-magnetic layer. The fact that the average thickness $t_n$ of the non-magnetic layer is within the above-mentioned numerical range contributes to an increase in Aw, and makes the magnetic recording medium suitable for use in a recording/reproduction apparatus that adjusts the tension in the longitudinal direction.

(Non-Magnetic Powder)

The non-magnetic powder contained in the non-magnetic layer can contain at least one selected from inorganic particles and organic particles, for example. One type of non-magnetic powder may be used alone, or two or more types of non-magnetic powders may be combined for use. The inorganic particle includes, for example, one selected from a metal, a metal oxide, a metal carbonate, a metal sulfate, a metal nitride, a metal carbide, and a metal sulfide, or a combination of two or more of them. More specifically, the inorganic particle can be, for example, one selected from iron oxyhydroxide, hematite, titanium oxide, and carbon black, or two or more of them. Examples of the shape of the non-magnetic powder include, but not particularly limited to, various shapes such as a needle shape, a spherical shape, a cubic shape, and a plate shape.

The non-magnetic powder contained in the non-magnetic layer favorably includes Fe group-containing non-magnetic particles, more favorably, Fe group-containing non-inorganic particles. Examples of the Fe group-containing non-magnetic particles include iron oxyhydroxide (particularly, goethite) and hematite, and one or them or a combination of two or more of them can be used as the above-mentioned non-magnetic powder.

The non-magnetic powder may be, for example, a combination of hematite and carbon black. The mass ratio of hematite and carbon black can be, for example, 2:1 to 20:1, favorably 5:1 to 15:1, and more favorably 8:1 to 12:1.

The particle volume of the Fe group-containing non-magnetic particles contained in the non-magnetic layer is favorably $4.0\times10^{-5}$ μm$^3$ or less, more favorably $3.0\times10^{-5}$ μm$^3$ or less, still more favorably $2.0\times10^{-5}$ μm$^3$ or less, and even more favorably $1.0\times10^{-5}$ μm$^3$ or less. As the non-magnetic layer is made thinner, the surface property on the magnetic layer side of the magnetic recording medium tends to deteriorate. However, as the particle volume of the non-magnetic powder contained in the non-magnetic layer is reduced, the deterioration of the surface property can be suppressed and Δw can be further increased.

Hereinafter, an example of the method of measuring the particle volume of the Fe group-containing non-magnetic particles will be described step by step.

1. As sample pretreatment, thinning into a slice by an FIB method (μ-sampling method) is performed along the longitudinal direction of the magnetic recording tape.

2. The cross section of the range including the base layer, the non-magnetic layer, and the magnetic layer of the obtained slice sample is observed. This observation is performed using a transmission electron microscope (H-9500 manufactured by Hitachi High-Technologies Corporation) under conditions of the acceleration voltage of 300 kV and the overall magnification of 250,000.

3. In the obtained cross-sectional TEM image, 50 Fe group-containing non-magnetic particles are identified by using a micro-electron diffraction method for the particles contained in the non-magnetic layer. This micro-electron diffraction method is performed using a transmission electron microscope (JEM-ARM200F manufactured by JEOL Ltd.) under the conditions of the acceleration voltage of 200 kV, the camera length of 0.8 m, and the beam diameter of approximately 1 nm Φ.

4. Using the 50 Fe group-containing non-magnetic particles identified as described above, the average particle volume of the Fe group-containing non-magnetic particles is obtained. An average particle volume $V_{ave}$ of the Fe group-containing non-magnetic particles is calculated by the formula of $V_{ave}=(\pi/6)\times DS_{ave}^2 \times DL_{ave}$.

In this regard, first, a major axis length DL and a minor axis length DS of each of the Fe group-containing non-magnetic particles is measured. Here, the major axis length DL means the maximum distance (so-called maximum Feret diameter) among distances between two parallel lines drawn from any angle so as to be in contact with the outline of the particle. Meanwhile, the minor axis length DS means the maximum length among lengths of the particle in the direction perpendicular to the major axis of the particle.

Next, the measured major axis lengths DL of the 50 Fe group-containing non-magnetic particles are simply averaged (arithmetic average) to obtain an average major axis length $DL_{ave}$. The obtained average major axis length $DL_{ave}$ is also referred to as the average particle size of the Fe group-containing non-magnetic particles. Further, the measured minor axis lengths DS of the 50 Fe group-containing non-magnetic particles are simply averaged (arithmetic average) to obtain an average minor axis length $DS_{ave}$.

Finally, the obtained average major axis length $DL_{ave}$ and average minor axis length $DS_{ave}$ described above are substituted into the above-mentioned formula of $V_{ave}$ to obtain $V_{ave}$.

(Back Layer)

The back layer can contain a binder and a non-magnetic powder. The back layer may contain various additives such as a lubricant, a curing agent, and an antistatic agent as necessary. The description of the binder and the non-magnetic powder contained in the underlayer described above also applies to the binder and the non-magnetic powder contained in the back layer.

The average particle size of the inorganic particles contained in the back layer is favorably 10nm or more and 150 nm or less, more favorably 15 nm or more and 110 nm or less. The average particle size of the inorganic particles is obtained in a way similar to that of the average particle size D of the magnetic powder described above.

The average thickness $t_n$ of the back layer is favorably 0.6 μm or less ($t_b \leq 0.6$ μm). In the case where the average thickness $t_n$ of the back layer is within the above-mentioned range, the thickness of the underlayer and the base layer can be kept thick even if the average thickness $t_T$ of the magnetic recording medium is 5.5 μm or less ($t_T \leq 5.5$ μm). As a result, it is possible to maintain the travelling stability of the magnetic recording medium in the recording/reproduction apparatus.

The average thickness $t_b$ of the back layer is obtained as follows. First, a magnetic recording medium having a width of ½ inch is prepared and cut into a length of 250 mm to prepare a sample. Next, the thickness of the sample is measured at five or more different points by using a laser hologauge manufactured by Mitutoyo Corporation as a measurement device, and the measured values are simply averaged (arithmetic average) to calculate the average thickness $t_T$ [μm]. Subsequently, the back layer of the sample is removed with a solvent such as MEK (methyl ethyl ketone), dilute hydrochloric acid, or the like. After that, the thickness of the sample is measured at five or more different points using the above-mentioned laser hologauge again, and the measured values are simply averaged (arithmetic average) to calculate an average value $t_B$ [μm]. After that, the average thickness $t_b$ [μm] of the back layer is obtained using the following formula.

$$t_b[\mu m] = t_T[\mu m] - t_B[\mu m]$$

(3) Physical Properties and Structure (Average Thickness $t_T$ of Magnetic Recording Medium)

The average thickness $t_T$ of the magnetic recording medium is 5.5 μm or less ($t_T \leq 5.5$ μm). In the case where the average thickness $t_T$ of the magnetic recording medium is 5.5 μm or less ($t_T \leq 5.5$ μm), it is possible to increase the recording capacity of one data cartridge as compared with the existing one. The lower limit of the average thickness $t_T$ of the magnetic recording medium is not particularly limited, but is, for example, 3.5 [μm] or more ($3.5[\mu m] \leq t_T$).

The average thickness $t_T$ of the magnetic recording medium is obtained by the method of measuring the average value $t_T$ described in the method of measuring the average thickness $t_n$ of the back layer.

(Dimensional Change Amount Δw)

The dimensional change amount Δw [ppm/N] of the magnetic recording medium in the width direction relative to the tension change of the magnetic recording medium in the longitudinal direction is 660 ppm/N or more (660 ppm/N≤Δw), favorably 670 ppm/N≤Δw, more favorably 680 ppm/N≤Δw, more favorably 700 ppm/N≤Δw, still more favorably 750 ppm/N≤Δw, and particularly favorably 800 ppm/N≤Δw. In the case where the dimensional change amount Δw is less than 660 ppm/N (Δw≤660 ppm/N), there is a possibility that adjusting the tension in the longitudinal direction in the recording/reproduction apparatus is difficult to suppress the width change. The upper limit of the dimensional change amount Δw is not particularly limited, but can be, for example, 1,700,000 ppm/N or less (Δw≤1,700,000 ppm/N), favorably Δw≤20,000 ppm/N, more favorably Δw≤8,000 ppm/N, and still more favorably Δw≤5,000 ppm/N, Δw≤4,000 ppm/N, Δw≤3,000 ppm/N, or Δw≤2,000 ppm/N.

Those skilled in the art are capable of appropriately setting the dimensional change amount Δw. For example, the dimensional change amount Δw can be set to a desired value by selecting the thickness of the base layer and/or the material of the base layer. Further, the dimensional change amount Δw may be set to a desired value by adjusting the stretching strength of the film constituting the base layer in the vertical and horizontal directions, for example. For example, by stretching the film more strongly in the width direction, Δw decreases. Conversely, by stretching the film more strongly in the longitudinal direction, Δw increases.

The dimensional change amount Δw is obtained as follows. First, a magnetic recording medium having a width of ½ inch is prepared and cut into a length of 250 mm to prepare a sample 10S. Next, loads are applied to the sample 10S in the longitudinal direction in the order of 0.2 N, 0.6 N, and 1.0 N, and the width of the sample 10S at loads of 0.2 N, 0.6 N, and 1.0 N is measured. Subsequently, the dimensional change amount Δw is obtained by the following formula. Note that the measurement in the case where the load of 0.6 N is applied is performed for checking whether or not any abnormality has occurred in the measurement (particularly, in order to confirm that these three measurement results are linear), and the measurement result thereof is not used in the following formula.

$$\Delta w[ppm/N] = \frac{D(0.2N)[mm] - D(1.0N)[mm]}{D(0.2N)[mm]} \times \frac{1,000,000}{(1.0[N]) - (0.2[N])} \quad \text{(Math. 1)}$$

(however, in the formula, D (0.2 N) and D (1.0 N) respectively represent the widths of the sample 10S when the loads of 0.2 N and 1.0 N are applied to the sample 10S in the longitudinal direction)

Figure 14:
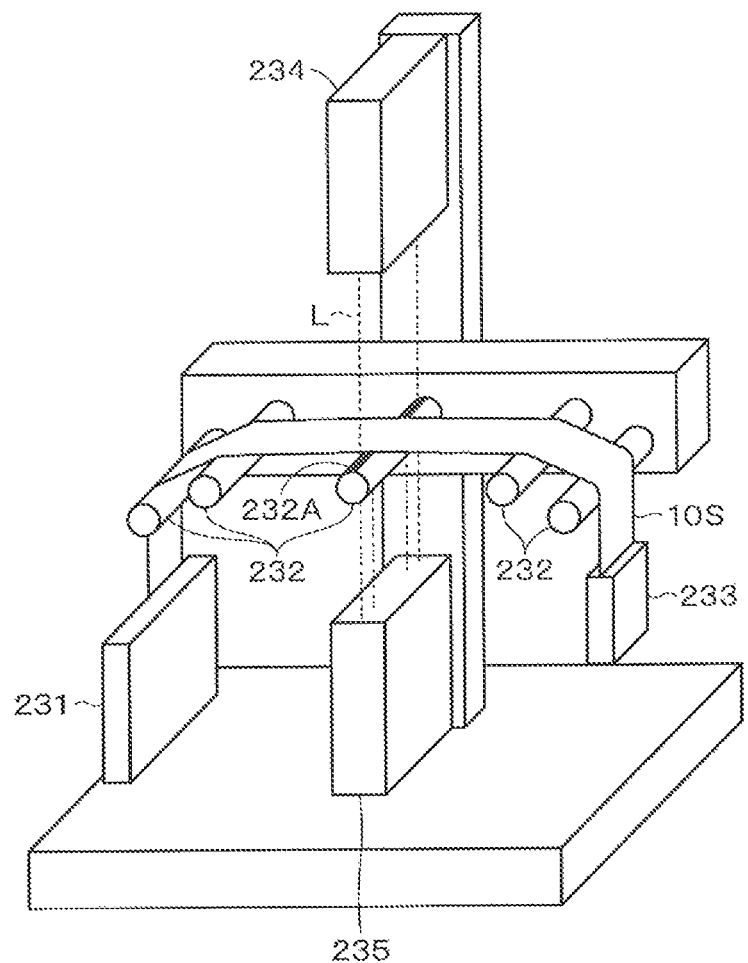
FIG. 14 is a perspective view showing a configuration of a measurement device.

The width of the sample 10S when each load is applied thereto is measured as follows. First, a measurement device shown in FIG. 14 in which a digital dimension measurement device LS-7000 manufactured by KEYENCE CORPORATION has been incorporated is prepared as a measurement device, and the sample 10S is set to this measurement device. Specifically, one end of the elongated sample (magnetic recording medium) 10S is fixed by a fixing portion 231. Next, as shown in FIG. 14, the sample 10S is placed on five substantially cylindrical and rod-shaped support members 232. The sample 10S is placed on these support members so that the back surface of the sample 10S is in contact with the five support members 232. The five support members 232 (particularly, the surfaces thereof) are each formed of stainless steel SUS 304, and the surface roughness Rz (maximum height) is 0.15 μm to 0.3 μm.

Figure 15:
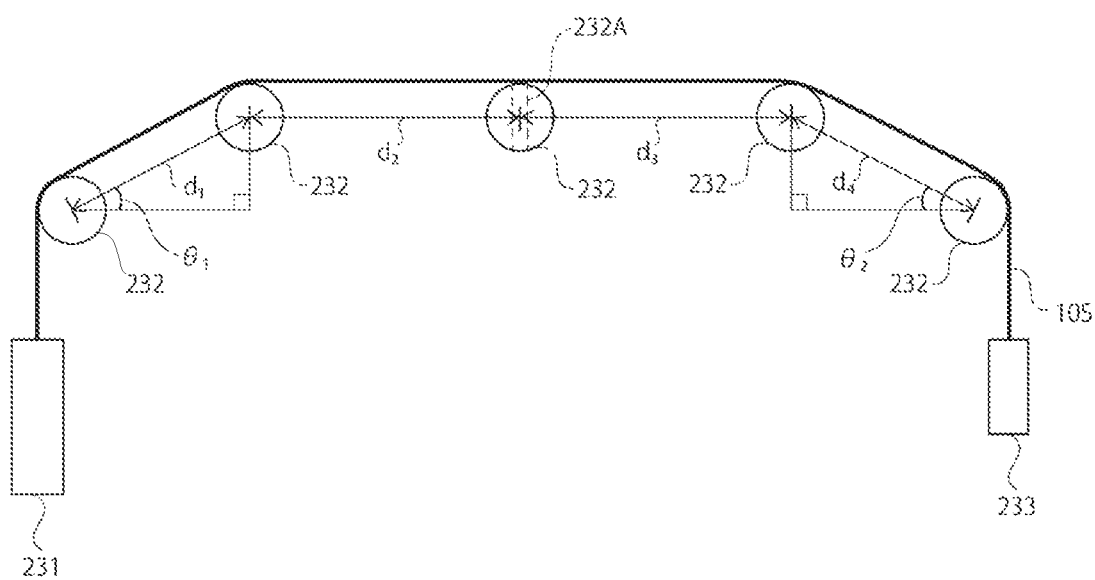
FIG. 15 is a schematic diagram showing details of the measurement device.

Arrangement of the five rod-shaped support members 232 will be described with reference to FIG. 15. As shown in FIG. 15, the sample 10S is placed on the five support members 232. Hereinafter, the five support members 232 will be referred to as "the first support member", "the second support member", "the third support member" (including a slit 232A), "the fourth support member", and "the fifth support member" (closest to a weight 233) from the closest to the fixing portion 231. The diameter of each of the five support members is 7 mm. A distance $d_1$ between the first support member and the second support member (particularly, distance between the centers of the support members) is 20 mm. A distance d2 between the second support member and the third support member is 30 mm. A distance d3 between the third support member and the fourth support member is 30 mm. A distance d4 between the fourth support member and the fifth support member is 20 mm. Further, the second support member, the third support member, and the fourth support member are disposed so that portions of the sample 10S that are placed on these three support members form a plane substantially perpendicular to the direction of gravity. Further, the first support member and the second support member are disposed so that the sample 10S forms an angle of θ1=30° with respect to the above-mentioned substantially perpendicular plane between the first support member and the second support member. Further, the fourth support member and the fifth support member are disposed so that the sample 10S forms an angle of θ2=30° with respect to the above-mentioned substantially perpendicular plane between the fourth support member and the fifth support member.

Further, of the five support members 232, the third support member is fixed so as not to rotate, but all the other four support members are rotatable.

The sample 10S is held on the support members 232 so as not to move in the width direction of the sample 10S. Note that of the support members 232, the support member 232 that is located between a light emitter 234 and a light receiver 235 and located at substantially the center between the fixing portion 231 and a portion applying a load is provided with the slit 232A. Via the slit 232A, a light L is emitted from the light emitter 234 to the light receiver 235. The slit width of the slit 232A is 1 mm, and the light L is capable of passing through the width without being blocked by the frame of the slit 232A.

Subsequently, after housing the measurement device in a chamber controlled in a constant environment of a temperature of 25° C. and a relative humidity of 50%, the weight 233 for applying a load of 0.2 N is attached to the other end of the sample 10S, and the sample 10S is placed in the above-mentioned environment for two hours. After the placement for 2 hours, the width of the sample 10S is measured. Next, the weight for applying a load of 0.2 N is changed to a weight for applying a load of 0.6 N, and the width of the sample 10S is measured five minutes after the change. Finally, the weight is changed to a weight for applying a load of 1.0 N, and the width of the sample 10S is measured five minutes after the change.

By adjusting the weight of the weight 233 as described above, it is possible to change the load to be applied to the sample 10S in the longitudinal direction. The light L is applied from the light emitter 234 to the light receiver 235 in the state where each load is applied, and the width of the sample 10S to which the load has been applied in the longitudinal direction is measured. The measurement of the width is performed in the state where the sample 10S is not curled. The light emitter 234 and the light receiver 235 are those provided in the digital dimension measurement device LS-7000.

(Temperature Expansion Coefficient α)

A temperature expansion coefficient α [ppm/° C.] of the magnetic recording medium is favorably 5.5 ppm/° C. or more and 9 ppm/° C. or less (5.5 ppm/° C.≤α≤9 ppm/° C.), and can be more favorably 5.9 ppm/° C. or more and 8 ppm/° C. or less (5.9 ppm/° C.≤α≤8 ppm/° C.). In the case where the temperature expansion coefficient α is within the above-mentioned range, it is possible to further suppress the change in the width of the magnetic recording medium by adjusting the tension of the magnetic recording medium in the longitudinal direction by the recording/reproduction apparatus.

The temperature expansion coefficient α is obtained as follows. First, the sample 10S is prepared similarly to the method of measuring the dimensional change amount Δw, the sample 10S is set in a measurement device similar to that in the method of measuring the dimensional change amount Δw, and then, the measurement device is housed in a chamber controlled in a constant environment of a temperature of 29° C. and a relative humidity of 24%. Next, a load of 0.2 N is applied to the sample 10S in the longitudinal direction, and the sample 10S is placed in the above-mentioned environment for two hours. After that, the temperature is changed in the order of 45° C., 29° C., and 10° C. while maintaining the relative humidity of 24%, the width of the sample 10S at 45° C., 29° C., and 10° C. is measured, and the temperature expansion coefficient α is obtained by the following formula. The measurement at these temperatures is performed two hours after the temperature reaches the corresponding temperature. Note that the measurement at the temperature of 29° C. is performed for checking whether or not an abnormality has occurred in the measurement (particularly, in order to confirm that these three measurement results are linear), and the measurement result thereof is not used in the following formula.

$$\alpha[ppm/°C] = \frac{D(45°C)[mm]D(10°C)[mm]}{D(10°C)[mm]} \times \frac{1{,}000{,}000}{(45[°C]) - (10[°C])} \quad \text{(Math. 2)}$$

(however, in the formula, D (45° C.) and D (10° C.) respectively represent the width of the sample 10S at the temperatures of 45° C. and 10° C.)

(Humidity Expansion Coefficient β) A humidity expansion coefficient β [ppm/%RH] of the magnetic recording medium is favorably 5.5 ppm/%RH or less ((β≤5.5ppm/%RH), more favorably (β≤5.2ppm/%RH, and can be still more favorably (β≤5.0ppm/%RH. In the case where the humidity expansion coefficient β is within the above-mentioned range, it is possible to further suppress the change in the width of the magnetic recording medium by adjusting the tension of the magnetic recording medium in the longitudinal direction by the recording/reproduction apparatus.

The humidity expansion coefficient β is obtained as follows. First, the sample 10S is prepared similarly to the method of measuring the dimensional change amount Δw, the sample 10S is set in a measurement device similar to that in the method of measuring the dimensional change amount Δw, and then, the measurement device is housed in a chamber controlled in a constant environment of a temperature of 29° C. and a relative humidity of 24%. Next, a load of 0.2 N is applied to the sample 10S in the longitudinal direction, and the sample 10S is placed in the above-mentioned environment for two hours. After that, the relative humidity is changed in the order of 80%, 24%, and 10% while maintaining the temperature of 29° C., the width of the sample 10S at 80%, 24%, and 10% is measured, and the humidity expansion coefficient β is obtained by the following formula. The measurement at these humidities is performed immediately after the humidity reaches the corresponding humidity. Note that the measurement at the humidity of 24% is performed for checking whether or not an abnormality has occurred in the measurement, and the measurement result thereof is not used in the following formula.

$$\beta[ppm/\%\ RH] = \frac{D(80\%)[mm] - D(10\%)[mm]}{D(10\%)[mm]} \times \frac{1{,}000{,}000}{(80[\%]) - (10[\%])} \quad \text{(Math. 3)}$$

(however, in the formula, D (80%) and D (10%) respective represent the width of the sample 10S at the humidities of 80% and 10%)

(Poisson's Ratio ρ)

The Poisson's ratio ρ of the magnetic recording medium is favorably 0.25 or less (0.25≤ρ), more favorably 0.29≤ρ, and can be still more favorably 0.3≤ρ. In the case where the Poisson's ratio ρ is within the above-mentioned range, it is possible to more easily change the width of the magnetic recording medium by adjusting the tension of the magnetic recording medium in the longitudinal direction by the recording/reproduction apparatus.

The Poisson's ratio ρ is obtained as follows. First, a magnetic recording medium having a width of ½ inch is prepared and cut into a length of 150 mm to prepare a sample. After that, a mark having a size of 6 mm×6 mm is applied to the center of the sample. Next, both ends of the sample in the longitudinal direction are chucked so that the distance between chucks is 100 mm, an initial load of 2 N is applied, and the length of the mark of the sample in the longitudinal direction at that time and the width of the mark of the sample in the width direction at that time are respectively taken as the initial length and the initial width. Subsequently, the sample is pulled by an Instron-type universal tensile testing device at a tensile speed of 0.5 mm/min, and the dimensional change amount of each of the length of the mark of the sample in the longitudinal direction and the width of the mark of the sample in the width direction is measured using an image sensor manufactured by KEYENCE CORPORATION. After that, the Poisson's ratio ρ is obtained by the following formula.

$$\rho = \frac{\left\{\dfrac{\text{(Dimensional change amount of mark width [mm])}}{\text{(Initial width [mm])}}\right\}}{\left\{\dfrac{\text{(Dimensional change amount of mark length [mm])}}{\text{(Initial length [mm])}}\right\}} \quad \text{(Math. 4)}$$

(Elastic Limit Value $\sigma_{MD}$ in Longitudinal Direction)

An elastic limit value $\sigma_{MD}$ [N] of the magnetic recording medium in the longitudinal direction is favorably 0.7N or more (0.7N≤$\sigma_{MD}$), more favorably 0.75N≤$\sigma_{MD}$, and can be still more favorably 0.8N≤$\sigma_{MD}$. In the case where the elastic limit value amp is within the above-mentioned range, it is possible to further suppress the change in the width of the magnetic recording medium by adjusting the tension of the magnetic recording medium in the longitudinal direction by the recording/reproduction apparatus. In addition, the drive side can be controlled more easily. The upper limit of the elastic limit value $\sigma_{MD}$ of the magnetic recording medium in the longitudinal direction is not particularly limited, but is, for example, 5.0 N or less ($\sigma_{MD}$≤5.0N). It is favorable that the elastic limit value $\sigma_{MD}$ does not depend on a speed V when elastic limit measurement is performed. This is because in the case where the elastic limit value $\sigma_{MD}$ does not depend on the above-mentioned speed V, it is possible to effectively suppress the change in the width of the magnetic recording medium without being affected by the travelling speed of the magnetic recording medium in the recording/reproduction apparatus or the tension adjusting speed of the recording/reproduction apparatus and the responsibility thereof. The elastic limit value amp is set to a desired value by, for example, selecting curing conditions for the underlayer, the magnetic layer, and the back layer, and/or selecting the material of the base layer 11. For example, as the curing time/curing temperature of a coating material for forming an underlayer, a coating material for forming a magnetic layer, and a coating material for forming a back layer is prolonged/increased, the reaction between the binder and the curing agent contained in each coating material is promoted. As a result, an elastic characteristic is improved, and the elastic limit value a MD is improved.

The elastic limit value $\sigma_{MD}$ is obtained as follows. First, a magnetic recording medium having a width of ½ inch is prepared and cut into a length of 150 mm to prepare a sample. Both ends of the sample in the longitudinal direction are chucked by the universal tensile testing device so that the distance $\lambda_0$ between chucks is 100 mm ($\lambda_0$=100 mm). Next, the sample is pulled at a pulling speed of 0.5 mm/min, and a load σ (N) with respect to the distance λ (mm) between chucks is continuously measured. Subsequently, using the obtained data of λ (mm) and σ (N), the relationship between Δλ (%) and σ (N) is graphed. However, Δλ (%) is given by the following formula.

$$\Delta\lambda(\%) = ((\lambda - \lambda_0)/\lambda_0) \times 100$$

Next, in the above-mentioned graph, a region where the graph is a straight line within the region of σ≥0.2 N is calculated, and the maximum load σ is taken as the elastic limit value $\sigma_{MD}$ (N).

(Friction Coefficient μ between Magnetic Surface and Back Surface)

A friction coefficient μ (hereinafter, referred to also as "interlayer friction coefficient μ") between the surface of the magnetic recording medium on the above-mentioned magnetic layer side and the surface on the above-mentioned back layer is favorably 0.20 or more and 0.80 or less (0.20≤μ≤0.80), more favorably 0.25≤μ≤0.75. In the case where the above-mentioned friction coefficient μ is within the above-mentioned range, the handling property of the magnetic recording medium is improved. For example, in the case where the above-mentioned friction coefficient μ is within the above-mentioned range, it is possible to suppress occurrence of winding deviation when, for example, the magnetic recording medium is wound around a reel (e.g., the tape reel 13 in FIG. 1). More specifically, in the case where the friction coefficient μ is too small (e.g., in the case where μ<0.20), the interlayer friction between the magnetic surface of the outermost portion of the magnetic recording medium that has been wound around the cartridge reel and the back surface of a magnetic recording medium to be newly wound around the outside thereof is extremely low, and the magnetic recording medium to be newly wound is likely to be displaced from the magnetic surface of the outermost portion of the magnetic recording medium that has been wound. Therefore, winding deviation of the magnetic recording medium occurs. Meanwhile, in the case where the friction coefficient μ is too large (e.g., in the case where 0.80<μ), the interlayer friction between the back surface of the magnetic recording medium that is about to be unwound from the outermost periphery of the drive-side reel and the magnetic surface of the magnetic recording medium that is located immediately therebelow and still wound around the drive reel is extremely high, and the above-mentioned back surface and the above-mentioned magnetic surface are attached to each other. Therefore, the operation of the magnetic recording medium travelling toward the cartridge reel becomes unstable. As a result, winding deviation of the magnetic recording medium occurs.

The above-mentioned friction coefficient μ is obtained as follows. First, a magnetic recording medium having a width of ½ inch is wound around a cylinder having a diameter of one inch with the back surface facing up, and the magnetic recording medium is fixed. Next, a magnetic recording medium having a width of ½ inch is caused to be in contact with this cylinder at a holding angle θ(°)=180°+1° to 180°-10° so that the magnetic surface comes into contact therewith this time, one end of the magnetic recording medium is connected to a movable strange gauge, and a tension $T_0$=0.6 (N) is applied to the other end. Strain gauge readings $T_1$ (N) to $T_8$ (N) in each forward path when the movable strain gauge is reciprocated 8 times at 0.5 mm/s are measured, and the average value of $T_4$ to $T_8$ is taken as $T_{ave}$ (N). After that, the friction coefficient μ is obtained by the following formula.

$$\mu = \frac{1}{(\theta[°]) \times (\pi/180)} \times \log_e\left(\frac{T_{ave}[N]}{T_0[N]}\right) \quad \text{(Math. 5)}$$

(Surface Roughness $R_{ab}$ of Back Layer)

The surface roughness $R_{ab}$ [nm] of the back layer (i.e., surface roughness of the back surface) is favorably 3.0 nm or more and 7.3 nm or less (3.0 nm≤$R_{ab}$≤7.3nm), more favorably 3.0nm≤$R_{ab}$≤7.0nm, more favorably 3.0nm≤$R_{ab}$≤6.5nm, and still more favorably 3.0nm≤$R_{ab}$≤6.0nm. In the case where the surface roughness $R_{ab}$ of the back layer is within the above-mentioned range, it is possible to improve the handling property of the magnetic recording medium. Further, it is possible to reduce the influence on the surface of the magnetic layer during winding of the magnetic recording medium, and suppress the adverse effects on the electromagnetic conversion characteristics. Although the handling property and the electromagnetic conversion characteristics are contradictory properties, the surface roughness $R_{ab}$ within the above-mentioned numerical range makes it possible to achieve both of them.

The surface roughness $R_{ab}$ of the back surface is obtained as follows. First, a magnetic recording medium having a width of ½ inch is prepared, and attached to a slide glass with the back surface thereof facing up (i.e., the magnetic surface is attached to the slide glass) to prepare a sample piece. Next, the surface roughness of the back surface of the sample piece is measured by a non-contact roughness meter using the following optical interference.

Device: non-contact roughness meter using optical interference (Non-contact surface/layer cross-sectional shape measurement system VertScan R5500GL-M100-AC manufactured by Ryoka Systems Inc.)

Objective lens: 20 times (approximately 237 μm x 178 μm field of view)

Resolution: 640 points x 480 points

Measurement mode: phase

Wavelength filter: 520 nm

Surface correction: correction on quadratic polynomial approximated surface

The surface roughness is measured at least five points in the longitudinal direction as described above, and then, the average value of the arithmetic average roughnesses Sa (nm) automatically calculated from the surface profiles obtained at the respective positions is taken as the surface roughness $R_{ab}$ (nm) of the back surface.

(Coercive Force Hc)

The coercive force Hc measured in the thickness direction (perpendicular direction) of the magnetic recording medium is favorably 220 kA/m or more and 310 kA/m or less, more favorably 230 kA/m or more and 300 kA/m or less, and still more favorably 240 kA/m or more and 290 kA/m or less. In the case where the coercive force Hc is 220 kA/m or more, since the coercive force Hc is sufficiently high, it is possible to prevent the magnetization signal recorded on the adjacent track from deteriorating due to the leakage magnetic field from the recording head. Therefore, it is possible to achieve a more excellent SNR. Meanwhile, in the case where the coercive force Hc is 310 kA/m or less, since saturation recording by the recording head can be performed more easily, it is possible to achieve a more excellent SNR.

The above-mentioned coercive force Hc is obtained as follows. First, a measurement sample is cut out of the elongated magnetic recording medium, and an M-H loop of the entire measurement sample is measured in the thickness direction of the measurement sample (thickness direction of the magnetic recording medium) by using a vibrating sample magnetometer (VSM). Next, the coating films (underlayer, the magnetic layer, and the like) are wiped by using acetone, ethanol, or the like, leaving only the base layer for back ground correction. The M-H loop is measured in the thickness direction of the base layer (thickness direction of the magnetic recording medium) by using the VSM. After that, the M-H loop of the base layer is subtracted from the M-H loop of the entire measurement sample to obtain the M-H loop after background correction. The coercive force Hc is obtained on the basis of the obtained M-H loop. Note that all of the above-mentioned M-H loops are measured at 25° C. Further, "demagnetizing field correction" when measuring the M-H loop in the thickness direction (vertical direction) of the magnetic recording medium is not performed.

(Ratio R of Coercive Force Hc (50) and Coercive Force Hc (25))

A ratio R (=(Hc (50)/Hc (25))×100) of the coercive force Hc (50) measured in the thickness direction (vertical direction) of the magnetic recording medium at 50° C. and the coercive force Hc (25) measured in the thickness direction of the magnetic recording medium at 25° C. is favorably 95% or more, more favorably 96% or more, still more favorably 97% or more, and particularly favorably 98% or more. In the case where the above-mentioned ratio R is 95% or more, the temperature dependency of the coercive force Hc is reduced, and it is possible to suppress deterioration of SNR under a high temperature environment.

The above-mentioned coercive force Hc (25) is obtained in a way similar to that of the above-mentioned method of measuring the coercive force Hc. Further, the above-mentioned coercive force Hc (50) is obtained in a way similar to that of the above-mentioned method of measuring the coercive force Hc except that the measurement of the M-H loop of each of the measurement sample and the base layer 11 is performed at 50° C.

(Squareness Ratio S1 Measured in Longitudinal Direction)

The squareness ratio S1 measured in the longitudinal direction (travelling direction) of the magnetic recording medium is favorably 35% or less, more favorably 27% or less, and still more favorably 20% or less. In the case where the squareness ratio S1 is 35% or less, since the vertical orientation of the magnetic powder is sufficiently high, it is possible to achieve a more excellent SNR. Therefore, it is possible to achieve more excellent electromagnetic conversion characteristics. Further, the servo signal shape is improved, and the drive side can be controlled more easily.

In the present specification, the phrase "the magnetic recording medium is vertically oriented" can mean that the squareness ratio S1 of the magnetic recording medium is within the above-mentioned numerical range (e.g., 35% or less). The magnetic recording medium according to the present technology is favorably vertically oriented.

The above-mentioned squareness ratio S1 is obtained as follows. First, a measurement sample is cut out of the elongated magnetic recording medium, and the M-H loop of the entire measurement sample corresponding to the longitudinal direction (travelling direction) of the magnetic recording medium is measured using a VSM. Next, the coating films (underlayer, the magnetic layer, and the like) are wiped by using acetone, ethanol, or the like, leaving only the base layer for back ground correction. The M-H loop of the base layer corresponding to the longitudinal direction of the base layer (travelling direction of the magnetic recording medium) is measured using the VSM. After that, the M-H loop of the base layer 11 is subtracted from the M-H loop of the entire measurement sample to obtain the M-H loop after background correction. Saturation magnetization Ms (emu) and residual magnetization Mr (emu) of the obtained M-H loop are substituted into the following formula to obtain the squareness ratio S1(%). Note that all of the above-mentioned M-H loops are measured at 25° C.

Squareness ratio S1(%)=(Mr/Ms)×100

(Squareness Ratio S2 Measured in Vertical Direction)

The squareness ratio S2 measured in the vertical direction (thickness direction) of the magnetic recording medium is favorably 65% or more, more favorably 73% or more, and still more favorably 80% or more. In the case where the squareness ratio S2 is 65% or more, since the vertical orientation of the magnetic powder is sufficiently high, it is possible to achieve a more excellent SNR. Therefore, it is possible to achieve more excellent electromagnetic conversion characteristics. Further, the servo signal shape is improved, and the drive side can be controlled more easily.

In the specification, the phrase "the magnetic recording medium is vertically oriented" may mean that the squareness ratio S2 of the magnetic recording medium is within the above-mentioned numerical range (e.g., 65% or more).

The squareness ratio S2 is obtained in a way similar to that of the squareness ratio S1 except that the M-H loop is measured in the vertical direction (thickness direction) of the magnetic recording medium and the base layer. Note that in the measurement of the squareness ratio S2, "demagnetizing field correction" when measuring the M-H loop in the vertical direction of the magnetic recording medium is not performed.

The squareness ratios S1 and S2 are set to desired values by adjusting, for example, the strength of the magnetic field to be applied to the coating material for forming a magnetic layer, the application time of the magnetic field for the coating material for forming a magnetic layer, the dispersion state of the magnetic powder in the coating material for forming a magnetic layer, or the concentration of solids in the coating material for forming a magnetic layer. Specifically, for example, as the strength of the magnetic field increases, the squareness ratio S1 decreases whereas the squareness ratio S2 increases. Further, as the application time of the magnetic field is prolonged, the squareness ratio S1 decreases whereas the squareness ratio S2 increases. Further, as the dispersion state of the magnetic powder is improved, the squareness ratio S1 decreases whereas the squareness ratio S2 increases. Further, as the concentration of the solids decreases, the squareness ratio S1 decreases whereas the squareness ratio S2 increases. Note that any of the above-mentioned adjustment methods may be used alone or two or more of them may be used in combination.

(SFD)

Figure 16:
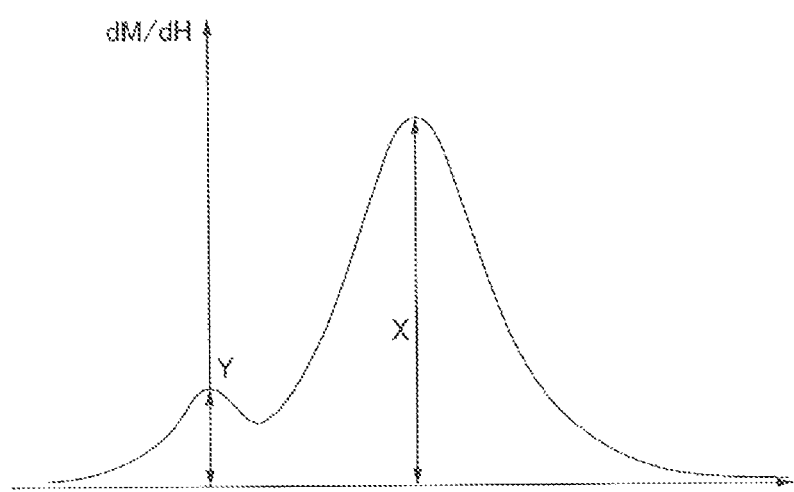
FIG. 16 is a graph showing an example of an SFD curve.
Mode(s) for Carrying Out the Invention Hereinafter, an embodiment of the present technology will be described with reference to the drawings.
<Overall System Configuration and Configurations of Respective Units>

In the SFD (Switching Field Distribution) curve of the magnetic recording medium, a peak ratio X/Y between a main peak height X and a sub-peak height Y near the zero magnetic field is favorably 3.0 or more, more favorably 5.0 or more, still more favorably 7.0 or more, particularly favorably 10.0 or more, and most favorably 20.0 or more (see FIG. 16). In the case where the peak ratio X/Y is 3.0 or more, it is possible to prevent the magnetic powder from containing a low coercive force component (e.g., soft magnetic particle or super paramagnetic particle) peculiar to ε-iron oxide a lot in addition to the ε-iron oxide particles that contribute to actual recording. Therefore, since deterioration of the magnetization signal recorded in the adjacent track due to the leakage magnetic field from the recording head can be suppressed, it is possible to achieve a more excellent SNR. The upper limit of the peak ratio X/Y is not particularly limited, but is, for example, 100 or less.

The above-mentioned peak ratio X/Y is obtained as follows. First, similarly to the above-mentioned method of measuring the coercive force Hc, the M-H loop after background correction is obtained. Next, an SFD curve is calculated on the basis of the obtained M-H loop. For the calculation of the SFD curve, a program attached to the measurement device may be used, or another program may be used. Assumption is made that the absolute value of the point at which the calculated SFD curve crosses the Y axis (dM/dH) is "Y" and the height of the main peak seen in the vicinity of the coercive force Hc in the M-H loop is "X", and the peak ratio X/Y is calculated. Note that the measurement of the M-H loop is performed at 25° C. similarly to the above-mentioned method of measuring the coercive force Hc. Further, "demagnetizing field correction" when measuring the M-H loop in the thickness direction (vertical direction) of the magnetic recording medium is not performed.

(Activation Volume $V_{act}$)

An activation volume $V_{act}$ is favorably 8,000 nm$^3$ or less, more favorably 6,000 nm$^3$ or less, still more favorably 5,000 nm$^3$ or less, particularly favorably 4,000 nm$^3$ or less, and most favorably 3,000 nm$^3$ or less. In the case where the activation volume $V_{act}$ is 8000 nm$^3$ or less, since the dispersion state of the magnetic powder is improved, the bit inversion region can be reduced, and it is possible to prevent the magnetization signal recorded in the adjacent track from being deteriorated due to the leakage magnetic field from the recording head. Therefore, there is a possibility that a more excellent SNR cannot be achieved.

The above-mentioned activation volume $V_{act}$ is obtained by the following formula derived by Street&Woolley.

$$V_{act}(nm^3) = k_B \times T \times X_{irr}/(\mu_0 \times Ms \times S)$$

(where $k_B$: Boltzmann's constant (1.38×10$^{-23}$ J/K), T: temperature (K), $X_{irr}$: irreversible magnetic susceptibility, $\mu_0$: vacuum permeability, S: magnetic viscosity coefficient, Ms: saturation magnetization (emu/cm$^3$))

The irreversible magnetic susceptibility $X_{irr}$, the saturation magnetization Ms, and the magnetic viscosity coefficient S to be substituted into the above-mentioned formula are obtained as follows by using VSM. Note that the measurement direction by VSM is assumed to be the thickness direction (vertical direction) of the magnetic recording medium. Further, the measurement by VSM is performed on the measurement sample cut out from the elongated magnetic recording medium at 25° C. Further, "demagnetizing field correction" when measuring the M-H loop in the thickness direction (vertical direction) of the magnetic recording medium is not performed.

(Irreversible Magnetic Susceptibility $X_{irr}$)

The irreversible magnetic susceptibility $X_{irr}$ is defined as the slope in the vicinity of a residual coercive force Hr in the slope of the residual magnetization curve (DCD curve). First, a magnetic field of −1193 kA/m (15 kOe) is applied to the entire magnetic recording medium, and the magnetic field is returned to zero, thereby achieving a residual magnetization state. After that, a magnetic field of approximately 15.9 kA/m (200 Oe) is applied in the opposite direction, the magnetic field is returned to zero again, and the amount of residual magnetization is measured. After that, similarly, the measurement in which a magnetic field of 15.9 kA/m larger than the previous applied magnetic field is applied and the magnetic field is returned to zero is repeated, and the amount of residual magnetization is plotted against the applied magnetic field to measure the DCD curve. A point at which the amount of magnetization is zero in the obtained DCD curve is taken as the residual coercive force Hr, and the DCD curve is differentiated to obtain the slope of the DCD curve in each magnetic field. In the slope of the DCD curve, the slope near the residual coercive force Hr is $X_{irr}$.

(Saturation Magnetization Ms)

First, the M-H loop of the entire magnetic recording medium (measurement sample) is measured in the thickness direction of the magnetic recording medium. Next, the coating films (underlayer, the magnetic layer, and the like) are wiped by using acetone, ethanol, or the like, leaving only the base layer for back ground correction. The M-H loop of the base layer is measured in the thickness direction similarly. After that, the M-H loop of the base layer is subtracted from the M-H loop of the entire magnetic recording medium, and thus, the M-H loop after background correction is obtained. On the basis of the value of a saturation magnetization Ms (emu) of the obtained M-H loop and the volume (cm$^3$) of the magnetic layer in the measurement sample, Ms (emu/cm$^3$) is calculated. Note that the volume of the magnetic layer is obtained by multiplying the area of the measurement sample by the average thickness of the magnetic layer.

(Magnetic Viscosity Coefficient S)

First, a magnetic field of −1,193 kA/m (15 kOe) is applied to the entire magnetic recording medium (measurement sample), and the magnetic field is returned to zero, thereby achieving a residual magnetization state. After that, a magnetic field having a value similar to that of the residual coercive force Hr obtained from the DCD curve is applied in the opposite direction. In the state where the magnetic field is applied, the amount of magnetization is continuously measured at constant time intervals for 1,000 seconds. The relationship between a time t and a magnetization amount M(t) thus obtained is compared with the following formula to calculate the magnetic viscosity coefficient S.

$$M(t)=M0+S \times ln(t)$$

(where M(t): magnetization amount at time t, M0: initial magnetization amount, S: magnetic viscosity coefficient, ln(t): natural logarithm of time)

(Arithmetic Average Roughness Ra)

An arithmetic average roughness Ra of the magnetic surface is favorably 2.5 nm or less, more favorably 2.0 nm or less. In the case where Ra is 2.5 nm or less, it is possible to achieve a more excellent SNR.

The above-mentioned arithmetic average roughness Ra is obtained as follows. First, the surface on the side where the magnetic layer is provided is observed using an AFM (Atomic Force Microscope) (manufactured by Bruker, Dimension Icon) to obtain a cross-sectional profile. Next, on the basis of the obtained cross-sectional profile, the arithmetic average roughness Ra is obtained in accordance with JIS B0601:2001.

(4) Method of Producing Magnetic Recording Medium

Next, the method of producing the magnetic recording medium having the above-mentioned configuration will be described. First, a non-magnetic powder, a binder, and the like are kneaded and/or dispersed in a solvent to prepare a coating material for forming an underlayer. Next, a magnetic powder, a binder, and the like are kneaded and/or dispersed in a solvent to prepare a coating material for forming a magnetic layer. For the preparation of the coating material for forming a magnetic layer and the coating material for forming an underlayer, for example, the following solvents, dispersing devices, and kneading devices can be used.

Examples of the solvent used for preparing the above-mentioned coating material include: ketone solvents such as acetone, methyl ethyl ketone, methyl isobutyl ketone, and cyclohexanone; alcohol solvents such as methanol, ethanol, and propanol; ester solvents such as methyl acetate, ethyl acetate, butyl acetate, propyl acetate, ethyl lactate, and ethylene glycol acetate; ether solvents such as diethylene glycol dimethyl ether, 2-ethoxyethanol, tetrahydrofuran, and dioxane; aromatic hydrocarbon solvents such as benzene, toluene, and xylene; and halogenated hydrocarbon solvents such as methylene chloride, ethylene chloride, carbon tetrachloride, chloroform, and chlorobenzene. One of these may be used alone, or a mixture of two or more of them may be used.

As the above-mentioned kneading device used for preparing a coating material, for example, a kneading device such as a continuous twin-screw kneader, a continuous twin-screw kneader capable of performing dilution in multi-stages, a kneader, a pressure kneader, and a roll kneader can be used. However, the present technology is not particularly limited to these devices. Further, as the above-mentioned dispersing device used for preparing a coating material, for example, a dispersing device such as a roll mill, a ball mill, a horizontal sand mill, a vertical sand mill, a spike mill, a pin mill, a tower mill, a pearl mill (e.g., "DCP mill" manufactured by Nippon Eirich Co., Ltd.) a homogenizer, and an ultrasonic dispersion machine can be used. However, the present technology is not particularly limited these devices.

Next, the coating material for forming an underlayer is coated on one main surface of the base layer and dried to form an underlayer. Subsequently, the coating material for forming a magnetic layer is coated on the underlayer and dried to form a magnetic layer on the underlayer. Note that during drying, the magnetic field of the magnetic powder is oriented in the thickness direction of the base layer by, for example, a solenoid coil. Further, during drying, after the magnetic field of the magnetic powder may be oriented in the longitudinal direction (travelling direction) of the base layer by, for example, a solenoid coil, the magnetic field of the magnetic powder may be oriented in the thickness direction of the base layer. After forming the magnetic layer, a back layer is formed on the other main surface of the base layer. As a result, a magnetic recording medium is obtained.

After that, the obtained magnetic recording medium is rewound into a large diameter core, and curing treatment is performed thereon. Finally, calendaring treatment is performed on the magnetic recording medium, and then, it is cut into a predetermined width (e.g., width of ½ inch). In this way, a target elongated magnetic recording medium is obtained.

(5) Examples

Hereinafter, the present technology will be specifically described by way of Examples. However, the present technology is not limited to only these Examples.

In the following Examples and Comparative Examples, the average thickness $t_T$ of the magnetic recording tape as a magnetic recording medium, the dimensional change amount $\Delta w$ in the width direction of the magnetic recording tape relative to the tension change in the magnetic recording tape in the longitudinal direction, the temperature expansion coefficient $\alpha$ of the magnetic recording tape, the humidity expansion coefficient $\beta$ of the magnetic recording tape, the Poisson's ratio $\rho$ of the magnetic recording tape, the elastic limit value $\sigma_{MD}$ of the magnetic recording tape in the longitudinal direction, the average thickness $t_m$ of the magnetic layer, the squareness ratio S2, the average thickness $t_n$ of the back layer, the surface roughness $R_{ab}$ of the back layer, and the interlayer friction coefficient $\mu$ between the magnetic surface and the back surface have values obtained by the measurement methods described in the above-mentioned embodiment. However, as will be described below, in Example 11, the speed V when measuring the elastic limit value $\sigma_{MD}$ in the longitudinal direction has a value different from that in the measurement method described in the above-mentioned embodiment.

Example 1

(Step of Preparing Coating Material for Forming Magnetic Layer)

A coating material for forming a magnetic layer was prepared as follows. First, a first composition having the following formulation was kneaded by an extruder. Next, the kneaded first composition and a second composition having the following formulation were added to a stirring tank including a dispersing device, and, premixed. Subsequently, further sand mill mixing was performed, and filter treatment was performed to prepare a coating material for forming a magnetic layer.

(First Composition)
Powder of ε-iron oxide nanoparticles (ε-$Fe_2O_3$ crystal particles): 100 parts by mass
Vinyl chloride resin (Cyclohexanone solution 30 mass %): 10 parts by mass
(Degree of polymerization 300, Mn=10,000, containing $OSO_3K$=0.07 mmol/g and secondary OH=0.3 mmol/g as polar groups)
Aluminum oxide powder: 5 parts by mass
($\alpha$-$Al_2O_3$, average particle diameter 0.2 μm)
Carbon black: 2 parts by mass
(Manufactured by TOKAI CARBON CO., LTD., trade name: SEAST TA)
(Second Composition)
Vinyl chloride resin: 1.1 parts by mass
(Resin solution: resin content 30 mass %, cyclohexanone 70 mass %)
n-butyl stearate: 2 parts by mass
Methyl ethyl ketone: 121.3 parts by mass
Toluene: 121.3 parts by mass
Cyclohexanone: 60.7 parts by mass
Finally, as curing agents, polyisocyanate (trade name: Coronate L manufactured by Nippon Polyurethane Industry Co., Ltd.): 4 parts by mass and myristic acid: 2 parts by mass were added to the coating material for forming a magnetic layer prepared as described above.

(Step of Preparing Coating Material for Forming Underlayer)

The coating material for forming an underlayer was prepared as follows. First, a third composition having the following formulation was kneaded by an extruder. Next, the kneaded third composition and a fourth composition having the following formulation were added to a stirring tank including a dispersion device, and premixed. Subsequently, further sand mill mixing was performed, and filter treatment was performed to prepare a coating material for forming an underlayer.

(Third Composition)
Acicular iron oxide powder: 100 parts by mass
($\alpha$-$Fe_2O_3$, average major axis length 0.15 μm)
Vinyl chloride resin: 55.6 parts by mass
(Resin solution: resin content 30 mass %, cyclohexanone 70 mass %)
Carbon black: 10 parts by mass
(Average particle diameter 20 nm)
(Fourth Composition)
Polyurethane resin UR 8200 (manufactured by TOYOBO CO., LTD.): 18.5 parts by mass
n-butyl stearate: 2 parts by mass
Methyl ethyl ketone: 108.2 parts by mass
Toluene: 108.2 parts by mass
Cyclohexanone: 18.5 parts by mass
Finally, as curing agents, polyisocyanate (trade name: Coronate L manufactured by Nippon Polyurethane Industry Co., Ltd.): 4 parts by mass and myristic acid: 2 parts by mass were added to the coating material for forming an underlayer prepared as described above.

(Step of Preparing Coating Material for Forming Back Layer)

A coating material for forming a back layer was prepared as follows. The following raw materials were mixed in a stirring tank including a dispersion device, and filter treatment was performed to prepare the coating material for forming a back layer.

Carbon black (manufactured by ASAHI CARBON CO., LTD, trade name: #80): 100 parts by mass
Polyester polyurethane: 100 parts by mass
(Manufactured by Nippon Polyurethane Industry Co., Ltd., trade name: N-2304)
Methyl ethyl ketone: 500 parts by mass
Toluene: 400 parts by mass
Cyclohexanone: 100 parts by mass (Deposition Step)

By using the coating material prepared as described above, an underlayer having an average thickness of 1.0 μm and a magnetic layer having the average thickness $t_m$ of 90 nm were formed on an elongated polyethylene naphthalate film (hereinafter, referred to as "PEN film") that is a non-magnetic support as follows. First, the coating material for forming an underlayer was coated on the film and dried to form an underlayer on the film. Next, the coating material for forming a magnetic layer was coated on the underlayer and dried to form a magnetic layer on the underlayer. Note that during drying of the coating material for forming a magnetic layer, the magnetic field of the magnetic powder was oriented in the thickness direction of the film by a solenoid coil. Further, the application time of the magnetic field for the coating material for forming a magnetic layer was adjusted to set the squareness ratio S2 in the thickness direction (vertical direction) of the magnetic recording tape to 65%.

Subsequently, a back layer having the average thickness $t_b$ of 0.6 μm was coated on the film in which the underlayer and the magnetic layer had been formed, and dried. Then, curing treatment was performed on the film in which the underlayer, the magnetic layer, and the back layer had been formed. Subsequently, calendaring treatment was performed to smooth the surface of the magnetic layer. At this time, after adjusting the conditions (temperature) of the calendaring treatment so that the interlayer friction coefficient μ between the magnetic surface and the back surface was approximately 0.5, re-curing treatment was performed to obtain a magnetic recording tape having the average thickness $t_T$ of 5.5 μm.

(Step of Cutting)

The magnetic recording tape obtained as described above was cut into a width of ½ inch (12.65 mm), and wound around a core to obtain a pancake.

The magnetic recording tape obtained as described above had the characteristics shown in Table 1. For example, the dimensional change amount Δw of the magnetic recording tape was 705 ppm/N.

Example 2

A magnetic recording tape was obtained in the same way as that in Example 1 except that the thickness of the PEN film was made thinner than that in Example 1 so that the dimensional change amount Δw was 750 ppm/N. The average thickness of the magnetic recording tape was 5 μm.

Example 3

A magnetic recording tape was obtained in the same way as that in Example 1 except that the thickness of the PEN film was made thinner than that in Example 1 so that the dimensional change amount Δw was 800 ppm/N and the average thickness of each of the back layer and the underlayer was made thinner. The average thickness of the magnetic recording tape was 4.5 μm. Further, since the back layer was made thinner, the surface roughness $R_{ab}$ of the back layer increased.

Example 4

A magnetic recording tape was obtained in the same way as that in Example 1 except that the thickness of the PEN film was made thinner than that in Example 1 so that the dimensional change amount Δw was 800 ppm/N, the average thickness of each of the back layer and the underlayer was made thinner, and the conditions for the curing treatment on the film in which the underlayer, the magnetic layer, and the back layer had been formed were adjusted.

Example 5

A magnetic recording tape was obtained in the same way as that in Example 4 except that the composition of the coating material for forming an underlayer was changed so that the temperature expansion coefficient α was 8 ppm/° C.

Example 6

A magnetic recording tape was obtained in the same way as that in Example 4 except that thin barrier layers were formed on both surfaces of the PEN film so that the humidity expansion coefficient β was 3 ppm/%RH, and the average thickness of the underlayer was made thicker. The average thickness of the magnetic recording tape was 4.6 μm.

Example 7

A magnetic recording tape was obtained in the same way as that in Example 4 except that the composition of the coating material for forming a back layer was changed so that the Poisson's ratio ρ was 0.31.

Example 8

A magnetic recording tape was obtained in the same way as that in Example 4 except that the composition of the coating material for forming a back layer was changed so that the Poisson's ratio ρ was 0.35.

Example 9

A magnetic recording tape was obtained in the same way as that in Example 7 except that the curing conditions of the film in which the underlayer, the magnetic layer, and the back layer had been formed were adjusted so that the elastic limit value a MD in the longitudinal direction was 0.8 N.

Example 10

A magnetic recording tape was obtained in the same way as that in Example 7 except that the curing conditions and the re-curing conditions of the film in which the underlayer, the magnetic layer, and the back layer had been formed were adjusted so that the elastic limit value amp in the longitudinal direction was 3.5 N.

Example 11

A magnetic recording tape was obtained in a way similar to that in Example 9. Then, the speed V when measuring the elastic limit value $\sigma_{MD}$ in the longitudinal direction was changed to 5 mm/min, and the elastic limit value a MD of the obtained magnetic recording tape was measured. As a result, the elastic limit value $\sigma_{MD}$ in the longitudinal direction was 0.8, i.e., was not changed as compared with the elastic limit value $\sigma_{MD}$ in the longitudinal direction in which the above-mentioned speed V was 0.5 mm/min (Example 9).

Example 12

A magnetic recording tape was obtained in the same way as that in Example 7 except that the coating thickness of the coating material for forming a magnetic layer was changed so that the average thickness $t_m$ of the magnetic layer was 40 nm. The average thickness of the magnetic recording tape was 4.4 μm.

Example 13

A magnetic recording tape was obtained in the same way as that in Example 7 except that the average thickness of each of the back layer and the underlayer was made thinner. The average thickness of the magnetic recording tape was 4.4 μm.

Example 14

A magnetic recording tape was obtained in the same way as that in Example 7 except that the surface roughness $R_{ab}$ of the back layer was reduced to 3.2 nm and the friction coefficient μ was increased.

Example 15

A magnetic recording tape was obtained in the same way as that in Example 7 except that the coating thickness of the coating material for forming a magnetic layer was changed so that the average thickness $t_m$ of the magnetic layer was 110 nm.

Example 16

A magnetic recording tape was obtained in the same way as that in Example 7 except that the surface roughness $R_{ab}$ of the base layer was increased and the friction coefficient μ was reduced.

Example 17

A magnetic recording tape was obtained again in the same way as that in Example 7 except that the friction coefficient μ was reduced to 0.18.

Example 18

A magnetic recording tape was obtained again in the same way as that in Example 7 except that the friction coefficient μ was increased to 0.82.

Example 19

A magnetic recording tape was obtained in the same way as that in Example 7 except that the application time of the magnetic field for the coating material for forming a magnetic layer was adjusted to set the squareness ratio S2 in the thickness direction (vertical direction) of the magnetic recording tape to 73%.

Example 20

A magnetic recording tape was obtained in the same way as that in Example 7 except that the application time of the magnetic field for the coating material for forming a magnetic layer was adjusted to set the squareness ratio S2 in the thickness direction (vertical direction) of the magnetic recording tape to 80%.

Example 21

A magnetic recording tape was obtained in the same way as that in Example 7 except that the curing conditions and the re-curing conditions of the film in which the underlayer, the magnetic layer, and the back layer had been formed were adjusted so that the elastic limit value $\sigma_{MD}$ in the longitudinal direction was 5.0 N.

Example 22

A magnetic recording tape was obtained in the same way as that in Example 7 except that barium ferrite ($BaFe_{12}O_{19}$) nanoparticles were used instead of the ε-iron oxide nanoparticles and the amount of the vinyl chloride resin of the first composition was changed to 30 parts by mass.

Example 23

A magnetic recording tape was obtained in the same way as that in Example 1 except that the thickness of the back layer and the thickness of the underlayer were reduced. The average thickness of the magnetic recording tape was 5.0 μm. The dimensional change amount Δw of the magnetic recording tape was 800 ppm/N.

Example 24

A magnetic recording tape was obtained in the same way as that in Example 1 except that barium ferrite ($BaFe_{12}O_{19}$) nanoparticles were used instead of the ε-iron oxide nanoparticles, the amount of the vinyl chloride resin of the first composition was changed to 30 parts by mass, and the thickness of the PEN film, the thickness of the back layer, and the thickness of the underlayer were reduced. The average thickness of the magnetic recording tape was 5.0 μm. The dimensional change amount Δw of the magnetic recording tape was 800 ppm/N.

Comparative Example 1

A magnetic tape was obtained in the same way as that in Example 1 except that the tensilizing of the PEN film was changed so that the dimensional change amount Δw was 650 [ppm/N].

Comparative Example 2

A magnetic recording tape was obtained in the same way as that in Example 24 except that the PEN film in which the stretching strength in the width direction had been increased was used instead of the PEN film used in Example 24 and the thickness of the underlayer was increased. By changing the above-mentioned PEN film, the dimensional change amount Δw was reduced as compared with the magnetic recording tape in Example 24. The dimensional change amount Δw of the magnetic recording tape in Comparative Example 2 was 630 ppm/N. The average thickness of the magnetic recording tape was 5.7 μm.

Comparative Example 3

A magnetic recording tape was obtained in the same way as that in Example 24 except that the PEN film in which the stretching strength in the width direction had been increased was used instead of the PEN film used in Example 24 and the thickness of the underlayer was slightly increased. By changing the above-mentioned PEN film, the dimensional change amount Δw was significantly reduced as compared with the magnetic recording tape in Example 24. The dimensional change amount Δw of the magnetic recording tape in Comparative Example 3 was 500 ppm/N. The average thickness of the magnetic recording tape was 6.5 μm.

(Judgment of Change Amount in Tape Width)

First, a cartridge sample in which a magnetic recording tape having a width of ½ inch had been incorporated was prepared. The cartridge sample contained the above-mentioned magnetic recording tape wound around a reel provided in a cartridge case. Note that on the magnetic recording tape, two or more columns of magnetic patterns having an inverted v shape ware recorded at known intervals with each other (hereinafter, referred to as "known intervals between the magnetic pattern columns when recorded in advance") in parallel in the longitudinal direction in advance. Next, the cartridge sample was caused to reciprocate in a recording/reproduction apparatus. Then, during the reciprocating travelling, the above-mentioned two or more columns of magnetic patterns having an inverted v shape were simultaneously reproduced and the intervals between the magnetic pattern columns during travelling were continuously measured on the basis of the shape of the reproduction waveform of each of the columns. Note that during travelling, rotation driving of a spindle drive device and a reel drive device was controlled on the basis of information regarding the measured intervals between magnetic pattern columns and the tension of the magnetic recording tape in the longitudinal direction was automatically adjusted so that the intervals between the magnetic pattern columns were equal to a specified width or substantially a specified width. The value obtained by simply averaging all the measured values for one reciprocation of the intervals between the magnetic pattern columns was taken as the "measured intervals of the magnetic patterns", and the difference between this value and the "known intervals between the magnetic pattern columns when recorded in advance" was taken as the "change in tape width".

Further, the reciprocating travelling by the recording/reproduction apparatus was performed in a thermo-hygrostat. The speed of the reciprocating travelling was 5 m/sec. The temperature and humidity during the reciprocating travelling were gradually and repeatedly changed within the temperature range of 10° C. to 45° C. and the relative humidity range of 10% to 80% in accordance with a preset environment change program (e.g., 10° C. 10%, 29° C. 80%, and then 10° C. 10% are repeated twice. Changed from 10° C. 10% to 29° C. 80% in two hours and 29° C. 80% to 10° C. 10% in two hours) independently of the above-mentioned reciprocating travelling.

This evaluation was repeated until the "preset environment change program" was completed. After the evaluation is completed, an average value (simple average) was calculated using all the absolute values of the "change in tape width" obtained at each reciprocation, and the values were taken as the "effective change amount of the tape width" of the tape. Judgment according to the deviation of this "effective change amount of the tape width" from the ideal (the smaller, the better) was performed for each tape, and eight levels of judgment values were given. Note that the evaluation "8" indicates the most desirable judgment result, and the evaluation "1" indicates the least desirable judgment result. The following states of the magnetic tape with any of the above-mentioned eight levels of evaluation are observed during tape travelling.

8: No abnormality occurs

7: A slight increase in the error rate is observed during travelling

6: A severe increase in the error rate is observed during travelling

5: A servo signal cannot be read and a slight (one or two times) reload is performed during travelling 4: A servo signal cannot be read and a medium (10 times or less) reload is performed during travelling 3: A servo signal cannot be read and a serious (more than 10 times) reload is performed during travelling 2: A servo cannot be read and it stops due to a system error 1: A servo cannot be read and it immediately stops due to a system error (Evaluation of Electromagnetic Conversion Characteristics)

First, a reproduction signal of the magnetic recording tape was obtained using a loop tester (manufactured by Microphysics). The conditions for obtaining the reproduction signal are shown below.

head: GMR headspeed: 2 m/s signal: single recording frequency (10 MHz)

recording current: optimal recording current

Next, the reproduction signal was captured by a spectrum analyzer with span of 0 to 20 MHz (resolution band width=100 kHz, VBW=30 kHz). Next, the peak of the captured spectrum is used as a signal amount S, the floor noise excluding the peak was integrated to obtain a noise amount N, and a ratio S/N between the signal amount S and the noise amount N was obtained as an SNR (Signal-to-Noise Ratio). Next, the obtained SNR was converted into a relative value (dB) on the basis of the SNR in Comparative Example 1 serving as a reference medium. Next, the SNR (dB) obtained as described above was used for judging the quality of the electromagnetic conversion characteristics as follows.

Better: the SNR of the magnetic recording tape is one dB or more better than the SNR (0=(dB)) in the evaluation reference sample (Comparative Example 1).

Good: the SNR of the magnetic recording tape is equal to the SNR (=0(dB)) of the evaluation reference sample (Comparative Example 1) or exceeds this SNR (=0(dB)).

Poor: the SNR of the magnetic recording tape is less than the SNR (=0(dB)) of the evaluation reference sample (Comparative Example 1).

(Evaluation of Winding Deviation)

First, a cartridge sample after the above-mentioned "judgment of the change amount in tape width" was prepared. Next, a reel around which the tape was wound was taken out of the cartridge sample, and the end surface of the wound tape was visually observed. Note that the reel has a flange, at least one flange is transparent or semi-transparent, and the inside tape winding state can be observed through the flange.

As a result of observation, in the case where the end surface of the tape was not flat and there was a step or tape protrusion, it was judged that there was winding deviation of the tape. Further, it was judged that the more the step and the tape protrusion were observed, the worse the "winding deviation" was evaluated. The above-mentioned judgment was performed for each sample. The winding deviation state of each sample was compared with the winding deviation state in Comparative Example 1 serving as a reference medium and judged as follows.

Better: the winding deviation state of the sample is equal to or less than the winding deviation state of the reference sample (Comparative Example 1)

Poor: the winding deviation state of the sample was more than the winding deviation state of the reference sample (Comparative Example 1)

Table 1 shows the configuration of the magnetic recording tapes according to Examples 1 to 24 and Comparative Examples 1 to 3, and the evaluation results.

TABLE 1

| | Magnetic material | $t_{bs}$ (μm) | $t_T$ (μm) | ΔW (ppm/N) | α (ppm/°C.) | β (ppm/%RH) | ρ | $\sigma_{MD}$ (N) | V (mm/min) | $t_m$ (nm) | S2 (%) | $t_b$ (μm) | $R_{ab}$ (nm) | μ | $t_l$ (μm) | Judgment | Electromagnetic conversion characteristics | Winding slip |
|---|---|---|---|---|---|---|---|---|---|---|---|---|---|---|---|---|---|---|
| Example 1 | ε-ion oxide | 3.8 | 5.5 | 705 | 5.9 | 5.2 | 0.29 | 0.75 | 0.5 | 90 | 65 | 0.6 | 5.2 | 0.53 | 1.0 | 4 | Good | Good |
| Example 2 | ε-ion oxide | 3.3 | 5 | 750 | 5.9 | 5.2 | 0.29 | 0.75 | 0.5 | 90 | 65 | 0.6 | 5.2 | 0.53 | 1.0 | 5 | Good | Good |
| Example 3 | ε-ion oxide | 3.2 | 4.5 | 800 | 5.9 | 5.2 | 0.29 | 0.75 | 0.5 | 90 | 65 | 0.3 | 5.7 | 0.48 | 0.9 | 6 | Good | Good |
| Example 4 | ε-ion oxide | 3.2 | 4.5 | 800 | 6.0 | 5.0 | 0.29 | 0.75 | 0.5 | 90 | 65 | 0.3 | 5.7 | 0.48 | 0.9 | 7 | Good | Good |
| Example 5 | ε-ion oxide | 3.2 | 4.5 | 800 | 8.0 | 5.0 | 0.29 | 0.75 | 0.5 | 90 | 65 | 0.3 | 5.7 | 0.48 | 0.9 | 7 | Good | Good |
| Example 6 | ε-ion oxide | 3.2 | 4.6 | 800 | 6.0 | 3.0 | 0.29 | 0.75 | 0.5 | 90 | 65 | 0.3 | 5.7 | 0.48 | 1.0 | 8 | Good | Good |
| Example 7 | ε-ion oxide | 3.2 | 4.5 | 800 | 6.0 | 5.0 | 0.31 | 0.75 | 0.5 | 90 | 65 | 0.3 | 5.7 | 0.48 | 0.9 | 7 | Good | Good |
| Example 8 | ε-ion oxide | 3.2 | 4.5 | 800 | 6.0 | 5.0 | 0.35 | 0.75 | 0.5 | 90 | 65 | 0.3 | 5.7 | 0.48 | 0.9 | 7 | Good | Good |
| Example 9 | ε-ion oxide | 3.2 | 4.5 | 800 | 6.0 | 5.0 | 0.31 | 0.8 | 0.5 | 90 | 65 | 0.3 | 5.7 | 0.48 | 0.9 | 8 | Good | Good |
| Example 10 | ε-ion oxide | 3.2 | 4.5 | 800 | 6.0 | 5.0 | 0.31 | 3.5 | 0.5 | 90 | 65 | 0.3 | 5.7 | 0.48 | 0.9 | 8 | Good | Good |
| Example 11 | ε-ion oxide | 3.2 | 4.5 | 800 | 6.0 | 5.0 | 0.31 | 0.8 | 5 | 90 | 65 | 0.3 | 5.7 | 0.48 | 0.9 | 8 | Good | Good |
| Example 12 | ε-ion oxide | 3.2 | 4.4 | 800 | 6.0 | 5.0 | 0.31 | 0.75 | 0.5 | 40 | 65 | 0.3 | 5.7 | 0.48 | 0.9 | 7 | Good | Good |
| Example 13 | ε-ion oxide | 3.2 | 4.4 | 800 | 6.0 | 5.0 | 0.31 | 0.75 | 0.5 | 90 | 65 | 0.2 | 5.7 | 0.48 | 0.8 | 7 | Good | Good |
| Example 14 | ε-ion oxide | 3.2 | 4.5 | 800 | 6.0 | 5.0 | 0.31 | 0.75 | 0.5 | 90 | 65 | 0.3 | 3.2 | 0.78 | 0.9 | 7 | Good | Good |
| Example 15 | ε-ion oxide | 3.2 | 4.5 | 800 | 6.0 | 5.0 | 0.31 | 0.75 | 0.5 | 110 | 65 | 0.3 | 5.7 | 0.48 | 0.9 | 7 | Bad | Good |
| Example 16 | ε-ion oxide | 3.2 | 4.5 | 800 | 6.0 | 5.0 | 0.31 | 0.75 | 0.5 | 90 | 65 | 0.3 | 6.8 | 0.22 | 0.9 | 7 | Good | Good |
| Example 17 | ε-ion oxide | 3.2 | 4.5 | 800 | 6.0 | 5.0 | 0.31 | 0.75 | 0.5 | 90 | 65 | 0.3 | 5.7 | 0.18 | 0.9 | 7 | Good | Bad |
| Example 18 | ε-ion oxide | 3.2 | 4.5 | 800 | 6.0 | 5.0 | 0.31 | 0.75 | 0.5 | 90 | 65 | 0.3 | 5.7 | 0.82 | 0.9 | 7 | Good | Bad |
| Example 19 | ε-ion oxide | 3.2 | 4.5 | 800 | 6.0 | 5.0 | 0.31 | 0.75 | 0.5 | 90 | 73 | 0.3 | 5.7 | 0.48 | 0.9 | 8 | Good | Good |
| Example 20 | ε-ion oxide | 3.2 | 4.5 | 800 | 6.0 | 5.0 | 0.31 | 0.75 | 0.5 | 90 | 80 | 0.3 | 5.7 | 0.48 | 0.9 | 8 | Better | Good |
| Example 21 | ε-ion oxide | 3.2 | 4.5 | 800 | 6.0 | 5.0 | 0.31 | 5 | 0.5 | 90 | 65 | 0.3 | 5.7 | 0.48 | 0.9 | 8 | Good | Good |
| Example 22 | BaFe | 3.2 | 4.5 | 800 | 6.0 | 5.0 | 0.31 | 0.75 | 0.5 | 90 | 65 | 0.3 | 5.7 | 0.48 | 0.9 | 7 | Good | Good |
| Example 23 | ε-ion oxide | 3.8 | 5 | 800 | 5.9 | 5.2 | 0.29 | 0.75 | 0.5 | 90 | 65 | 0.5 | 5.7 | 0.50 | 0.61 | 7 | Good | Good |
| Example 24 | BaFe | 3.6 | 5 | 800 | 5.9 | 5.2 | 0.29 | 0.75 | 0.5 | 90 | 65 | 0.5 | 5.7 | 0.50 | 0.81 | 7 | Good | Good |
| Comparative Example 1 | ε-ion oxide | 3.8 | 5.5 | 650 | 5.9 | 5.2 | 0.29 | 0.75 | 0.5 | 90 | 65 | 0.6 | 5.2 | 0.48 | 1.0 | 1 | Good | Good |
| Comparative Example 2 | BaFe | 4 | 5.7 | 630 | 6.0 | 5.0 | 0.3 | 0.75 | 0.5 | 90 | 65 | 0.6 | 5.7 | 0.50 | 1.1 | 1 | Good | Good |
| Comparative Example 3 | BaFe | 5 | 6.5 | 500 | 6.5 | 5.0 | 0.3 | 0.75 | 0.5 | 90 | 65 | 0.5 | 5.7 | 0.50 | 0.91 | 1 | Good | Good |

Note that each of the symbols in Table 1 means the following measured value.

$t_{bs}$: thickness (unit: μm) of the base layer $t_T$: thickness (unit: μm) of the magnetic recording tape Δw: dimensional change amount (unit: ppm/N) of the magnetic recording tape in the width direction relative to the tension change of the magnetic recording tape in the longitudinal direction α: temperature expansion coefficient (unit: ppm/°C.) of the magnetic recording tape β: humidity expansion coefficient (unit: ppm/%RH) of the magnetic recording tape ρ: Poisson's ratio of the magnetic recording tape $\sigma_{MD}$: elastic limit value (unit: N) of the magnetic recording tape in the longitudinal direction V: speed (unit: mm/min) when performing elastic limit measurement tm: average thickness (unit: nm) of the magnetic layer S2: squareness ratio (unit: %) in the thickness direction (vertical direction) of the magnetic recording tape $t_b$: average thickness (unit: nm) of the back layer $R_{ab}$: surface roughness (unit: nm) of the back layer μ: interlayer friction coefficient between the magnetic surface and the back surface $t_n$: thickness (unit: μm) of the underlayer (non-magnetic layer)

The following can be understood from the results shown in Table 1.

Any of the magnetic recording tapes according to Examples 1 to 24 had a determination result of the change amount in the tape width of 4 or more (i.e., the deviation of the "effective change amount of the tape width" from the ideal was small). Therefore, it can be seen that the magnetic recording medium according to the present technology is suitable for use in a recording/reproduction apparatus that adjusts the tension in the longitudinal direction.

Meanwhile, in Comparative Example 1, although the average thickness of the non-magnetic layer is 1.0 μm similarly, the judgement result regarding the change amount in the tape width is poor in the case where Δw is 650 ppm/N. In Comparative Example 2, the average thickness of the non-magnetic layer is 1.1 μm, Δw is 630 ppm/N, and the judgment result regarding the change amount in the tape width is poor. In Comparative Example 3, although the average thickness of the non-magnetic layer is 1.0 or less, the judgment result regarding the change amount in the tape width is poor in the case where ΔW is 500.

From these results, it is considered that ΔW of 660 ppm/N or more and the average thickness of the non-magnetic layer of 1.0 or less make the magnetic recording tape suitable for use in a recording/reproduction apparatus that adjusts the tension in the longitudinal direction (particularly, adjustment of the tape width by adjusting the tension).

Further, from the judgment results of the change amount in the tape width regarding Examples 1 to 24, it can be seen that the dimensional change amount Δw of the magnetic recording tape being favorably 700 ppm/N or more, more favorably 750 ppm/N or more, and still more favorably 800 ppm/N or more makes the magnetic recording tape suitable for use in a recording/reproduction apparatus that adjusts the tension in the longitudinal direction (particularly, adjustment of the tape width by adjusting the tension).

When comparing Example 24 and Comparative Example 2 with each other, it is considered that the average thickness of 5.5 μm or less contributes to make the magnetic recording tape suitable for use in the above-mentioned recording/reproduction apparatus.

Further, the average thickness of the magnetic recording tape was 5.3 μm or less in Examples 2 to 24, and the average thickness of the magnetic recording tape was 5.5 μm in Example 1. The judgment result of the change amount in the tape width is 5 or more in Examples 2 to 24 while the judgment result of the change amount in the tape width is 4 in Example 1. From this fact, it can be seen that the magnetic recording tape having the average thickness of 5.3 μm or less is more suitable for use in the above-mentioned recording/reproduction apparatus.

Further, from the judgment result of the change amount in the tape width regarding Examples 1 to 24, it can be seen that the average thickness of the magnetic recording tape being 5.2 μm or less, more favorably 5.0 μm or less makes the magnetic recording tape even more suitable for use in the above-mentioned recording/reproduction apparatus.

Further, the average thickness of the non-magnetic layer is 0.9 μm or less in Examples 3 to 5 and 7 to 24, and the average thickness of the non-magnetic layer is 1.0 μm in Examples 1 and 2. The judgment result of the tape width is 6 or more in Examples 3 to 5 and 7 to 24 while the judgment result of the tape width is 5 or less in Examples 1 and 2. From this fact, it can be seen that the magnetic recording tape in which the average thickness of the non-magnetic layer is 0.9 μm or less is more suitable for use in the above-mentioned recording/reproduction apparatus.

Further, when comparing Example 3 and Example 23 with each other, although Δw is 800 ppm/N similarly, the judgment result regarding the change amount in the tape width in the case where the average thickness of the non-magnetic layer is 0.9 μm is better than that in the case where the average thickness of the non-magnetic layer is 0.61 μm.

From this result, it can be seen that the magnetic recording tape in which the average thickness of the non-magnetic layer is 0.7 μm or less is even more suitable for use in the above-mentioned recording/reproduction apparatus.

When comparing the evaluation results in Examples 3 to 6 and the like with each other, from the viewpoint of suppressing the deviation of the "effective change amount of the tape width" from the ideal, it can be seen that the temperature expansion coefficient α is favorably 6 ppm/° C. or more and 8 ppm/° C. or less (6ppm/° C.≤α≤8ppm/° C.).

When comparing the evaluation results in Examples 3 to 5 and the like with each other, from the viewpoint of suppressing the deviation of the "effective change amount of the tape width" from the ideal, it can be seen that the humidity expansion coefficient β is favorably 5 ppm/%RH or less ((β≤5ppm/%RH).

When comparing the evaluation results in Examples 7, 9, 10 and the like with each other, from the viewpoint of suppressing the deviation of the "effective change amount of the tape width" from the ideal, the elastic limit value amp in the longitudinal direction is favorably 0.8 [N] or more $(0.8[N] \leq \sigma_{MD})$.

From the comparison between Example 9 and Example 11, it can be seen that the elastic limit value $\sigma_{MD}$ does not depend on the speed V when performing the elastic limit measurement.

When comparing the evaluation results in Examples 7 and 20 with each other, from the viewpoint of improving the electromagnetic conversion characteristics, it can be seen that the squareness ratio S2 of the magnetic recording tape in the vertical direction is favorably 75% or more, particularly 80% or more.

When comparing the evaluation results in Examples 7, 22, and the like, it can be seen that even in the case where barium ferrite nanoparticles are used as magnetic particles, an evaluation result similar to that in the case where ε-iron oxide nanoparticles are used as magnetic particles can be obtained.

When comparing the evaluation results in Examples 7 and 15 with each other, from the viewpoint of improving the electromagnetic conversion characteristics, it can be seen that the thickness of the magnetic layer is favorably 100 nm or less, particularly 90 nm or less.

When comparing the evaluation results in Examples 7, 14, and 16 to 18 with each other, from the viewpoint of improving the winding deviation, it can be seen that the friction coefficient μ favorably satisfies the relationship of 0.18<μ<0.82, particularly 0.20≤μ≤0.80.

Although embodiments of the present technology and Examples thereof have been specifically described above, the present technology is not limited to the above-mentioned embodiments and Examples thereof and various modifications can be made on the basis of the technical idea of the present technology.

For example, the configurations, the methods, the steps, the shapes, the materials, and the numerical values cited in the above-mentioned embodiments and Examples thereof are only illustrative, and different configurations, methods, steps, shapes, materials, and numerical values may be used as necessary. Further, the chemical formulae of compounds and the like are representative, and are not limited to the described valences and the like as long as they are common names of the same compound.

Further, the configurations, the methods, the steps, the shapes, the materials, and the numerical values in the above-mentioned embodiments and Examples thereof can be combined without departing from the essence of the present technology.

Further, in the present specification, the numerical range indicated by using "to" represents a range including the numerical values described before and after "to" as the minimum value and the maximum value, respectively. Within the numerical range described in a stepwise manner in the present specification, the upper limit or the lower limit of the numerical range in a certain step may be replaced with the upper limit value or the lower limit value of the numerical range in another step. The materials illustrated in the present specification can be used alone or in combination unless otherwise specified.

The present technology may also take the following configurations.

(1) A cartridge, including:
a cartridge case that houses a magnetic tape; and
a memory provided in the cartridge case, the memory storing information before data recording by the magnetic tape, the information being for adjusting, during data recording or during data reproduction by the magnetic tape, a width of the magnetic tape.

(2) The cartridge according to (1) above, in which
the information includes information regarding a width corresponding to the entire length of the magnetic tape, which has been acquired during at least any one of an unwinding operation or a rewinding operation of the magnetic tape executed by a data recording/reproduction apparatus before data recording.

(3) The cartridge according to (2) above, in which
the information regarding the width is discrete data acquired for each predetermined length of the magnetic tape.

(4) The cartridge according to (2) or (3) above, in which
the information includes environmental information around the magnetic tape during acquisition of the information regarding the width.

(5) The cartridge according to (4) above, in which
the environmental information includes information regarding temperature around the magnetic tape during acquisition of the information regarding the width.

(6) The cartridge according to (4) or (5), in which
the environmental information includes information regarding humidity around the magnetic tape during acquisition of the information regarding the width.

(7) The cartridge according to any one of (1) to (6) above, in which
the information includes information regarding tension of the magnetic tape during acquisition of the information regarding the width.

(8) The cartridge according to any one of (1) to (7) above, in which the information includes information regarding a substrate of the magnetic tape.

(9) The cartridge according to (2) above, in which
the width of the magnetic tape is adjusted during data reproduction or during data recording so that the width of the magnetic tape is the same as the width represented by the information regarding the width.

(10) The cartridge according to (9) above, in which
the width of the magnetic tape is adjusted by adjusting tension of the magnetic tape.

(11) The cartridge according to (9) or (10) above, in which
the information includes environmental information around the magnetic tape during acquisition of the information regarding the width, and
the width of the magnetic tape is adjusted on a basis of a difference between the environmental information and environmental information measured during data recording or during data reproduction.

(12) The cartridge according to any one of (1) to (11) above, in which
the cartridge is based on an LTO (linear Tape Open) standard.

(13) A memory provided in a cartridge case that houses a magnetic tape, the memory storing information before data recording by the magnetic tape, the information being for adjusting, during data recording or during data reproduction by the magnetic tape, a width of the magnetic tape.

(14) A data recording apparatus that records data in a magnetic tape, the data recording apparatus reading information regarding a width corresponding to the entire length of the magnetic tape before data recording by the magnetic tape, the information being stored in a memory provided in a cartridge case that houses the magnetic tape, the data recording apparatus adjusting, on a basis of the information regarding the width, the width of the magnetic tape during data recording by the magnetic tape.

(15) A data reproduction apparatus that reproduces data recorded on a magnetic tape, the data reproduction apparatus reading information regarding a width corresponding to the entire length of the magnetic tape before data recording by the magnetic tape, the information being stored in a memory provided in a cartridge case that houses the magnetic tape, the data reproduction apparatus adjusting, on a basis of the information regarding the width, the width of the magnetic tape during data recording by the magnetic tape.

(16) A magnetic recording medium having a layer structure including a magnetic layer, a non-magnetic layer, and a base layer in this order,
an average thickness $t_T$ satisfying a relationship of $t_T \leq 5.5$ μm,
dimensional change amount $\Delta w$ in a width direction relative to a tension change in a longitudinal direction satisfying a relationship of 660 ppm/N≤$\Delta w$,
an average thickness $t_n$ of the non-magnetic layer satisfying a relationship of $t_n \leq 1.0$ μm.

(17) The magnetic recording medium according to (16) above, in which
a squareness ratio in a vertical direction is 65% or more.

(18) The magnetic recording medium according to (16) or (17) above, in which
the non-magnetic layer contains Fe group-containing non-magnetic particles, and a particle volume of the Fe group-containing non-magnetic particles is $4.0 \times 10^{-5}$ μm$^3$ or less.

(19) The magnetic recording medium according to any one of (16) to (18) above, in which the average thickness $t_T$ satisfies a relationship of $t_T \leq 5.3$ μm.

(20) The magnetic recording medium according to any one of (16) to (19) above, in which the average thickness $t_T$ satisfies a relationship of $t_T \leq 5.2$ μm.

(21) The magnetic recording medium according to any one of (16) to (20) above, in which (6) the average thickness $t_T$ satisfies a relationship of $t_T \leq 5.0$ μm.

(22) The magnetic recording medium according to any one of (16) to (21) above, in which the average thickness $t_n$ of the non-magnetic layer satisfies a relationship of $t_n \leq 0.9$ μm.

(23) The magnetic recording medium according to any one of (16) to (22) above, in which the average thickness to of the non-magnetic layer satisfies a relationship of $t_n \leq 0.7$

(24) The magnetic recording medium according to any one of (16) to (23) above, in which the dimensional change amount Δw satisfies a relationship of 700 ppm/N≤Δw.

(25) The magnetic recording medium according to any one of (16) to (24) above, in which the dimensional change amount Δw satisfies a relationship of 750 ppm/N≤Δw.

(26) The magnetic recording medium according to any one of (16) to (25) above, in which the dimensional change amount Δw satisfies a relationship of 800 ppm/N≤Δw.

(27) The magnetic recording medium according to any one of (16) to (26) above, in which the layer structure includes a back layer on a side of the base layer opposite to the non-magnetic layer, and a surface roughness $R_{ab}$ of the back layer satisfies a relationship of 3.0 nm≤$R_{ab}$≤7.5 nm.

(28) The magnetic recording medium according to any one of (16) to (27) above, in which the layer structure includes a back layer on a side of the base layer opposite to the non-magnetic layer, and a friction coefficient μ between a surface of the magnetic recording medium on a side of the magnetic layer and a surface of the magnetic recording medium on a side of the back layer satisfies a relationship of 0.20≤μ≤0.80.

(29) The magnetic recording medium according to any one of (16) to (28) above, in which the temperature expansion coefficient α satisfies a relationship of 6 ppm/°C.≤α≤8 ppm/°C., and the humidity expansion coefficient β satisfies a relationship of β≤5 ppm/%RH.

(30) The magnetic recording medium according to any one of (16) to (29) above, in which the Poisson's ratio ρ satisfies a relationship of 0.3≤ρ.

(31) The magnetic recording medium according to any one of (16) to (30) above, in which the elastic limit value $\sigma_{MD}$ in the longitudinal direction satisfies a relationship of 0.8N≤$\sigma_{MD}$.

(32) The magnetic recording medium according to (31) above, in which the elastic limit value a $\sigma_{MD}$ does not depend on a speed V when performing elastic limit measurement.

(33) The magnetic recording medium according to any one of (16) to (32) above, in which the magnetic layer is vertically oriented.

(34) The magnetic recording medium according to any one of (16) to (33) above, in which the layer structure includes a back layer on a side of the base layer opposite to the non-magnetic layer, and the average thickness $t_b$ of the back layer satisfies a relationship of tb≤0.6 μm.

(35) The magnetic recording medium according to any one of (16) to (34) above, in which the average thickness $t_m$ of the magnetic layer satisfies a relationship of 9 nm≤tm≤90 nm.

(36) The magnetic recording medium according to any one of (16) to (35) above, in which the magnetic layer contains a magnetic powder.

(37) The magnetic recording medium according to any one of (16) to (36) above, in which the average thickness $t_m$ of the magnetic layer satisfies a relationship of 35 nm≤tm≤90 nm.

(38) The magnetic recording medium according to any one of (16) to (37) above, in which the magnetic powder includes an ε-iron oxide magnetic powder, a barium ferrite magnetic powder, a cobalt ferrite magnetic powder, or a strontium ferrite magnetic powder.

(39) The magnetic recording medium according to any one of (16) to (38) above, in which the layer structure includes a back layer on a side of the base layer opposite to the non-magnetic layer, and the surface roughness $R_{ab}$ of the back layer satisfies a relationship of 3.0 nm≤$R_{ab}$≤7.5 nm.

(40) The magnetic recording medium according to any one of (16) to (38) above, in which the layer structure includes a back layer on a side of the base layer opposite to the non-magnetic layer, and a friction coefficient μ between a surface of the magnetic recording medium on a side of the magnetic layer and a surface of the magnetic recording medium on a side of the back layer satisfies a relationship of 0.20≤μ≤0.80.

(41) The magnetic recording medium according to any one of (16) to (40) above, in which the temperature expansion coefficient α satisfies a relationship of 6 ppm/°C.≤a≤9 ppm/°C., and the humidity expansion coefficient β satisfies a relationship of β<5.5 ppm/%RH.

(42) The magnetic recording medium according to any one of (16) to (41) above, in which the Poisson's ratio ρ satisfies a relationship of 0.25≤ρ.

(43) The magnetic recording medium according to any one of (16) to (42) above, in which the elastic limit value $\sigma_{MD}$ in the longitudinal direction satisfies a relationship of 0.7 N≤$\sigma_{MD}$.

(44) The magnetic recording medium according to (43) above, in which the elastic limit value $\sigma_{MD}$ does not depend on a speed V when performing elastic limit measurement.

(45) The magnetic recording medium according to any one of (16) to (44) above, in which the average thickness $t_n$ of the non-magnetic layer satisfies a relationship of $t_n \leq 0.9$ μm.

(46) The magnetic recording medium according to any one of (16) to (45) above, in which the average thickness $t_n$ of the non-magnetic layer satisfies a relationship of $t_n \leq 0.7$ μm.

REFERENCE SIGNS LIST

1 magnetic tape
9 cartridge memory
10 cartridge
11 cartridge case
30 data recording/reproduction apparatus
38 control device

The invention claimed is:

1. A cartridge, comprising:
   a cartridge case that houses a magnetic tape; and
   a memory provided in the cartridge case, the memory storing information before a data recording on the magnetic tape, the information being for adjusting, during the data recording or during a data reproduction on the magnetic tape, a width of the magnetic tape,
   wherein the information includes information regarding the width of the magnetic tape, and
   wherein the information is acquired during at least any one of an unwinding operation or a rewinding operation before the data recording.

2. The cartridge according to claim 1, wherein a thickness of the magnetic tape is 5.5 μm or less.

3. The cartridge according to claim 1, wherein the information regarding the width is discrete data acquired for each predetermined length of the magnetic tape.

4. The cartridge according to claim 1, wherein the information includes environmental information around the magnetic tape during acquisition of the information regarding the width.

5. The cartridge according to claim 4, wherein the environmental information includes information regarding temperature around the magnetic tape during acquisition of the information regarding the width.

6. The cartridge according to claim 4, wherein the environmental information includes information regarding humidity around the magnetic tape during acquisition of the information regarding the width.

7. The cartridge according to claim 1, wherein the information includes information regarding tension of the magnetic tape during acquisition of the information regarding the width.

8. The cartridge according to claim 1, wherein the information includes information regarding a substrate of the magnetic tape.

9. The cartridge according to claim 1, wherein the width of the magnetic tape is adjusted during the data reproduction or during the data recording so that the width of the magnetic tape is the same as the width represented by the information regarding the width.

10. The cartridge according to claim 9, wherein the width of the magnetic tape is adjusted by adjusting tension of the magnetic tape.

11. The cartridge according to claim 9, wherein the information includes environmental information around the magnetic tape during acquisition of the information regarding the width, and
    the width of the magnetic tape is adjusted on a basis of a difference between the environmental information and environmental information measured during the data recording or during the data reproduction.

12. The cartridge according to claim 1, wherein the cartridge is based on an LTO (linear Tape Open) standard.

13. The cartridge according to claim 1, wherein the information is acquired when data recording has not been performed.

14. The cartridge according to claim 1, wherein a dimensional change amount $\Delta w$ in a width direction of the magnetic tape with respect to a tension change in a longitudinal direction of the magnetic tape is 680 ppm/N≤$\Delta w$.

15. The cartridge according to claim 14, wherein the dimensional change amount $\Delta w$ is 680 ppm/N≤$\Delta w$≤ 8000 ppm.

16. The cartridge according to claim 15, wherein the dimensional change amount $\Delta w$ is determined according to:

$$\Delta W[ppm/N]=D(0.2N)[mm]-D(1.0N)[mm]/D(0.2N)[mm]\times 1{,}000{,}000/(1.0[N])-(0.2[N])$$

wherein $D(0.2N)$ and $D(1.0N)$ represent widths of a sample of the magnetic tape subject to loads of 0.2N and 1.0N, respectively, in the longitudinal direction of the magnetic tape under 25° C. and 50% RH, and a width of the sample of the magnetic tape is ½ inch prior to being subject to a load.

17. The cartridge according to claim 1, wherein the magnetic tape includes a base layer, and wherein the base layer includes a polyester resin.

18. A memory provided in a cartridge case that houses a magnetic tape, the memory storing information before a data recording on the magnetic tape, the information being for adjusting, during the data recording or during a data reproduction on the magnetic tape, a width of the magnetic tape,
    wherein the information includes information regarding the width of the magnetic tape, and
    wherein the information is acquired during at least any one of an unwinding operation or a rewinding operation before the data recording.

19. A data recording apparatus that records data in a magnetic tape, the data recording apparatus reading information regarding a width of the magnetic tape before a data recording on the magnetic tape, the information being stored in a memory provided in a cartridge case that houses the magnetic tape, the data recording apparatus adjusting, on a basis of the information regarding the width, the width of the magnetic tape during the data recording on the magnetic tape,
    wherein the information is acquired during at least any one of an unwinding operation or a rewinding operation before the data recording.

20. A data reproduction apparatus that reproduces data recorded on a magnetic tape, the data reproduction apparatus reading information regarding a width of the magnetic tape before a data recording on the magnetic tape, the information being stored in a memory provided in a cartridge case that houses the magnetic tape, the data reproduction apparatus adjusting, on a basis of the information regarding the width, the width of the magnetic tape during a data reproduction on the magnetic tape,
    wherein the information is acquired during at least any one of an unwinding operation or a rewinding operation before the data recording.

* * * * *